US005727950A

United States Patent [19]
Cook et al.

[11] Patent Number: 5,727,950
[45] Date of Patent: Mar. 17, 1998

[54] AGENT BASED INSTRUCTION SYSTEM AND METHOD

[75] Inventors: Donald A. Cook, deceased, late of Jamaica Plain, by Dawn Mather Cook, administratrix; George Lukas, Brighton, both of Mass.; Andrew V. Lukas, Boulder, Colo.; David J. Padwa, Santa Fe, N. Mex.

[73] Assignee: Netsage Corporation, Golden, Colo.

[21] Appl. No.: 651,422

[22] Filed: May 22, 1996

[51] Int. Cl.$^6$ ............................................. G09B 5/00
[52] U.S. Cl. ............................................. 434/350
[58] Field of Search ................................... 434/350

[56] References Cited

U.S. PATENT DOCUMENTS

| | | |
|---|---|---|
| 5,211,563 | 5/1993 | Haga et al. ............... 434/322 |
| 5,261,823 | 11/1993 | Kurokawa ............... 434/350 X |
| 5,310,349 | 5/1994 | Daniels et al. ........... 434/350 |
| 5,458,494 | 10/1995 | Krohn et al. ............ 434/350 X |

OTHER PUBLICATIONS

A+dvantage—Worldware, 1995, Jostens Learning Brochure, Mar. 1995.
Applied Physics, 1995, EduStar America Inc. Brochure, Dec. 1995.
Aqua Venture. 1995, EduStar America Inc. Brochure, Dec. 1995.
Barron, Jan. 1994, Authoring-Systems Software for Computer-Based Training (Educational Technology Publications, New Jersey) pp. 75–92.
Basic Electronics, Dec. 1995, Degem Systems Brochure.
Best, Dec. 1995, Degem Systems Brochure.
Brader, Dec. 1994, Authoring-Systems Software for Computer-Based Training (Educational Technology Publications, New Jersey) pp. 45–60.
Burke, Jan. 1994, Authoring-Systems Software for computer-Based Training (Educational Technology Publications, New Jersey) pp. 123–141.
Carbonell, Dec. 1970, IEEE Transactions on Man-Machine Systems 11:190–203.
Cook, Dec. 1989, A Briefing for Buyers (Asymtote Inc., Boston).
Educating Jessica's Generation, Dec. 1995, Jostens Learning Brochure.
EduStar Mathematics, Dec. 1995, Innovative Technologies In Education Brochure.
Fall, III, Jan. 1994 Authoring-Systems Software for Computer-Based Training (Educational Technology Publications, New Jersey) pp. 143–164.
Hello Blue Planet, Dec. 1995, EduStar America Inc. Brochure.

(List continued on next page.)

*Primary Examiner*—William H. Grieb
*Attorney, Agent, or Firm*—Pennie & Edmonds LLP

[57] ABSTRACT

This invention relates to a system and method for interactive, adaptive, and individualized computer-assisted instruction. This invention includes an agent for each student which adapts to its student and provides individualized guidance to the student and controls to the augmented computer-assisted instructional materials. The instructional materials of this invention are augmented to communicate the student's performance and the material's pedagogical characteristics to the agent and to receive control from the agent. Preferably, the content of the communication between the agent and the materials conforms to specified interface standards so that the agent acts independently of the content of the particular materials. Also preferably, the agent can project using various I/O modalities integrated, engaging, life-like display persona(e) appropriate to the preferences of its student and appear as a virtual tutor to the student. Finally, preferably this invention is implemented on computers interconnected by a network so that instruction can be delivered to geographically distributed students from geographically distributed servers. An important application of this invention is delivering interactive, adaptive, and individualized homework to students in their homes and other locations.

151 Claims, 13 Drawing Sheets

OTHER PUBLICATIONS

Home Reach, Oct. 1995, Computer Curriculum Corporation Brochure.
Keller, Dec. 1968, J. Applied Behavior Analysis 1:79–89.
Kimball, Oct. 1995, Educational Leadership 53:54–56.
Kulik et al., Dec. 1986, J. Educational Computing Research 2:235–252.
Kulik et al., Dec. 1983, J. Educational Psychology 75:19–26.
Lamb, Jan. 1994, Authoring–Systems Software for Computer–Based Training (Educational Technology Publications, New Jersey) pp. 24–44.
Learning First—New Edition, May 1995, jostens Learning Brochure.
Lesser, Sep. 1995, ACM Computing Surveys 27:340–342.
Lindsley, Dec. 1990, Teaching Exceptional Children 22:353–359.
Maes, Ju. 1994, Communications of the AMC 37:31–40.
Meet Lightspan, Apr. 1996, Light Span Brochure.
Osin, Feb. 1984, Proc. 4th Jerusalem conf. on Information Technology, pp. 418–424.
Peha, Oct. 1995, Educational Leadership 53:18–25.
Plato Learning System, Dec. 1995, TRO Learning, Inc. Brochure.
Sherry and Komoski, eds., Dec. 1990, The IIS Report pp. 3–6, 21–24, 52, 256–260.
Venezky and Osin, Dec. 1991, The Intelligent Design of Computer–Assisted Instruction (Longman, New York) chapters 3 and 7–13.
Writing Expedition, Dec. 1994, Ideal Learning Brochure.

302 MYBOOK | FRED'S FUNKY FUNBOX | THE GRATEFUL DEAD LIVE | I LOVE PIZZA
306 — FUNBOX
305 — THE GRATEFUN DEAD LIVE
307

MATH READING DICTIONARY LINK GROUP

308

MARCH
— — — — —
— — — — —
— — — — —

CLOCK

CALCULATOR ICON | WORD PROC. ICON (PAD) | COMMUNICATIONS ICON (PHONE) | STARFISH ICON

310

HW1 | MATH. HOMEWORK 1  313  Page 3
314 — Read the story:
311 — Sally said: "The train leaves at 10:10."
Ben said: "It'll take us 15 minutes to get to the stations."
Sandra said: "Hurry, we might make it." — 315

HW2
HW3

312

? ?
Time to start — 318

320

319

316 — What is the time?
[ ] 9:45
[ ] before 9:55
[ ] before 10:05
[ ] 10:15

317 — SUBMITHW   HELP

321 — NEXTPAGE   FIRSTPAGE   CLOSEBOOK

303

304

AGENT BASED INSTRUCTION SYSTEM AND METHOD

TABLE OF CONTENTS

1. FIELD OF THE INVENTION
2. BACKGROUND OF THE INVENTION
3. SUMMARY OF THE INVENTION
4. BRIEF DESCRIPTIONS OF THE DRAWINGS
5. DETAILED DESCRIPTION OF THE INVENTION
   - 5.1. ABI System Overview
     - 5.1.1. Functional Components
     - 5.1.2. Exemplary Implementing Structure
   - 5.2. System Hardware and Operating Software
     - 5.2.1. The ABI System Network
     - 5.2.2. The Client System
     - 5.2.3. The Server System
     - 5.2.4. ABI System Security
   - 5.3. The Instructional Interface
     - 5.3.1. Student-System Interface
       - 5.3.1.1. Exemplary Student Screens
       - 5.3.1.2. Student Actions
       - 5.3.1.3. System Responses
     - 5.3.2. Teacher/Administrator System Interface
     - 5.3.3. Instructional Designer System Interface
   - 5.4. ABI System Software Structure
     - 5.4.1. Student Client Software Structure
     - 5.4.2. The Executive Software
     - 5.4.3. System Event Processing
   - 5.5. The Instructional Materials And The Tools
     - 5.5.1. The Instructional Materials
     - 5.5.2. The Tools
       - 5.5.2.1. The General Tools
       - 5.5.2.2. File System Tool
       - 5.5.2.3. The Scheduler/Calendar Tool
       - 5.5.2.4. Communications Tools and Group Work Materials
   - 5.6. The Agent And The Agent Interface
     - 5.6.1. Student Data Object
     - 5.6.2. The Agent/Materials Interface
       - 5.6.2.1. The Agent/Materials Interface Standard
     - 5.6.3. Agent Action Processing
     - 5.6.4. Agent Behavior Processing
     - 5.6.5. Agent Adaptivity
6. SPECIFIC EMBODIMENTS, CITATION OF REFERENCES

1. FIELD OF THE INVENTION

This invention relates to a system and method for interactive, adaptive, and individualized computer-assisted instruction of students, preferably implemented on network connected computers. More particularly the system and method includes for each student an agent adapted to that student which monitors its students's instructional behavior, responds to teacher direction, and controls the instructional progress, and guides its student, all of which constitute one aspect of a virtual tutor. Preferably, the viewable on-screen aspect of the agent includes customizable multimedia presentation personae, which constitute a further aspect of a virtual tutor.

2. BACKGROUND OF THE INVENTION

The application of computers in education has been limited by several problems, including a failure to provide systems that adapt or individualize to each student, a failure to integrate systems effectively into the existing classroom in elementary and secondary schools, and a failure to exploit technological developments. Although during the last three decades, a number of interactive educational techniques have been implemented on computers, all these systems lack the ability to recognize and to adapt to each student's individual characteristics. The common motivation for interactive educational techniques was the recognition that individual student interaction fosters learning to a greater degree than mere passive exposure to a fixed pace presentation (Kulik et al., 1986, Effectiveness of computer-based adult learning: a meta-analysis, *Journal of educational computing research* 2:235–252; Kulik et al., 1983, Effects of computer-based teaching on secondary school students, *Journal of educational psychology* 75:19–26). Existing, interactive educational techniques have many variants: programmed instruction, mastery learning, audio-tutorials, direct instruction, personalized system of instruction, precision teaching, fluency learning and others (Engleman et al., 1982, *Theory of instruction: Principles and Applications*, Irvington, New York; Keller, 1968, "Goodbye, teacher...", *Journal of Applied Behavior Analysis* 1:79–89; Lindsley, 1990, Precision teaching: By teachers for children, *Teaching Exceptional Children* 22:353–359; West et al., 1992, *Designs for Excellence in Education: the Legacy of B. F. Skinner*, Sorris West, Inc., Longmont, Col., pp. 147–160). Several systems have attempted to harness the interactivity of the computer for these interactive educational techniques.

In early work, for example, text-based programmed instruction was converted to computer format and implemented on time-shared systems. This early development was extended with more sophisticated computer-assisted instruction ("CAI"), also known as compute based training ("CBT").

In CAI, for example, the computer acts as a teaching machine. A program presents instructional displays, accepts student responses, edits and judges those responses, branches on the basis of student responses, gives feedback to the student, and records and stores the student's progress. Examples of CAI systems include those of Carbonell, 1970, AI in CAI, an artificial intelligence approach to computer-assisted instruction, *IEEE Transactions on Man-machine Systems*, 11:190–202; Osin, 1984, CAI on a national scale, *Proc. 4th Jerusalem Conf. on Information Technology*, pp 418–424; Seidel 1971; Koffman et al., 1975, Artificial intelligence and artificial programming in CAI, *Artificial Intelligence* 6:215–234. Effective CAI instructional materials for a limited number of specific topics have been developed, as have special "authoring languages," which assist instructional developers on the tasks of designing instructional materials. U.S. Pat. No. 5,310,349 is exemplary of such CAI systems.

However, existing CAI systems do not adapt to their students. These systems merely sequence students through educational materials, based only on student performance during a current lesson and using only parameters such as recent responses and pre-requisite patterns. These systems do not gather or use information on more comprehensive student characteristics, such as past student performance, student performance on other courses, student learning styles, and student interests.

A greater deficiency is that existing CAI systems do not recognize characteristics of their individual students. They cannot be individualized or made responsive to their students styles. Thereby, these system ignore those roles of a human tutor that can be of unparalleled significance in the education of an individual. The human tutor assists in scheduling and prioritizing and in maintaining interest through proper reinforcement and knowledge of student abilities and preferences. A human tutor observes and addresses patterns of errors and maintains a consistent manner of interaction across a broad range of subject matters and activities. Moreover, a human tutor effectively integrates the cognitive, personal and social aspects of the instructional situation. In other words the human tutor provides a level of individualization based on student styles and on requirements of the instructional task. Furthermore, the human tutor provides an equally effective interaction with the teacher by accepting individualized instructions, collecting data and providing detailed reports. By failing to address these higher order services and roles of an effective human tutor, existing CAI systems fail to fully engage their students and thus fail instruct as well as possible.

Additionally, a further problem of computer assisted instruction, particularly in primary and secondary school settings is poor integration into the rest of the school curriculum and often poor quality of the educational materials. In application to elementary and secondary schools, two main patterns of instructional computer use prevail, which illustrate the compromises prevalent today. In one pattern, the integrated learning system ("ILS") is a dedicated installation that is used in schools to teach basic strands of reading, mathematics and related topics, spelling, writing, and other language arts, from grades one to six, or perhaps to eight or nine (EPIE, 1990, Integrated Instructional Systems: an Evaluation, Educational Products Information Exchange, Hampton Bays, N.Y.). The paradox with this pattern, regardless of the quality of the instruction offered by these systems, the work of students in ILSs bears little relation to what goes on in the classrooms in that very same topic. The fundamental reason is that the teacher cannot influence or respond meaningfully to variations in student progress or to relations between the CAI curriculum and the classroom text, materials and activities. This is the case even where the ILS installation produces reports in some detail as to each student's progress and standing.

The second pattern of computer use in schools is that of standalone short units on specific topics (TESS, 1996, *Database of Educational Software Systems*, Educational Products Information Exchange, Hampton Bays, N.Y.). These can be hypercard programs, simulations, or games, and are usually separate from the basic classroom curriculum. Though occasionally of excellent quality, the paradox here is that these products are usually chosen for enhancement, possible optional, and do not account for a major component of school related instruction. No records are kept or returned regarding student performance. These programs have not made a major contribution to school instruction.

Finally, computer assisted instruction systems have ignored or under utilized such important developments in computer technology over the past four years as agent-based system, client-server systems, and networking systems. Though now an active field with a wide spectrum of activities from research to commercial applications, application of agent-based systems in educational, instructional, and homework tasks has not been explored. Software systems for intelligent agents have successfully applied in travel arrangements, email management, meeting scheduling, stock portfolio management, and gathering information from the Internet (Maes, 1994, Agents that reduce work and information overload, Communications of the *ACM* 37:30–40). In all these applications, software agents perform tasks on the user's behalf, receiving only general instructions from their user but then executing detailed tasks with considerable independence and initiative. In client-server systems, these agents can operate in the client, the server, or both.

Recently, adaptive and personalized agent based systems have begun to be developed. Systems with adaptive agents, agents which learn from experience, has made gains with new techniques continually identified. Adaptive agents have permitted new commercially viable adaptive systems implemented across networks. In these systems, an agent is a "go-between," mediating relations in a manner whose function is understood with details being left to the agent itself. The agent acts as a "stand-in" for its user, who is thus freed from direct manipulation of the network. In instructional applications, there is an unmet need for an agent who serves two users: the school system and the individual student. This is the well-known role of the teaching assistant/tutor. Maes, 1994, and others have extended the metaphor of agent to that of personal assistant, an agent who learns some important characteristics of its user, and adapts its behavior accordingly. Agents can learn by a mixture of methods: observation, receiving feedback from its user, receiving instructions from the user, and consulting other agents concerning "similar problems." To combine the important properties of competence, trust, and intimacy that a personal assistant should have, an agent should be in touch with relevant data, represent important facts in a reliable manner, and engage with its user in a personal and fundamentally sympathetic—at times playful—manner. Approaches to the creation of agents with personal characteristics have begun to be explored. In this work, relevant techniques are found in the tradition of film animators who, through the portrayal of emotions, gave their characters the illusion of life.

Moreover, computer assisted instructional systems have only haphazardly exploited the potential of client-server systems and networking technologies. Client-server architectures have emerged as the principal architecture of distributed computer systems. Client systems, running under sophisticated windowing operating systems, can support advanced object based software applications, including high speed graphics, animation and audio output. Servers can store gigabytes of data and programs at central or distributed locations at quite reasonable cost. Object oriented database systems have been developed to store structured data on servers.

Client systems, in a striking change from only several years ago, now virtually all have multimedia capabilities, including high quality graphics, sound, and at least limited video playback capability. Text-to-speech software is presently available for use with these systems, and speech recognition software is on brink of widespread commercial acceptability on low cost platforms. New authoring tools support graphical methods for generation of multimedia presentations and computer based instructional materials having corresponding sequencing logic.

Clients and servers can be linked remotely with increasing convenience and decreasing cost. The Internet has emerged as a means of providing an inexpensive means of connecting computers to provide effective communications and access to information and other resources such as software. Further Internet developments that made the Internet truly universal include the HTML and the HTTP protocols, which provide platform independent access to hyperlinked multimedia information, and the Java™ programming language, which provides platform independent software for Internet applications programming. Subsets of the Internet—intranets—have become an increasingly important means for disseminating information and enabling communication within constrained domains, such as a single school system or corporate enterprise.

Existing CAI systems have not addressed these functional deficiencies nor have they exploited the possibilities of existing technologies.

Citation of references hereinabove shall not be construed as an admission that such a reference is prior art to the present invention.

3. SUMMARY OF THE INVENTION

The Agent Based Instruction ("ABI") system of this invention is a system and method for interactive, adaptive, and individualized computer-assisted instruction and homework, preferably implemented on network connected computers, that overcomes these problems by providing the following objects in preferred and alternative embodiments. This invention provides a more effective system responsive to the needs of several parties interested in education.

An important object of this invention is to provide the student with a virtual tutor, by having agent software ("agent") adapted to each student that offers a high quality of individualized student interaction and that manages or controls instruction in a manner approximating a real tutor. The agent exercises management or control over the computer-assisted instruction materials and provides information and help to the student, both synchronously and asynchronously to particular instructional materials. Agent behaviors are sensitive to both the educational context and to the history of student behavior.

In a preferred embodiment of this invention the agent integrates data from several sources. From computer-assisted instructional materials, it accepts data on the methods of instruction adopted by particular materials and on student performance in the instruction. From the student, it accepts direct interactions as well as using the history of previous student performance stored in a student data object. From the teacher, it accepts data on customization and student assignments. From the school, it accepts data on assigned courses, data on analysis of student body performance, and educational standards and criteria. In a preferred embodiment, these inputs allow individualization of agent interaction. Alternative embodiments are responsive to additional data types and sources.

In a preferred embodiment of this invention, diverse agent behaviors are handled uniformly by a single means. The diverse behaviors include encouragement and feedback, providing meta-cognitive help on ongoing instruction, managing or controlling and individualizing computer based instruction to the student's learning modes, and assistance with assignment management. These diverse behaviors are selected from a set of potentially appropriate candidate behaviors. This set of candidate behaviors is ordered and the highest ranked behaviors are chosen.

In a preferred embodiment of this invention the diverse agent behaviors adapt to the student based on a variety of information about the student. The agent modifies its behavior on the basis of a growing history of interactions with the student over time, as this history of student performance is stored in the student data object. The agent can also modify its behavior on the basis of teacher and school system supplied information.

Another important object of this invention is that the agent presents itself on-screen to the student with integrated, and optionally, animated multimedia persona, or preferably a plurality of persona (hereinafter called "personae"). The on-screen agent can appear as living entities, which in grade school can be comfortable "Study Buddies™"0 and in adult training can be appear as an objective "Concept Coach". The on-screen agent instructs, motivates, engages and guides its student.

In a preferred embodiment, the on-screen agent can be dramatized by a single character or by a cast of interacting characters. The interaction between these actors can be individualized to reflect the pedagogical response of the agent. To maintain student interest in the agent response, story lines continuing across materials or session can be used.

In a preferred embodiment of this invention the voices, gestures and motions of the personae are derived from the chosen behaviors, student personae preferences, and the history of recent behavior by selection from tables containing a rich variety of alternative sound and visual display objects. All elements of the on-screen agent display are then synthesized in an integrated display script calling for graphics, animation, video, or sound as appropriate. These scripts are then bundled into applets, run-time program fragments that represent a complete element of performance. This display is highly configurable by the student, the teacher, or the system administrator.

It is an advantage of this invention that elements of the display objects can be created by artists, animators, singers, and so forth, as data snips. Pluralities of data snips can be stored in libraries of dynamic clip art and then installed in an implementation of this invention. In this manner the on-screen agent personae have an appropriately contemporary, realistic, and engaging manner. Data snips are, in general, short clips of sound, voice, graphics, animation or video, or combinations of these used to construct the on-screen agent. A data snip can also be a complete preformatted animated sequence, perhaps in the format of a talking animated daily cartoon strip.

Another important object is that the method and system of this invention is adapted to implementation on a variety of networks. When so implemented, the interactive, adaptive, and self-paced computer-assisted instruction and homework provided by this invention is available to geographically dispersed students and from geographically dispersed schools. For example, an implementation of this invention as a "HomeWork Network™" can make computer assisted homework available to students of all levels at home. In addition to computers located at residences of students, the student can also access homework materials at computers located in youth centers, libraries, schools and other locations.

In a preferred embodiment, the network on which this invention is implemented as an intranet configured of appropriate links and utilizing the known TCP/IP protocol suite, and as appropriate, ATM technologies, including World Wide Web, associated browsers, and mail format extensions. Implementation over the public Internet is equally preferred in cases where extensive connectivity is needed.

A further important object of this invention is to utilize augmented computer-assisted instruction materials which present to students a variety of interactive, adaptive, and self-paced computer-assisted instruction and homework materials in a manner which informs the agent of a student's progress and performance and which permits the agent to manage or control the materials to the student's pedagogic characteristics. Thereby, the ABI system can effectively guide and engage students in their educational tasks.

In a preferred embodiment, these instructional and homework materials are Composed of materials data presented by a materials engine. The materials data includes display objects containing the substance of the instruction, logic to sequence the display according to student input, and notations. Notations are augmented definitions that serve to pass information to the agent concerning the materials and the student. For example, notations classify key sections of materials which are educationally significant student actions. Preferably, authoring tools assist in developing these augmented instructional materials. Materials tasks and sequences are created and entered by instructional designers and subject experts. Notations are usually entered by instructional designers and can be customized by teachers.

In a preferred embodiment, the information passed in the notations is standardized according to an instruction materials interface standard. This standard establishes a uniform way the materials independent data relating to student performance are to be provided to the agent and a uniform way for the agent to guide the student in a materials independent manner.

A further important object of this invention is to provide to the student a range of tools which are integrated with the agent in a manner similar to the instructional materials. These tools include general tools helpful to assigned instructional tasks, and special tools for group work and communication and for student scheduling.

In a preferred embodiment, the general tools include at least a calculator, an encyclopedia, a dictionary, a thesaurus, each appropriate to the several levels of students, which can access an ABI implementation. In a preferred embodiment, the group work and communication materials allow, when permitted, message exchange, student linking into groups for joint work, and student linking into groups for structured work such as contests. In a preferred embodiment the student scheduling tool records assigned student activities and their priorities. In an embodiment, this tool can be consulted by the student to view schedules. It can be consulted by the system to prescriptively schedule required activities, to permit student choice, or to permit a mixed scheduling initiative. Finally, it can be consulted by the agent to offer scheduling advice to the student. Typically, student assignments are set by a teacher.

An object of this invention is reporting of student performance to students, teachers, parents, administration, or to other appropriate individuals in a business enterprise or other commercial versions. These reports include the unique data on the student's pedagogic performance accumulated and analyzed by the agent, as well as all the usual and expected performance data on specific materials available in existing computer-assisted instruction systems. In a preferred embodiment this data is derived from the student data object, where all permanent student data is stored. These data objects are preferably stored in an object oriented database system against which are run reports of this data. It is an advantage of this invention in a school context that parents can have access to current data on their children, and thereby play a more informed role in their children's education.

Another object of the invention is to utilize current technologies for student interaction. When available, this invention is adaptable to Network Computers ("NC"). NCs are low cost computers specifically designed to access intranets or the public Internet. In a current preferred embodiment and implementation, this invention is adaptable to multimedia PCs for some students, and to such special interaction technologies as can be advantageous to special students or students with special needs. Typical interactive devices include keyboards, mice or other pointing devices, voice recognition, joy-sticks, touch activated devices, light-pens, and so forth. Other devices, such as virtual reality devices, can be added as they become commercialized.

It is clear to those of skill in the art that by providing interactive, adaptive, and self-paced computer-assisted instruction and homework delivered over widely available computer networks this invention has immediate application in public, private, and commercial school environment of all levels. Educational research shows that instruction and homework of these characteristics improves students' educational outcomes. Further, in school contexts this invention advantageously provides immediate access to student performance and pedagogic characteristics to all interested parties, including parents.

4. BRIEF DESCRIPTIONS OF THE DRAWINGS

These and other objects, features, and advantages of the invention will become apparent to those of skill in the art in view of the accompanying drawings, detailed description, and appended claims, where:

FIG. 3 illustrates an exemplary student display screen of the implementation of FIG. 2;

5. DETAILED DESCRIPTION OF THE INVENTION

Figure 1:
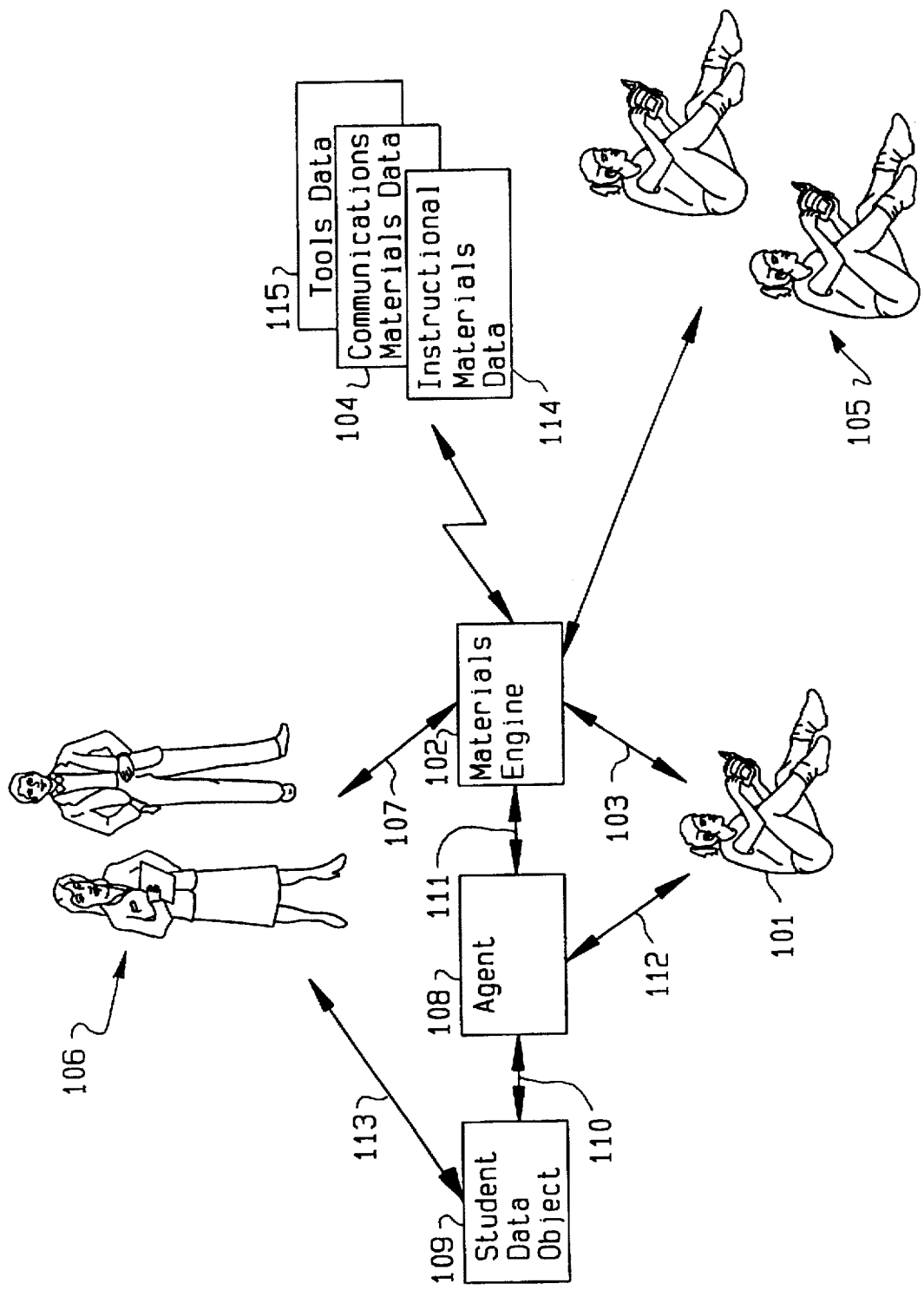
FIG. 1 illustrates in overview fashion the principal functional components of and parties in the ABI system.

Sec. 5.1 presents a general overview of the Agent Based Instruction system. Sec. 5.2 describes the preferred hardware and operating software configurations. Sec. 5.3 describes details of the instructional interface between the ABI system and its users. Sec. 5.4 describes in a general fashion the software structure of the ABI system with subsequent sections describing each component in a more detailed fashion. Sec. 5.5 describes the instructional materials and the tools in a more detailed fashion and Sec. 5.6 describes the agent in a more detailed fashion. Sec 5.6 includes detailed description of the preferred interface between the agent and the materials in the ABI system.

5.1. ABI System Overview

In the following, the systems and methods of this invention are described in the context of a school system, with examples drawn primarily from elementary education. This invention is not so limited. It will be apparent to one of skill in the relevant arts that this invention can be applied at all levels of public and private education, from pre-school through university, and to all forms of commercial or corporate education. In all these contexts, this invention has particular utility in making education and training available at school, at the office, at home, at schools with geographically dispersed students and to students at geographically dispersed schools, and at other types of locations. Further, it will be apparent that this invention can be applied in contexts other than education where monitored interactivity and individualization are to be provided, as in child care or weight loss.

The following glossary contains several terms frequently used in the Detailed Description of the invention. It is presented here as an aid in order to initially introduce important terms that are more fully described and explained in the following sections.

Agent: agent software together with the data it references executing in an ABI system.

Agent Based Instruction ("ABI") System: the novel instructional system of this invention, preferably comprising an agent for responsive, adaptive and individualized instruction of students and a network for distribution of instruction, which projects the personae of the virtual tutor.

Agent Software: software modules that generate responsive, adaptive, and individualized behavior in the ABI system, preferably implemented according to methods from artificial intelligence.

Applet: an executable program fragment advantageously downloaded to a client across the network, in the ABI system applets are particularly used to represent a complete element of on-screen agent actions, or performance, (e.g., a character scratching its head and saying an utterance) and can reference various data snips of animation, sound, and scripting information.

Authoring Tools: programs used by instructional designers to develop materials data, such development includes inserting notations.

Cast: a plurality of persona ("personae") representing the on-screen agent.

Character: an individual persona in the cast of the on-screen agent.

Concept Coach: a possible alternative name for a persona in the cast of an on-screen agent that is suitable for high school and adult students.

Data Snip: an elementary piece of sound, voice, animation, video, or a graphic; data snips can be combined, preferably by an applet, to represent a complete element of on-screen agent action.

Electronic Learning Friend ("ELF"): a generic name for any persona in the cast of an on-screen agent; also a possible alternative name for a persona suitable for middle school students.

Instructional Materials: the components of a course of instruction, such components are selected according to the course and can include prerequisite tests, pretests, lessons, and unit tests.

Materials Data: the content of instructional materials.

Materials Engine: software modules that reference instructional materials data and tools data to present the instruction and the tools to the student.

Meta-request: a student request directly to the on-screen agent, an exemplary request is 'asking for a hint.'

Meta-response: all responses to a student produced by the agent software, as distinguished from presentations by instructional materials, tools and communications.

Network: the hardware and software connecting student client computers to school servers in an ABI system; the network connections can comprise fiber optic links, wired links, or terrestrial or satellite wireless links.

Notations: interface information inserted into materials data that causes the materials engine to send and receive messages from the agent software; preferably notations create standardized interface messages between the agent and the materials.

On-screen Agent: presentation by the agent software on the student's display using such media as sound, voice, graphics, animation, video, or other multimedia modality; this presentation preferably displays one or more life-like personae.

Persona: a character in the cast of an on-screen agent.

Personae: the collective plural of persona.

Student Data Object: data about each student which the agent software references in order to provide responsive, adaptive, and individualized instruction to that student; this data is updated during course of each lesson and is advantageously stored as one object, or alternatively a few linked objects, in the ABI system.

Study Buddies™: a possible alternative name for personae in the cast of an on-screen agent that is suitable for elementary school students.

Tools Data: the content of tools supporting particular instructional materials; tools can include a dictionary a calculator, or an encyclopedia; and so forth, and tools data are the content of the dictionary, the calculator, or the encyclopedia.

Utterance: a text or voiced response by on-screen agent.

Virtual Tutor: the ABI system components acting together to emulate a human tutor; from an individual student's perspective, the Study Buddies™, ELF, or Concept Coach appears as his or her personal tutor.

The following sections of the Detailed Description elaborate each of these terms and describe their connection and interaction so that the ABI system presents responsive, adaptive, and individualized instruction and assumes the form of a virtual tutor.

5.1.1 Functional Components

In view of these objects and advantages, FIG. 1 illustrates the principal actors and the principal functional components in an ABI System. These include, generally, materials engine 102, agent software 108, and student data object 109, all of which interact with student 101 and with teachers and administrators 106 via a computer network described below in conjunction with FIG. 2 to create a virtual tutor of student 101. Student 101 is typically one of many students enrolled in a school or similar institution. Central to the ABI System is the virtual tutor individualized to each student, which formed by the functioning of agent software 108 with student data object 109, which stores characteristics of student 101 and assignments and standards set by teachers and administrators 106. Other actors not shown in FIG. 1 can be relevant in particular applications, for example, parents in the case of primary and secondary education.

Materials engine 102 presents educational content such as instructional units, homework assignments, and testing to student 101. The educational content includes instructional materials data 114, communications materials data 104, and tools data 115 instructional materials data 114 include computer based instructional materials similar to those known in the art but, importantly, augmented with notations for use in this invention. The materials also include various tools 115 appropriate to particular instructional materials, such as a calculator for mathematics, a dictionary for writing, access to on-line reference sources for research, and so forth. Further, materials can also include communication materials data 104, which define and provide communication with other students 105 for instructional purposes. Such purposes can provide, for example, the tutoring of one student by another more advanced student, joint work of several students on one instructional materials lesson as permitted, and educational contests, such as spelling bees. Further, this invention is equally adaptable to other forms of materials that function in the framework of FIG. 1, in particular interfacing to the agent software as indicated by arrow 111, and that are useful in a particular application of this invention. For example, materials appropriate for child care contexts can differ from the above three classes by, perhaps, having different paradigms of interactivity.

The structure and course of interactions 103 between the student and the materials is preferably governed by paradigms of educational psychology and sound educational practice, such as are described in the exemplary reference Englemann et al., 1982, *Theory of instruction: principles and applications*, New York: Irvington Publisher. At the most immediate level, for example, during homework or instruction, student 101 can make requests and receives responses from materials engine 102 and, in turn, materials engine 102 can make requests and receive responses from student 101. The materials engine can adjust its sequence of presentation in response to student responses. At a next level, the requests and responses exchanged between the student and the materials engine can follow several patterns known in the arts of computer based instruction and which, for example, include the following. First, the student can respond to questions presented by the materials engine, and in the course of responding, can ask for advice or hints, the use of a tool such as a calculator, or other relevant assistance. Second, the student can advance to the next item, lesson, or unit upon successful completion of the present item, lesson, or unit. Third, in case of error, the student can request, or automatically be presented with, appropriate repeat, review, or remediation materials. Finally, at a higher level these patterns of interactions can be analyzed to provide more adaptive responses from the system.

Teachers and administrators 106 also interact with materials engine 102 for several purposes, as represented by arrow 107. For example, teachers can customize existing materials by adding additional items, modifying existing items, altering the order of item presentation, changing the notations (see infra.) governing agent interaction, and so forth. A teacher can create particular instances of materials suitable for one class, a group, or even one student. Further, although reporting of student progress preferably occurs by other means, in alternative embodiments the materials engine can directly report student progress to teachers and administrators. For example, this can be done by entering notations that generate messages for the teachers.

Also, instructional designers can create, or "author," materials for use in this invention. Such materials can be original or can be derived from existing textbooks, workbooks or media material. They can employ standardized curricula, pretests such as criterion tests, post-tests, and standardized texts. Authoring instructional materials in a course suitable for interactive instruction typically comprises several steps, including decisions about the objects to display to the student, the sequencing of these objects, and the interactions with the agent. The first step is the selection of objects which carry the education content for presentation to a student. Objects can include visual display items, such as text, graphics, animation or movies, audible display items, such as voice, audio and so forth. They can include input items known in the computer arts, such as buttons to select, Selections to chose from, text to enter, hypertext and hypermedia links, functions to perform with student input, and so forth. The second step is the selection of the sequencing logic for the ordered display of the objects to the student and the educationally appropriate reaction to student requests and responses. The sequencing logic can reference instructional controls set by agent software 108, such as a command to increase example density, and preferably is chosen in light of principles of educational psychology and practice as detailed above. The third step is the specification of interactions with a student's agent or virtual tutor, a key component of the ABI system. This specification is made by augmenting the sequencing logic with "notations," which are referenced, called, or executed by the sequencing logic during object presentation and that communicate with the agent, in a preferred embodiment by exchanging messages. In the ABI system, the agent builds an adaptive model of its student's pedagogic characteristics, in other words the student's cognitive styles, by monitoring the course of the student's interactive instruction. The notations are the means for this monitoring. Finally, in order to make materials available, the authored materials are indexed and stored in the files of the ABI system, preferably on materials server systems.

ABI authoring tools differ from authoring conventional instructional materials in that notations are present in these materials to enable the agent software to update the student data object, to monitor and modify the instruction, student's use of a tool, or a communication task. ABI authoring tools support and facilitate the conversion of existing materials to the ABI instructional format.

As indicated above, an agent unique to each student 101 is important in the ABI system. A student's agent is comprised of agent software 108 in conjunction with a student data object 109 unique to each student. As the agent software monitors its student's instruction, it builds an adaptive model of its student in student data object 109. Guided by this model, agent software 108 acts, first, to manage or control the student's instruction, and second, to directly guide the student in order that the total ABI system can present education to each student in an optimal fashion best adapted to the student's evolving abilities, skills, and preferences. In other words, the agent becomes a virtual tutor by acting as a student's personal and individualized tutor. First, the agent manages or controls instruction of student 101 by directly controlling materials engine 102 in its presentation of materials data 104, 114, and 115 through interaction with the materials engine, as represented by arrow 111. The agent preferably manages or controls the materials engine in two manners, synchronous with materials data presentation, such as when the materials engine encounters an appropriate notation in the data, makes an agent request, and waits for an agent response, and asynchronous with the presentation, such as when the agent software adjusts control parameters which the materials engine references at decision points. Examples of synchronous control are an instructional material asking the agent for permission to allow the student to use a tool, to receive a hint, or to be given remediation, or a communications material asking the agent for permission to permit the student to engage in a particular type of communication with certain other students. An example of asynchronous control is the agent setting of pedagogic parameters, such as coaching parameters that the materials engine uses to adjust its presentation, according to the pedagogic characteristics of the student. Exemplary coaching parameters include the time pacing of exercises, the new concept seeding rate and the density of examples. In this manner, the materials can present interactive instruction according to optimal values of the pedagogic characteristics or cognitive styles of each student as determined from the agent's observation of its student.

Second, agent software 108 directly guides the student by exchanging communication with the student, as represented by arrow 112. Student communication also preferably occurs in two manners, synchronously, in which the student directly makes meta-requests of the agent tutor and receives meta-responses and second, asynchronously, in which the agent tutor itself generates a meta-response in response to some instructional event. Herein, requests and responses are prefixed with "meta" when they are exchanged directly with the agent. Meta-requests include student questions to the agent—for example: How am I doing? What should I do next? Could you say that another way?—or student requests—for example: I need a hint; I need help. The agent responds to each student question or request. Agent meta-responses can be generated, for example, when the student takes too long to complete an exercise, when the student makes a series of repeated errors, or when the student achieves good performance. Agent meta-responses can be drawn from such categories as reminders, encouragements, reinforcements, paraphrases, jokes, progress summaries, and so forth.

Communication with the agent, represented by arrow 112, include direct student meta-requests that generate agent meta-responses. Other communications derive from instructional event messages generated and communicated by augmented notations in materials 104, 114, and 115. An event received by the agent can generate no meta-response at all or alternatively can generate an asynchronous type agent meta-response. At educationally significant points, as the materials sequencing logic presents display objects to the student and receives inputs from the student, the materials data author places one or more notations. When these notation are referenced, called, or executed, important variables and parameters educationally relevant at this significant point are gathered into a message, along with an indication of the type of the educational event. These messages are events which are then sent to the agent. For example, an educationally significant point is the beginning of a new instructional sequence. The corresponding event message can include an indication of the topic to be covered, the expected level of difficulty, the expected time to complete, and the educational paradigm adopted. Another educationally significant point is the receipt of a wrong answer. In response, the materials can generate several messages: a first message can include the time required to make the answer, an indication of the type of error, and an indication of whether the answer is completely wrong or only a near miss; a second message can include text parameters ("say-it" type message) if the agent chooses to make a specific text or spoken comment about the error; finally, a third message can include the screen location best representing the error ("point-it" type message) to use if the on-screen agent chooses to point to the error or move to the location of the error. Another educationally significant point can be a long delay in receiving the next student input, at which point the materials engine can send an asynchronous message indicating the time elapsed. Tools data 115 generate events similar to messages from instructional materials. Communications materials 104 can generate events recording a communication request or an initiation of communication with certain other students for a certain task. In the case of shared work on one materials, communications materials can generate events recording how this student in progressing with the shared materials; in the case of a contest such as a spelling bee, events recording how this student is progressing in the contest with respect to other contestants.

In addition, in a preferred embodiment agent software 108 also receives messages describing the progress of the student through specific instructional materials. For example, in the case of mathematics materials, such messages can include information that the student is making errors in problems requiring finding common denominators. These event message should preferably all information that can be of interest to teachers and administrators for tracking student progress and tracking course adequacy.

It is important that communication between the student and the agent be engaging. Agent communication preferably utilizes all the modalities of input and output available in a particular implementation of this invention, including text, audio displays such as voice and sound, and video displays such as graphics, animation, and realistic movie clips. For example, in the case of a communication triggered by good performance, the agent can select the display of sound and video clips, from a data snips library, that the student finds pleasing. The agent can further make reward graphics available on the student's screen for a period of time. On the other hand, in the case of error the agent can point to the screen location of the error.

Further, it is highly preferable that the on-screen agent can assume various display personae during student communication. Herein, persona means the effect conveyed to the student of the combined and coherent presentation of multiple display modalities to emulate a particular, apparently living, personality. For example, in the case of elementary education, this can be the selection of tone and animation to emulate a pleasant animal or a known cartoon character. In some cases, characteristics of the display persona can be selectable by the student according to the student's preferences. In other cases, the personae can be specified by the instructional materials, the teacher or the administrator overriding student persona preferences. Personae for an elementary school student can be selected from well-known cartoon characters and can perhaps be called "Study Buddies™." Persona for commercial or corporate education can be adapted to the organizational ethos and can perhaps be called a "Concept Coach." Presentations for intermediate levels can be called an Electronic Learning Friend ("ELF"). Even though the ABI system through its network, software and database acts as the student's virtual tutor, from the elementary school students point of view, the "Study Buddies™" are his/her personal tutor. Realism in voice, gestures and movement reinforce this relationship.

Agent software 108 in the ABI system builds an adapting pedagogic or cognitive model of its student in student data object 109 that is independent of the specific materials. Event messages to the agent software from the materials engine preferably include the information from which this model is built. In general, event messages must include such content as is necessary to describe and parametrize the pedagogic or cognitive style models adopted by the materials in an implementation of the ABI system.

In an preferred embodiment, the student data object 109 collects all the permanent data about the student maintained by the ABI system. The data objects for all the students are collected for permanent storage in a database system.

Preferably, this is an object oriented database, although this data can be advantageously stored in standard relational databases. In an alternative embodiment, however, the various subtypes of student data in the student data object can be separated into separate objects and stored in separate databases. In particular, it is possible to store the materials specific progress data separately from the materials independent global student data. Preferably, the student data object is stored as one structured object. Alternatively it can be stored as a plurality of objects, each object of the plurality perhaps storing only one subtype of data.

The student data objects are accessed not only by the agent software 108, but also by teachers and administrators 106. As depicted by arrow 110, the data object is referenced by the agent in order to generate its actions and is updated by the agent as it processes events and student meta-requests. As depicted by arrow 113, the data object is referenced by teachers and administrators in order to track the student progress and to generate reports concerning the students and materials in the ABI system. Teachers also update the data object to enter schedule information for the student's assignments. Administrators update the object in order to enter the courses and materials the student must master and specify standards and criteria the student must meet.

5.1.2 Exemplary Implementing Structure

Figure 2A:
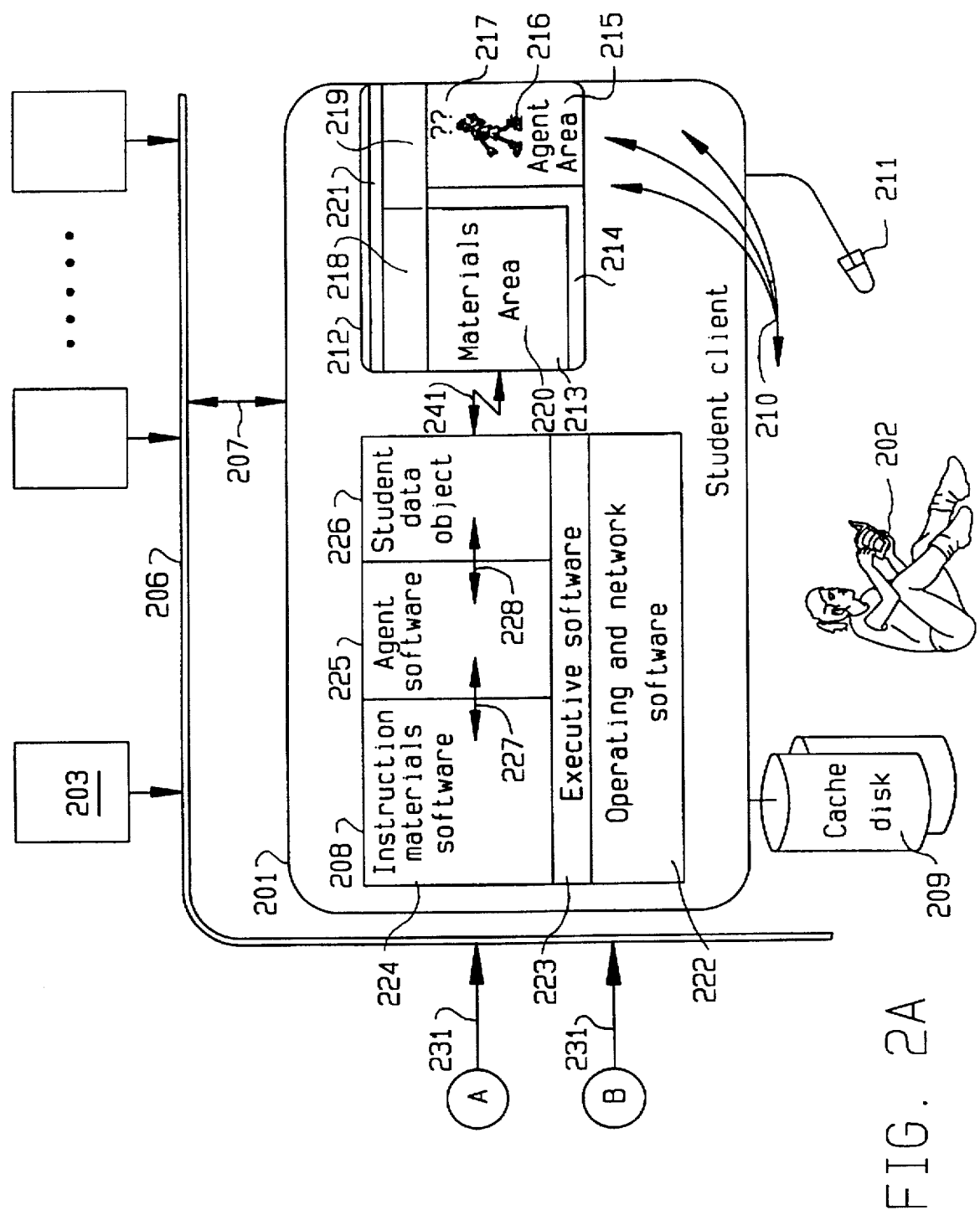
FIGS. 2A and 2B illustrate in overview fashion an implementation of the functional components of FIG. 1.
Figure 2B:
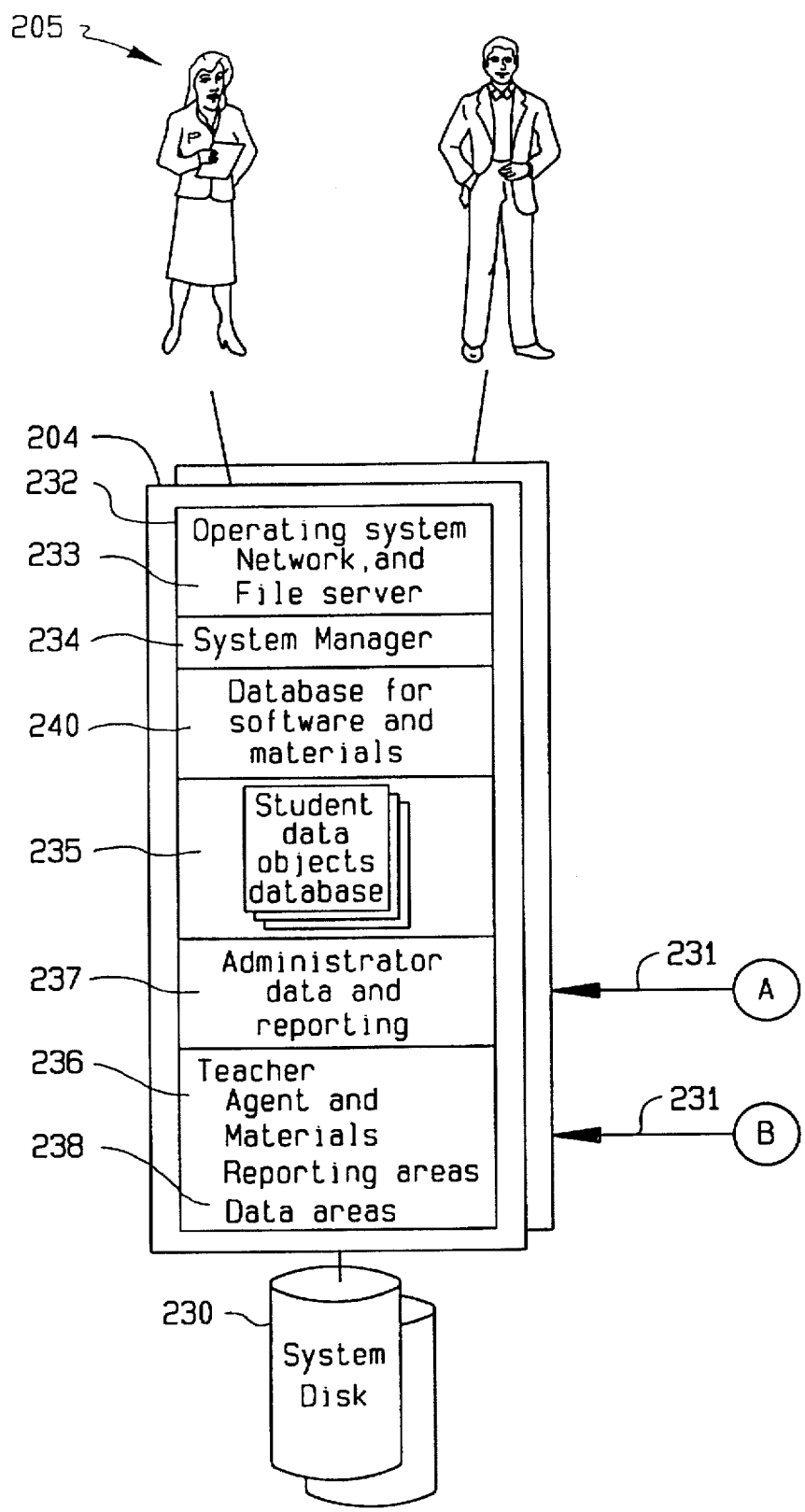

FIGS. 2A and 2B illustrate an exemplary preferred structure implementing the principal conceptual and functional components of the ABI system as illustrated in FIG. 1. A preferred implementation of this invention is based on a plurality of computers interconnected by a network. Preferably, although all system functions can be performed on all interconnected computers, certain computers are specialized for certain functions, such as student client systems for providing student access or system servers for storing system software resources. Therefore, an exemplary preferred ABI system includes one or more student client systems 201, at which student 202 receives instructional presentations including homework. Other student clients are generally indicated at 203 and can be located at school, at home, or at the office. The system further includes one or more servers 204, at which teachers and administrators 205 gain access to the system. Alternatively, they can access the ABI system at their own client computer systems.

These components are interconnected by a network which consists of transmission medium 206 and local attachments 207. Although the network illustrated in FIG. 2A is of a bus-type configuration, as in a local area network perhaps using collision detection or token passing protocols or both, this invention is adaptable to all forms of networks which support adequate transmission protocols, such as those that are functionally similar to the TCP/IP protocol suite, and as appropriate, ATM technology. Thus, the invention is adaptable to networks constructed from switched or non-switched links to a central server, which can be configured of several LAN attached server systems, to networks including CATV cable or optical links, to networks including radio links either terrestrial or satellite, and to public or private packet switching networks.

A preferred public packet switching network to which this invention is adaptable is the Internet. ABI system nodes can be linked to the Internet in any convenient manner known to those skilled in the art and can include security boundaries (known a firewalls) to prevent unauthorized access. Alternatively, an ABI system implementation can be an "intranet," that is a network constructed according to TCP/IP protocols but using private links of the types enumerated above, and as appropriate, ATM technologies.

In more detail, student client system 201 includes memory 208, which is RAM type real memory or a virtual memory based on RAM type memory and a backing store. Preferably, to reduce size and cost, the client system has no permanent disk storage. When available, a preferable student client can be a low cost network computer ("NC"). A NC is a computer with processor, RAM, and network interfaces sufficient to access intranets or the Internet. A NC is preferable in cases when high-bandwidth network access is available. In cases of low-bandwidth network access, the client system can have one or more disc drives 209 which can be used as a pre-fetch buffer or a read-only cache. The disks preferably are magnetic, although in a less preferable embodiment they can also include CDROMs. This optional capability serves to enhance communications efficiency in cases where the network has relatively low bandwidth. Large files can be downloaded in advance of a student session or the student client can cache read-only data across sessions obviating the need for downloading such files. Such caching requires the operating system components to maintain some form of version control of the read-only data. In any case, the student data object, which contains all permanent and read-write student data, is stored between sessions on a server. This permits a student to access the ABI system services from any available client system at any time by simply downloading the student data object to that client system.

The student interacts with a client system using any appropriate interactive input/output ("I/O") modes 210. For input, standard devices include pointing devices, such as mouse 211 or a trackball, age appropriate keyboards, optionally speech recognition, and so forth. Speech recognition will permit brief conversations with the "Study Buddies™," or other personae, in limited areas. The invention is adaptable to special input devices appropriate for particular groups, such as the handicapped, and to devices yet to be constructed. Virtual reality ("VR") interface devices such as VR gloves and VR display helmets can have immediate applications for special needs students. For output, preferable devices include computer display 212, for displaying objects such as text, graphics, animation, and video, and audio output devices for voice and sound clips. The audio and voice can be constructed from data snips stored as digitized sound files in libraries. Alternatively, voice can be synthesized from text. The invention is also adaptable to special output devices for special classes of students, e.g. the handicapped, and to new devices being developed.

FIG. 2A also shows an exemplary screen layout for a student client that exemplifies the principal functions of this invention. The screen is preferably partitioned so that principal components of this invention are displayed; and important student actions are represented by icons or buttons. Thus, the screen includes materials and tools area 220 to the left, agent area 215 to the right, and a system toolbar 218, which includes a student customization area 221 at the top. The size of the screen partitions illustrated preferably change from time to time in response to student customization or display requirements. In particular, either the materials area or the agent area can enlarge, perhaps up to the entire screen as needed. Materials area 220 is for the instructional materials, tools, and communication materials to present visual display objects and for these components to receive interactive input. This area is further subdivided into display region 213 and a materials specific toolbar 214.

On-screen agent area 215 is for the on-screen agent to receive meta-requests and to display synchronous and asynchronous meta-responses. Also illustrated is an exemplary on-screen agent consisting of a single persona 216 and a meta-request icon 217. The persona can move to other screen areas as required. Both these components are illustrated as appropriate for elementary education. Other visual appearances would be appropriate in other situations. The system area at top includes toolbar 218 for selecting particular available system components. In particular, always available on this toolbar are selection icons 219 for the calendar and scheduling tool. Part 221 of the system area can be reserved for student customization, for example for the display of reward graphics "given" to the student by the agent or virtual tutor.

Functionally illustrated in FIG. 2A is an exemplary memory organization of a student client system when a session is in progress with materials being presented. Layer 222 comprises operating software and network communications. This software provides, among other services, support for I/O devices attached to the client, a file system with cache control, lower level network protocols, such as TCP/IP and ATM, and higher-level network protocols, such as HTTP V2.0. Basic shared ABI system capabilities are provided by executive software 223. The executive software verifies student identity and access authority, establishes communications sessions with the system servers as required during client start-up, downloads from the student object database the student data object corresponding to the student in session at this client system, downloads instructional materials scheduled for this student, and download executable software required from the systems servers as-needed. The instructional material and the software are read-only and are not changed. The student model is updated by the agent during the student session and modified parts are uploaded to the student database on a server for storage. Such downloading can utilize higher level network transfer protocols, or alternatively, directly use lower level network protocols.

Agent software 225, certain parts of student data object 226, and certain instructional materials software 224 have already been downloaded. The materials are displaying objects in screen area 220, forwarding events to the agent and receiving agent management or controls, as indicated by arrow 227. The agent is displaying its persona(e) in screen area 215, interacting with the materials, as represented by arrow 227, and is referencing and updating data in student data model 226, as represented by arrow 228.

Finally, the student client system further includes standard components not shown, such as a microprocessor and input/output interfaces. Alternative implementations of the student client system are within the scope of this invention. In particular, student client system function can reside on a server system. Further, the client system can be implemented as two machines, wherein a first machine performs substantially all the computations and a second machine is for student interaction and sends student input and receives display instructions from the first machine.

The ABI system further includes one or more server systems 204 of FIG. 2B with sufficient large capacity discs 230 for storing all student data objects in the student database, all instructional materials, and all software used in the system. The network is used to distribute the software, student data objects and instructional materials form the servers. In alternative embodiments, there can be more than one server with software and data component storage divided as convenient across the servers. In a further and less preferred embodiment, the server can be a central host system. In comparison to the client systems, servers preferably have increased performance and higher speed network connections 231 in order to make this stored data quickly available to the one or more student client systems. Access to the body of student data allows teachers and administrators to track student performance by class, grade, subject, school and so forth. This statistical data is also input into agent processing.

The server systems are preferably configured as shown in FIG. 2B and are loaded with software 232 providing the following function. First, there is operating system, network services, and file server layer 233. In addition to the functions of layer 222 in the client system, layer 233 also provides a file server facility including file backup and version control. System manger 234 includes facilities for access control, authenticating student access requests and limiting file access to authorized users. For example, students can be limited to only their personal files; parents to their children's files and curricular related data; teachers to files and student data objects for their classes; while certain administrators have unlimited access. The system manager can also maintain any necessary system logs. Student data object database 235 is explicitly illustrated. Student data objects reside on the server systems when the associated student is not in session. These objects contain the data which is the source of all teacher and administrator reports, data by which these staffs schedule student courses and assignments, and data representing the pedagogic model of the student used by the agent software. Instructional materials databases 240 and directories of executable software also reside on the server systems. When group communications is in use, agents and communication tasks monitoring the groups can reside on the servers. The servers also contain areas 237 for administrative data and for reports and report software of interest to the administrative staff. Finally, the servers contain teacher areas 238 for data and report software of interest to teachers.

Further, certain instructional materials can be made available specifically for the teaching staff, along with an individualized teacher agent acting as a virtual tutor for the teachers. The facilities of the ABI system can be used to simplify teacher familiarization and system training. For example, such teacher training can be user instruction in the ABI system itself, or can be teacher versions of student materials designed to assist the teacher in his/her use and customization (in the nature of today's teacher versions of textbooks). Further, there can be teacher specific tools, for example, to assist in generating student reports and class management. In this case the server system contains special instructional materials and associated teacher data objects 236 for performing this instruction. Client systems for teacher access have agents unique to individual teachers.

Alternatively, the flexible server structure of the system permits administrative and teaching staff to perform their specific tasks on any computer system with enough computing resources to support these tasks. As for student access, necessary system components are downloaded from servers to these temporary client systems. Thereby, these personnel are not limited to sessions on server systems. Further, materials authoring can be done on server systems, client systems, or on separate systems not interconnected with a given ABI system. To make authored materials available, they are transferred to and indexed in the appropriate server system databases.

Alternative implementations of the functions described for the student client systems and the server systems are also within the scope of this invention. For example, it is known to those of skill in the art that by the use of various technologies, such as remote procedure calls or messaging, the functions pictured here as grouped together and on one system can be divided and distributed if needed.

5.2. System Hardware and Operating Software

The system elements illustrated in FIGS. 2A and 2B can be constructed on standard hardware platforms meeting the requirements discussed in this section.

5.2.1. The ABI System Network

The utilization of a network is central to the ABI system. It is important that students or teachers be able to access the ABI system from any adequate client system anywhere at the school, at home, and when away from home, as in distance learning. Networks permit students and teachers to participate at more than one school, and, further, permit delivery of homework and instruction to remote locations. In each case the client system must access student data objects, instructional materials, and ABI software from the network.

Access to all system components is typically provided from ABI system servers attached to the network. It is preferable, to use a single large network server in place of several smaller network servers. In all cases, it is preferable to store the updatable student model objects on server systems, in order that they can be downloaded to whatever client system a student accesses. It is also preferable to provide read-only software and read-only instructional materials from server systems. The advantages over local storage of these elements at client systems include simplification of version control and of access control. The student is freed from insuring the client system accessed has all the necessary software and manually transferring if not. Also server storage provides greatly reduced client system storage requirements, in view of the large amount of software and instructional materials in ABI systems. However, in systems with limited communication bandwidth, it can be preferable to cache recently used software and instructional materials in order to shorten response times.

Networks suitable for an ABI system can be of any configuration and protocol that meets the system's client-server communication and object transfer requirements, where the client is either a PC or a network computer ("NC"). Suitable networks can be private or public. The preferred ABI network in the case of PC clients, according to current technologies, is an intranet running the TCP/IP protocol suite and utilizing ATM technologies as appropriate. In one implementation, utilizing a single large server, such a server can be directly connected to the intranet or Internet. In another implementation, utilizing several smaller servers, these servers can be connected into a cluster by a LAN, preferably an Ethernet LAN. In this case, the ABI network is built from a local Ethernet LAN with remote connections to telephone lines using 28.8 Kbps modems, or other network links. In an alternate implementation, the network can by visible to the public Internet if adequate security systems (firewalls) prevent unauthorized access. This can make wider access available at lower cost than by switched telephone remote connections.

The ABI LAN can be further connected to other ABI LAN's and to other networks, such as the Internet, by standard use of routers and gateways. An exemplary protocol for an ABI System network is TCP/IP supplemented with a client-server protocol such as HTTP and object transfer protocol, such as a multi-format mail protocol. ATM technologies are used as appropriate. Remote clients are expected to be indirectly connected to the ABI network. These connections can consist of routing over a public network or direct dial-in connections. These connections can be of either low-speed or high speed. The ABI system can be implemented on networks such as @Home (Mountain View, CA), which use a combination of ATM, cable modems, TCP/IP and other technologies. The ABI system can also be hierarchically configured on new network topologies for distance learning in areas with limited communications infrastructure. Primary central servers with ABI software and instructional materials communicate with remote secondary servers over broadband satellite communication systems. Student clients connect to the local secondary servers through wired or wireless means.

5.2.2. The Client System

Considerations governing the choice of client hardware and operation software are described next and are followed by a preferred client node system according to today's technology. These consideration depend on the content of an ABI system and the facilities of technology. As the content of a system changes and as technology evolves these consideration dictate that the preferred system will change.

The client hardware consists of client input/output ("I/O"), client CPU and memory, and client network access. Turning to the client I/O requirement, standard input devices such as keyboard and mouse, or other pointing device, are preferable. Color graphics output capability adequate to support partial screen animations is preferred. Sound generation and output are preferable on ABI client systems. Text-to-speech conversion can be done either in software or in hardware. When economically available, full video capability, for example by providing video decompression hardware such as MPEG decoders, and speech recognition, for example with hardware assists, are also preferable.

The ABI system is also adaptable to special I/O devices appropriate to special student groups, such as the very young or the handicapped. These include, for example, simplified keyboards, touch panels, VR devices, and so forth.

Client memory must be sufficient to contain resident operating system components, resident ABI executive software, and dynamically loaded segments of the student data object, instructional materials, and code. High performance CPU's together with high performance graphics hardware and memory is preferable to enable more advanced presentation effects.

In embodiments where part or all of the ABI software is implemented in special languages, hardware or software assists for these language are preferable. For example, where such a special language is JAVA™ (Sun Microsystems, Mountain View, CA), JAVA™ chips, which enhance performance of the JAVA™ interpreter, are preferable. The ABI client node in certain embodiments can be a JAVA™ enhanced network appliance adapted to Internet Communication access and the HTTP V2.0, or equivalent client-server protocol.

It is preferable to eliminate the need for permanent data storage devices, such as hard disc drives, by downloading all client software for each session. This allows the use of low cost 'network appliances' as student client computers. However, for those clients with lower speed network access asynchronous downloading can be used. Storage devices such as hard drives can be preferable for prefetching or caching of read-only software components in order to reduce start up time. To download 4 megabytes of software using, for example, a 28.8 Kbps modem takes over 20 minutes. In the case of caching on student client, standard version control methods known in the art are necessary to ensure that only up-to-date software and materials data are used. If an element is found to be out-of-date by querying a server, the current version is downloaded. The student data object is not be cached between sessions since it can be accessed from other client systems.

Client communication hardware can be adapted for either local or remote attachment. Local access requires network access hardware; remote access requires a communication capability. This invention is adaptable to lower speed access over switched telephone line services, preferably using 28.8 Kbps modems or ISDN interfaces (64 or 128 Kbps). These bandwidths are adequate for sessions with materials using only voice and limited animations. Prefetching and caching can be required to make fullest use of other materials at this bandwidth. This invention is also adaptable to high speed access over any available high speed links, such as T1 (1.5 Mbps), T3, ADSL telephone lines, or cable modems (several Mbps), or other means of high speed access. These bandwidths permit full access to materials without limitation. If economically available, high speed access is preferred. With greater communications bandwidth, the on-screen agent can appear more life-like.

Standard client software includes an operating system and communication software. The operating system preferably has interfaces to client I/O devices including communications capability and network access, such as a TCP/IP stack. ATM interfaces are present if necessary. Preferably, it also has means for establishing sessions with servers, for providing file server services, and means for security as specified shortly.

The implementation language or languages of this invention preferably have several features related to the implementability, maintainability, and extensibility of ABI. The implementation language preferably provides a degree of modularity similar to that provided by object-oriented programming languages. It preferably provides means of dynamically loading across a network and executing additional software segments during program execution. It preferably provides means of accessing all input devices and of controlling the output devices in a high level display object fashion. It preferably provides a threaded or multiprocessing capability. Less preferably, this invention can be implemented in any computer language, including assembly language.

In view of these needs and in view of the current technology, a currently preferred client system is a IBM type PC with a Pentium™ 120 Mhz processor, 16 MB memory, a 1 GB disk drive, a Soundblaster compatible sound card with speakers, a medium performance graphics card such as a Diamond Stealth card with 2 MB of graphics memory, an Ethernet card or a communication card and a 28.8 Kbps modem, and standard keyboard and pointing device such as mouse. The operating system is Windows™ 95 with network services provided by a World Wide Web browser equivalent to Netscape 2.0 or better and capable of running Java™ applets. Java™ together with standard system and graphics classes is the implementation language.

5.2.3. The Server System

The primary function of the server systems of this invention is to store databases of executable software elements, of student data objects, and of instructional materials. The latter two consist of heterogeneous and structured elements.

These elements can be stored in a relational database such as supplied by the Oracle Corp. or the Sybase Corp.; they can be stored as specialized data files; or they can be stored in an object-oriented database system such as ObjectStore (Object Design Inc., Burlington, MA). The operating system of the server nodes must support whatever database systems are selected as well as network and application server software to access the databases. Application database server software of this invention preferably provides database access and version control and downloads database elements on client request.

The preferred server hardware and software can vary widely depending on the number of clients to be simultaneously served. This number can vary from 20 at one school to more than 5000 across an entire school system. The number of servers and database distribution across a server cluster can be adjusted by means known in the art to satisfy projected peak loads. A suitable medium performance server system can be configured on a high end INTEL Pentium or DEC Alpha system with adequate memory and disk space. Windows™ NT is an adequate server operating system, and Internet server software similar to that from Netscape is adequate for network access. The preferred database is an object oriented database such as ObjectStore. In this embodiment, application database access uses a common gateway interface ("CGI") program also providing database access and version control. The CGI access program can be implemented in C++, a suitable object oriented programming language capable of accessing interfaces to ObjectStore databases.

5.2.4. ABI System Security

Security and access control present additional client and server requirements which are importantly part of an implementation of this invention. Security and access control can be maintained by careful selection of management policies, security software, and security hardware. These elements are described in this section in the order of authorizing and controlling access, operating system and network security requirements, and implementation language issues.

In a preferred embodiment, the primary means for authorizing and controlling access are passwords. System management of passwords preferably includes ensuring that user passwords are secure, not easily guessed, and are periodically changed. This invention is also adaptable to any other means of access control, including for example, passive and active identification cards and recognition of certain personal characteristics, such as voice. Access protection can be preferably provided by limiting access to system resources—database and file—based on a user's password. For example, access protection can be implemented in the CGI application access programs.

The operating system in clients and servers of this invention is preferably of a tested security level. This base security can be enhanced by a variety of techniques and tools that can provide increased levels of security for additional investments. Such techniques and tools include firewall machines, that is dedicated network gateways that filter incoming and outgoing packets according to content criteria, and monitoring software, such as tripwires, that observe system events for suspicious combinations. Further, encryption can help protect sensitive and valuable data from illegitimate access by those without the key. Encryption in hardware and software can be provided according to methods known in the art, such as the Rivest-Shamir-Adelman (RSA) public key algorithm or the data encryption standard private key algorithm.

For those embodiments and materials data that download executable code segments, the implementation language importantly should address the security exposures thereby created. For example, a malevolent and knowledgeable user can create or modify the downloaded code to perform illegitimate operations within the client system or access restricted information from the server. The Java™ language is preferable in these embodiment because it now significantly addresses these problems and further improvements are constantly being made. Examples of Java™ security measures include limiting access to client system resources, particularly the file system and network connections, preventing downloaded software from 'spoofing' local software, and providing byte-code verification to test code for possible security violations. Any implementation language for an ABI system preferably offers similar or improved security features.

5.3. The Instructional Interface

The ABI system has interfaces for students, teachers, and administrative staff. Materials and software developers can have specific ABI system interfaces. Alternatively, such development can occur on separate systems followed by indexing and loading of the developed components into the appropriate databases.

5.3.1. Student-System Interface

This section describes the structure and design of the student-system interface. This description is directed to the currently preferred implementation of this interface by a series of visual display screens. However, this invention is not so limited, and adequate alternative technologies, for example voice output with speech-recognition input, can be used to implement this design.

5.3.1.1. Exemplary Student Screens

During materials presentation, a student sees screens of one or more screen types, all formatted in accordance with the previously described design principles. Screens are structured as a hierarchy of areas and subareas with text, graphical, animation, and perhaps video objects displayed in the subareas. Objects can either be for display only or permit student input or interaction.

An important screen type is a task screen. Task screens are used for materials presentation tasks such as homework assignments including problems, programmed steps, mastery quizzes, and drills. Table 1 and FIG. 3 illustrate exemplary components of a task screen appropriate for elementary education. Reference numbers in Table 1 are from FIG. 3. In general, in system area 302, the session manager presents objects visualized as icons permitting the student to easily access ABI system facilities. In materials area 304, object presentation including description, placement and movement, is specified by the materials designer in the presentational and sequencing sections of the materials data. The materials engine interprets these specification at run time to send display objects for display. In agent area 303, agent behavior processing formats predefined parametrizable objects, including resolution of object parameters, representing selected agent personae. The output from all selected and formatted display objects is sent to the executive software and operating system for ultimate display to a student.

TABLE 1

STUDENT SCREEN DISPLAY ELEMENTS

| REF NO. | NAME OF ELEMENT | DISPLAY OUTPUT OBJECTS |
|---|---|---|
| 301 | Screen | Entire ABI display area |
| 302 | ── System Area | |
| 305 | ── Customizable | Graphics and text (can be animated) |
| 306 | ── File System | Book icons with titles |
| 309 | ── Scheduling Toolbar | |
| 307 | ── Monthly Calendar | Graphics |
| 308 | ── Clock | Dynamic graphics |
| 310 | ── Toolbar | Icons of tools (for calculator, word processor, dictionary, communication, etc.) |
| 304 | ── Materials Area | |
| 311 | ── Open Book | Graphics of book outline |
| 312 | ── Section Tabs | Graphics with text |
| 313 | ── Exercise Area | Text, graphics |
| 314 | ── Header | Text, graphics |
| 315 | ── Presentation | Text, graphics, animation, video |
| 316 | ── Input | Interactive objects (buttons, etc.), filling in text, dragging, drawing |
| 321 | ── Navigation Buttons | Graphics |
| 317 | ── Student Action | Icons for Submit, Help |
| 309 | ── Sched./calendar | Graphics for calendar with text of student schedule, icons for scheduling options |
| 303 | ── On-screen Agent Area | |

TABLE 1-continued

STUDENT SCREEN DISPLAY ELEMENTS

| REF NO. | NAME OF ELEMENT | DISPLAY OUTPUT OBJECTS |
|---|---|---|
|  | -- Audio | Synthesis of spoken utterance |
| 318 | -- Text Message | Text utterance |
| 319 | -- Visual Persona(e) | Appearance integrated with audio, graphics background effects Interaction with other screen areas |
| 320 | -- Agent Request | Agent meta-request icon, generates pull-down menu of meta-requests |

In more detail, the task screen of FIG. 3 includes in system area 302 student customization area 305. In the customization area, the student can display objects given by the agent as rewards for student accomplishment. These objects can include text, as illustrated here, graphics, or animations. Another part of the system area is file system toolbar 306 displaying accessible files as icons in a "book-on-shelf" metaphor. This invention is adaptable to other reasonable file system display metaphors. Here, for example, the book icons represent a file personal to the student, a file holding ongoing instructional materials, a file of email, and files for tools such as a dictionary and group activity. Below file system toolbar 306 is toolbar 310 for tools the student has access to. Illustrated here are icons for a calculator, a word processor, communications, and starfish, a general purpose language tool.

"Starfish" are a visualization tool for semantic networks that can be available in an ABI System. A semantic network typically consists of nodes linked to other nodes by semantically significant and named links. A starfish tool visualizes such a network for a student by displaying the node centrally in the body of the starfish with the node's links displayed as arms of the starfish. For example, a dictionary represented as a semantic network might include a node for each word with links to similar words, opposite words, root words, and so forth. A dictionary starfish displays a word in its body. Each selectable arm is labelled with a category—synonym, antonym, pronunciation and so forth. Clicking on an arm causes the corresponding word(s) to be displayed or spoken. Such a tool provides integrated display of diverse knowledge structures for a student.

The scheduling/calendar tool is an important tool that is always available. Exemplary icon 309 illustrated for this tool has calendar part 307 and clock part 308. Selection of each of these parts brings up daily and monthly scheduling functions. These function can either prescribe the student's next activity or permit choice where the student has excess time or demonstrated personal scheduling ability.

In materials area 304, instructional materials, tools, and communications materials display their content. Illustrated in FIG. 3 is page 3 of an exemplary mathematics homework. Instructional materials are advantageously structured as a book of exercises and items, emulating current textbook and workbook practice. In this case, section tabs 312 permit the student to navigate the homework book by sections, and page buttons 321 permit the student to navigate the homework book by page. Also present is toolbar 317 of available student actions, which for homework includes submit and can, if the agent permits, include help and hint requests. The format of a materials page is advantageously standardized. An exemplary standardization has header information 314, presentation 315, and interactive input area 316.

On-screen Agent area 303 allows the student entry of meta-requests and allows the agent to display synchronous or asynchronous meta-responses. This exemplary area illustrated in FIG. 3 comprises meta-request button 320 which the student can activate to display a list of currently available meta-requests. The remainder of area 303 is for agent meta-responses, which importantly have multi-media structured into personae. Illustrated are text message 318 and visual persona 319 that typically includes animation. Also possible is audio output, either text-to-speech or generated from audio files.

Figure 4:
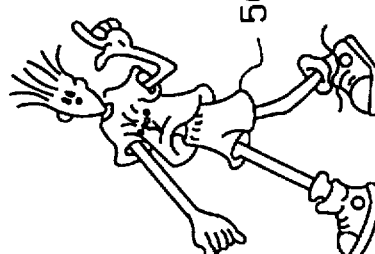
FIG. 4 illustrates in more detail exemplary screen interaction between the on-screen agent and the instructional materials of the implementation of FIG. 2.

FIG. 4 further illustrates an exemplary screen interaction between the materials and the agent. FIG. 4 shows only the content of materials area 501 and on-screen agent area 502 of the complete display screen of FIG. 3. A mathematics homework material is displaying item presentation 503 with input selection buttons. The student has selected wrong input button 504. At this educationally significant event, the materials send to the agent several messages generated by notations in the materials data. In response, the student's agent has chosen to act as illustrated. First, it displays text 506 of the rule violated by the student answer. This text was sent to the agent by the materials in an event message for its use. Second, the on-screen agent points 505 to the screen location of the error. This location was also sent to the agent by the materials. Third, perhaps in response to a previous high or increasing error rate of the student, the on-screen agent presents a meta-response 508 commenting on the pedagogic nature of the student's error. Further, it activates a persona 507 to engage the student's attention. This persona can advantageously include animation, audio, and speech output of the displayed text. Thus, the agent software integrates speech utterances, visualization, display of text and graphics, and animation into a persona display for highlighting an educational event that the agent determined important based its processing of the current input, past student inputs in this lesson, and the student's pedagogic model generated over several sessions.

Other screen types are of importance in an ABI system. For example, tools can have distinctive screen types appropriate to their nature, such as a calculator image. Choice screens can be used at the transitions between instructional sequences. They summarize what instructional materials have just been completed, announce status information, and list any materials choices now available to the student. These choices can related to instructional materials to be undertaken next or to optional, non-instructional materials, such as exchanging credits for time in a game room, access to e-mail, and so forth, that can be available to the student.

5.3.1.2. Student Actions

The inputs of a student or other user of the ABI System are preferably classified as requests, meta-requests, or data. A student request is an input directed to materials or to the system seeking a specific action. Student data is an input responding to a system request for information. For example, student requests include an input to the system to start the calculator is a request, or an input to certain materials to submit completed homework to the teacher. However, input of numbers into the calculator is data. This invention is adaptable to a further particular type of data input, termed semiotic, in which the student selects certain signs or symbols to provide input. Semiotic input is particularly advantageous when the agent requests the student to report his feeling or appreciation for a particular educational event. Meta-requests are inputs directed to the agent seeking specific actions. For example, student input to the agent seeking hints during the current materials is a meta-request.

Displays produced by this invention are preferably classified as applications, responses, meta-responses, or questions. Application display occurs upon system initiation of an available material, for example, an instructional material or a tool. .Application display usually occurs in response to a student request, but can also occur on system initiative. For example, the agent can request the system to make a tool available to the student. Responses are all displays produced by materials or by the system. For example, responses include materials presentation display and display on the adequacy or correctness of student input. Meta-responses are all displays produced by the agent. These can be synchronous, generated by responses to a student meta-request, or asynchronously, generated by events sent to the agent from the materials. Questions are a particular form of response or meta-response which seek further student input. Questions engage the student in a form of a dialogue which is an integral component of the tutoring interaction.

Figure 5:
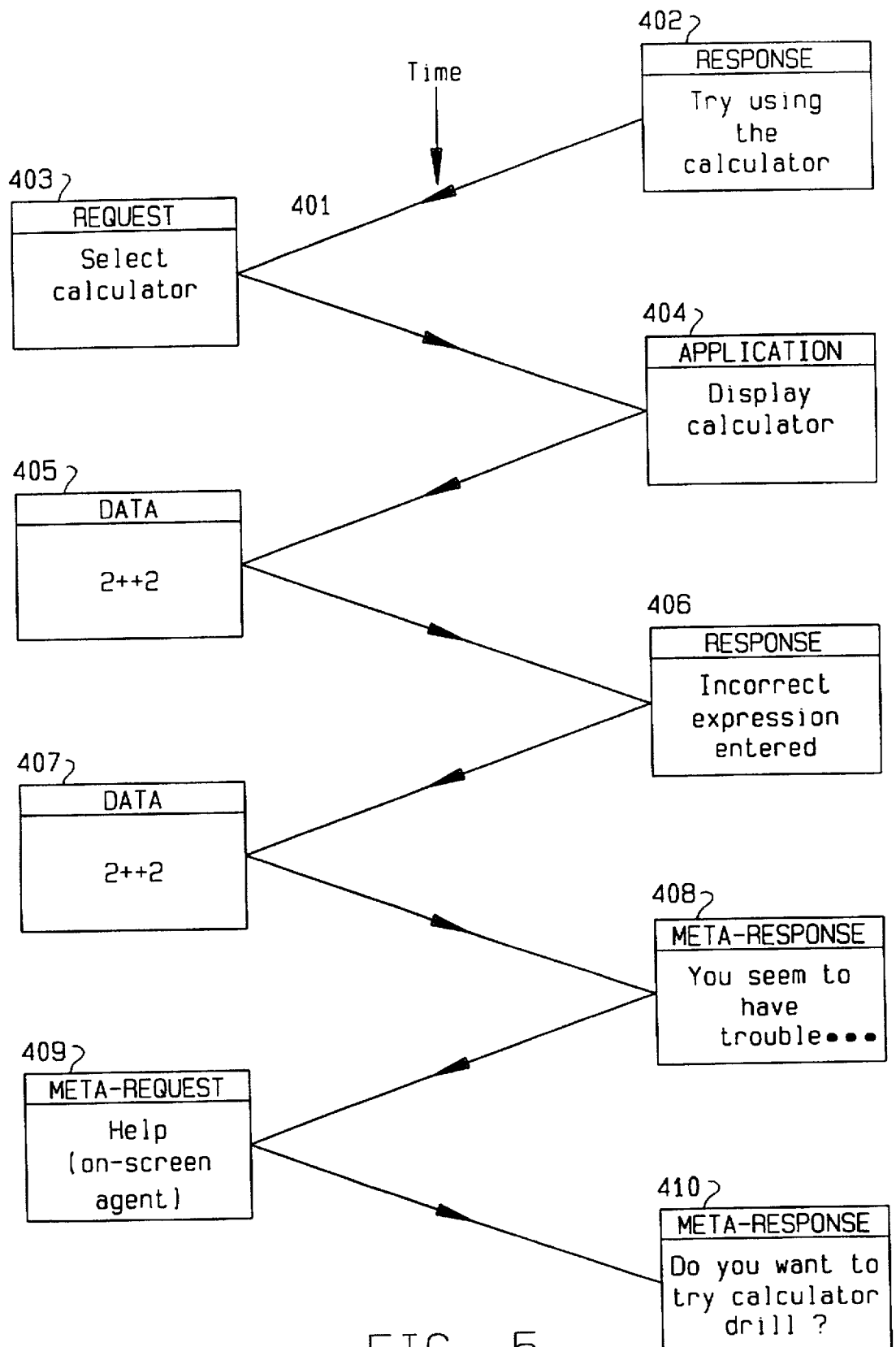
FIG. 5 illustrates an exemplary interaction of a student with the ABI system implementation of FIG. 2.

FIG. 5 illustrates an exemplary segment of the interaction of the student and the system that can occur during a mathematics homework. It illustrates both how responses and requests are distinguished from meta-responses, and meta-requests and also how the agent, through its observation of the student's current situation and its contact with past student history, is able to guide the student better than the materials alone, which are only aware of the current context. This display is individualized to the student's current and past performance and preferably uses realistic, life-like on-screen personae to engage the student. Displays from the ABI System directed to the student are indicated generally on the right; inputs from the student directed to the ABI system are indicated generally on the left; and time increases downward. The diagonal arrows, as at 401, indicate that the message at the arrow's tail leads to the message at the arrow's head.

This illustration begins with response 402 from the mathematics homework materials suggesting that the student use the calculator tool. The student responds with request 403 which selects the calculator icon to request the calculator. Calculator application 404 is then activated and displayed by system components. Data 405 is a student input to which the calculator tool, and response 406 indicates a student error. This response was apparently not sufficiently informative, and data 407 is a repeated incorrect input to the calculator tool. The student's agent observes the course of this interaction as the calculator tool sends event messages to the agent. Upon observing the repeated wrong input, the agent intervenes with a asynchronous meta-response 408 summarizing recent student inputs. The student responds with meta-request 409 to the on-screen agent for help, since the tool responses were apparently not sufficiently helpful. The agent's synchronous meta-response 410 suggests for consideration an entirely different approach to correct the student's recent error.

5.3.1.3. System Responses

The following general principles preferably guide system and materials responses and agent meta-responses. First, some display is to be made on every user input, if only to echo a character or mouse click. Second, a user is never to be left in doubt about the status of current tasks. For example, the system preferably provides task specific hints or suggestions if no user input is received in a time period adaptively determined. Third, all responses reflect the current context.

Further, importantly, aspects of system responses should be adapted to the particular student audience, from elementary to adult education and including special classes of students. This tailoring can be set by the teaching or administrative staff. One adaptable aspect is the language level and the language of system responses—for example, the vocabulary and language of help services, messages, and tutorials—is preferably adjustable. Another important adaptable aspect is the type of personae of the on-screen agent is preferably adjustable. The types of encouragement, level of jokes, and so forth, depend closely on the intended student population and are advantageously adjustable. Further, tools are also adaptable. Each tool is also advantageously enabled or disabled for each student. Mail and communications tools, for example, can be made unavailable for the lower grades. File creation and deletion can require strict controls. Also, certain tools can have differing complexity levels suitable for differing student levels.

In addition, certain ABI system components have particular preferable and advantageous features. These are listed subsequently. Importantly, meta-response selection is preferably shaped in view of the student's past baselines of speed, performance accuracy, modality, as specific to the type of materials. Moving average functions, in which recent values are given higher weight than earlier values, can be used advantageously to generate baselines of performance and timing. The timing of meta-responses is preferably based on student data object fields that record the amount of help asked for in the past and past performance provided.

Further, the pacing of meta-responses is advantageously context sensitive. For example, remediation should be offered only in case of repeated error or hints offered asynchronously only after a relatively long period without an answer. Also, previous student interactions should be utilized. Repeated requests for hints should be noted and dealt with perhaps not with another hint but with remediation. The rate of prompts, advice, and hints should be adaptively adjusted on the basis of ongoing performance records.

The actual content of meta-response can be adjusted to the current situation by filling in parameters from event messages sent from the materials. See infra.

Preferable Calendar/Scheduler Responses And Their Selection

The calendar scheduler is advantageously capable of providing the following responses. These are controlled by schedule data contained in the student data object and are processed by the calendar/schedule tool.

1. Schedule reminder responses, which remind the student of deadlines for materials tasks in the system or for external activities, such as getting a parent's approval for a class outing.

2. Task sequencing suggestion responses, which suggest an order of assigned tasks based on student history and on the assigned priority and deadline.

3. Timing estimate responses, which estimate how long a task will take based on timing information entered as part of task in the instructional materials and on past relative performance for this student.

In one embodiment, the ABI system provides for of scheduling initiative to be divided between the student and the system. Settable task schedule parameters permit, at one extreme, the student to have complete scheduling control, able to initiate and to exit any activity at will, and limit, at the other extreme, the student to work on only those materials that the system schedules. These schedule parameters include those controlling the tools and options available to the student while performing a given task and those requiring the student to perform background reading or remediation. Important initiative parameters include the scheduling values of task priority value and deadline. If the priority and date are not both "off", those tasks with greater priority and earlier deadline are automatically scheduled for the student. If these values are "off", the student has control of task scheduling.

The system of this invention also includes a central list of timed activities, perhaps stored on the server systems, to be performed by the system. These can include regular times for the generation and printing of standard reports or for the broadcasting messages concerning group activities such as spelling bees. These timed activities can be performed by scheduling software which compiles the timed activity lists and initiates the listed activities at their listed times. Such scheduling software can be similar to the "at" utility in UNIX operating systems.

5.3.2. Teacher/Administrator-System Interface

The teacher or teacher's representative plays an important role in the ABI system. The teacher uses the system to perform such functions as entering initial profiles in student data objects, assigning students to subgroups, previewing, annotating and scheduling assignments, reviewing and commenting on completed homework assignments, and reviewing summary reports.

The agent of the student is also an agent of the student's teacher in that the student's teacher controls key parameters in the student data object, which in turn controls agent actions. The teacher customizes the ABI system by setting student data object parameters, assigning and prioritizing assignments, and customizing materials. Important teacher activities are included in the following list.

1. The teacher initializes and exercises continuing control over important data in the student data object, and in this manner supervises the student's use of the system. For example, the teacher controls the access and level of tools available to the student and limits the extent to which the student can alter agent personae.

2. The teacher controls the student's use of the ABI system by assigning, scheduling, and prioritizing the student's access to the materials. This is accomplished by teacher control over the Schedule subtype in the student model object. For example, the teacher can schedule tasks that must be completed on the ABI system, schedule non-system tasks, remove tasks or modify their priorities.

3. The teacher can customize materials available to the students. The extent of routine customization includes modifying sequencing of instructional lessons, elements, and items, choosing the homeworks the student must complete, specifying the formats of homework assignments having some student discretion, such as reports, sending messages to students.

4. The teacher's class management is aided by a facility to send messages, reminders, hints, etc. to students using the ABI system e-mail facilities.

The system can advantageously assist the teacher in homework management. Once the student completes and submits a homework assignment, a printed copy can be made for the teacher and the student. The homework assignment can be graded by the ABI system, if answers were provided as part of homework material. The teacher can add comments for the student, if homework is viewed online by teacher.

The system can advantageously also provide the teacher with summary and detail reports for each student and class. These reports can be immediately available online or printed for later review. As known in the art, reports can contain both current and cumulative data on instructional progress and homework assignments. The reports can also flag patterns of deficiency in a student's homework and problems in a student's instructional progress. In a preferred embodiment, these reports are generated from the database of student data objects on the server systems.

Additionally, the teacher can be a student. A teacher can benefit from training in the use of the ABI system in general, in the procedures to customize materials, and in the characteristics of the particular materials used in that teacher's class. This training can advantageously be packaged as instructional materials directed to the teacher which are otherwise similar to student instructional materials. In this case, the teacher, like the student, has accessible materials, a teacher data object recording the teacher's progress and pedagogical characteristics, and an agent using this data object to guide the teacher's training and guide the teacher in the use of the system.

Other actors, such as school administrative staff, parents, and researchers, can play a role in the ABI system. Administrative staff can have privileged access to certain data items in the student and teacher data objects and other system data, which permits them to assign students to courses, to assign students to teachers, and to establish instructional performance standards and criteria which the students must meet to complete their materials. This staff can also receive online or paper reports on the progress of students in the schools, the effectiveness of teachers, and the usefulness of the particular materials assigned.

Reports and queries

Generation of reports from databases, either relational or object-oriented, is a standard programming task. The key elements of this task are the selection of data to appear in the report, the way in which selected data is to be presented whether in a summary form, a detail form, or both, the format in which the data is output, and the layout of data output elements on the screen or page.

The teacher and administrators require several types of reports. Periodic reports need to be generated at regular intervals. These vary according to population: by student, by class, by grade, by school. They also vary by subject. The reports can present/summarize complete sets of data or only data exceeding stated limits. Some of these reports fulfill mandatory reporting and record keeping requirements, and some are sent to parents. The ABI system also provides teachers and administrators with standard querying and report generating capabilities.

If appropriate, parents can also be actors in an embodiment of the ABI system. A student's parents can be given access to certain fields in their student's data object in order that they can receive rapid information on their child's assignments and performance. This information can be made available at home on the same client system that their student receives instruction and homework.

Finally, educational researchers can receive certain access to ABI systems in order to research the effectiveness of educational theories and methods. For example, they can efficiently compare the effectiveness of various educational paradigms in certain instructional contexts by receiving reports relating to students pursuing materials constructed according to the paradigms of interest.

5.3.3. Instructional Designer-System Interface

Designer Interface Overview

Materials, in particular instructional materials, are authored by instructional designers. Authoring of materials can be done on the system on which the materials are to be used, or alternatively, on a separate system. Generally, an instructional designer authors materials including, for example, computer assisted instruction as known in the art, computer assisted exercises such a homework or simulation, and computer managed student instructional tasks which can involve work with several materials. For all materials, the student's agent must be informed of the sections completed and skills acquired in standard formats.

Designer Interface Details

The ABI system provides an environment in which the student's agent is available to control materials presentation and guide the student to improve educational outcomes. This environment includes facilities to present assignments, assess responses, probe for prerequisites, offer assistance with tools such as dictionaries, and score unit mastery quizzes. The system can advantageously include conventional forms of homework, such as worksheets, as well as new types of homework, such as group-based homework, and formats previously too time consuming for teachers, such as criterion based rather than fixed length or interactive rather than prescriptive. Advantageously, the system structure can accommodate existing forms of computer assisted instruction by embedding such existing instruction in materials of this invention which contain notations and generate agent event messages.

All authoring information below can be provided by the instructional designer, if preferred. In this case, defaults allow the teacher to enter only overriding information where needed. Alternatively, the teacher can be allowed or required to make various degrees of customization. In this section, the term "exercise" means a single unit of an instructional task.

The run-time conversion of materials with descriptions of text, graphics and animation advantageously is performed by methods commonly used in interactive multimedia Authoring Software. Existing authoring programs let the author specify the attributes and behavior of multiple independent display objects through such programming paradigms as visual programming or scripting languages. For example, to display a button or other selectable object, a user of authoring software specifies such characteristics as position, attributes such as size, shape, color, and label, and the function invoked by the object selection.

Among the most widely used of the many available products are Macromedia's Authorware and Director, Asymetrix's Multimedia Toolbook and Aimtech's IconAuthor. These programs have been documented by their manufacturers and other writers (Sims, *Authorware with Style;* Swearington et al., *Macromedia Director Design Guide;* Hill, *Using Multimedia Toolbook* 3.0).

The process of authoring an instructional task is advantageously described sequentially to include the steps of, for example, defining the task, defining each exercise, judging student inputs, defining exercise completion, and augmenting the materials with notations for the agent.

In the authoring step of defining the task, the instructional designer advantageously provides information including initial instructions for the entire task in a written and preferably also a spoken format with alternative wordings as necessary for special classes of students. The designer also provides materials sequencing in accord with the education paradigm chosen. Instructional sequencing is appropriate for interactive instruction with feedback. Homework sequencing can include a fixed order; a student defined order; a student defined order assisted by teacher prioritization into such priority groups as essential, important, or optional; and sequencing defined by performance to criterion on individual item subtypes.

In the authoring step of defining each exercise, the instructional designer advantageously provides information including the following. The designer chooses names for this task and exercise, its prerequisites, and the skills to be acquired in accordance with school system standards so that the agent can meaningfully track student performance and provide helps, hints, and remediation. Next, the designer provides student instructions for the exercise, preferably in both spoken and written formats. Next, the designer specifies the presentation of the exercise by creating graphics and text for the exercise and by specifying their display attributes. Next, the designer defines allowable user inputs, the data type of input, and the display areas in which input is allowed. Finally, the instructional designer provides hints. Hints preferably include optional hints offered on student request or student inactivity and hints offered by the agent in case of totally inappropriate actions.

In the authoring step of judging student inputs, the instructional designer advantageously provides information including the following. First, the designer defines standards for the completeness of requested inputs and actions, possibly none, in case of incomplete inputs. An exemplary such action is suggesting the completion of omitted inputs. Second, the designer selects how inputs are to be judged and the possible judgements, for example, correct, near miss, incorrect, and so forth. Finally, the designer selects error responses to individual input elements or an entire exercise. These responses can be uniform or can reflect the specific wrong answer. Error responses include retry policies and selection of remediation paths. Remediation can be item sequencing options given on the basis of retry outcome.

It is preferable that response judging be performed according to certain standards established for a particular implementation of this invention. Thereby, the agent can monitor the student's pedagogic characteristics in a uniform fashion across all standardized materials. Accordingly, a first step in input judging can be, where appropriate, checking the data type and perhaps range of an input. For example, checking that a fraction is entered in response to a fraction addition problem. Appropriate feedback can be given if the wrong data type or range is input. Single student inputs can include entry of a single text or numeric element, movement of a single display object, selection of a single display object, or drawing a line or curve perhaps encircling a display object.

A second step in input judging can be classification of a suitable input in standard error categories. In an exemplary embodiment, this can be performed by providing a pattern corresponding to a correct answer. The patterns can be a template appropriate to the suitable input, such as a text template or a spatial template. A pattern matching procedure selected from a system library of such procedures can be executed to match the input to the pattern. The output of the system matching procedure is advantageously selected from a limited number of standard judgements of correctness and partial correctness. This judgement is then communicated to the agent in an event message in order for it to guide its student and adapt its pedagogic model. This invention is adaptable to templates and pattern matching procedures known in the art. Patterns can include one or more parametrized text templates, spatial templates defining the relative positions of objects to be moved by the student, selection templates specifying patterns of selections. Further, spatial templates can include outlining areas of the screen, shapes of drawn objects, maze traversal, and tool inputs.

Turning to the authoring step of defining task completion, the instructional designer advantageously provides information including standards for input, exercise, and task completion. The materials can require a certain minimum completion before allowing homework submission to the teacher.

The final authoring step is augmenting the materials with additional notations for the agent. These notations concern task and exercise subject, skill classifications, and definition of the educational paradigm embodied in the sequencing logic. It is performed by instructional designers or knowledgeable teachers, and is expressed as notations in the materials that generate event messages for the agent and that reference control parameters set by the agent for control of materials sequencing. The notations so entered communicate various types of information to the agent. Exemplary types include characterization of assignment by type of task, subject, elements of subject covered by task; comparison between exercises in same assignment by similarity and difficulty; the subject matter prerequisites to determine what the student may or may not have mastered based on which exercises are answered correctly; system knowledge prerequisites; and scheduling information such as average and expected time to complete.

5.4. ABI System Software Structure

This section describes in a more detailed fashion an exemplary structure for the software components previously described in a more general fashion with reference to FIG. 2. Subsequent sections describe particular components in an even more detailed fashion. The structure described here is exemplary. This invention is adaptable to other structures with other allocation of the functions of this invention to different modules. Such alternative structures are easily designed by those of skill in the arts.

This section first describes the principal client software and data components and the conceptual hierarchy which reflects their interaction. Next, the structure of the executive software is described. Finally, the flow and processing of events through the system are described.

5.4.1. Student Client Software Structure

Figure 6:
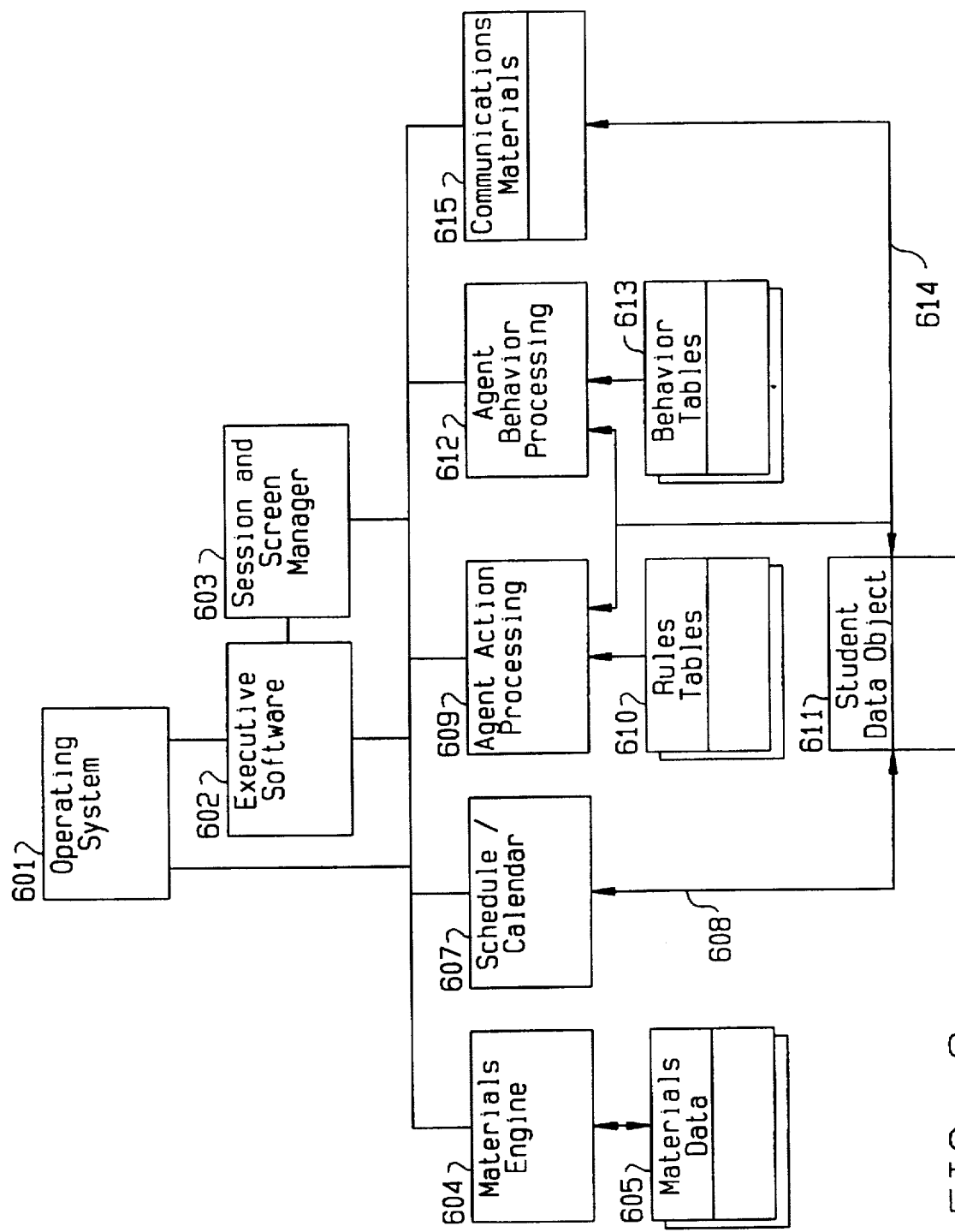
FIG. 6 illustrates in more detail the software components and hierarchy in the implementation of FIG. 2.

FIG. 6 illustrates the principal client software and data components and the conceptual hierarchy which reflects their interaction. The links illustrated represent principal procedure cal or class dependencies among the components. At the root of the hierarchy is operating system 601, which has been previously discussed in connection with the preferred client hardware. The operating system ("OS") includes the operating system proper together with implementation languages and their class and function libraries with associated controls. At the next level is executive software 602 ("ES"). This software collects a number of components which customize the operating system to the requirements of this invention and also extend it, if needed. For example, all OS task creation is processed through an ES task control facility to insure that the student accesses only permitted materials. The ES software also provides a preferred animation facility and controls client startup.

Session and screen manager 603 is always present on a client system. This component partitions the screen into the areas for the principal system components, as has been generally illustrated by the exemplary screen of FIG. 3, and controls the system area, area 302 in FIG. 3. Thus, upon student selection of an icon presented in the system area requesting the ES to start the function represented, it turn checks with schedule/calendar 607 whether the student is currently permitted to access this function before continuing with OS task creation. The system manager also presents whatever reward graphics and animation the student has been granted access. These functions are performed by calling the object level I/O facilities of the OS and ES.

Also always present on a client system is student data object 611 for the student in session on the client. This object, preferably containing all the permanent read-write data in the ABI system relating to the student, is downloaded from the server student database when the student logs onto the client. Preferably, this object is divided into subtypes, and those only those subtypes referenced are downloaded as required. In an alternative implementation where the permanent student data is stored in more than one object, each object is downloaded from its database as required. As indicated by double headed arrows 608 and 614, various ABI system components reference and update data items in the student data object.

Schedule/calendar component 607 is important for management of the student by other system actors, such as teachers and administrators. It is a tool that is always active whether or not it has a screen presence. Activities for the student, represented by activity description, priority, and deadline, are entered into the schedule/calendar data subtype of the student data object by teachers or administrators. Optionally prerequisite information can also be entered into the schedule/calendar subtype. This component uses this schedule/calendar subtype data as well as the time expected for the student to complete an activity, as determined from the student's past performance also stored in the student data object, in order to determine whether certain activities, such as particular instructional materials, should be automatically started by the ES without any student intervention. In cases where the student is permitted greater initiative, the schedule/calendar can permit OS task creation requested by the student, as by selecting an icon. This component also provides, on request, prioritized lists of tasks for the agent to present to its student when the student asks for advice on what to do next. It uses priority and deadline information and time-for-completion data computed using data in the instructional materials and student data object.

The materials are represented in the ABI System by materials engine 604 and materials data 605. As previously described, the materials data comprises objects for display output or student input, sequencing logic controlling object display, and notations which when referenced by the sequencing logic during object presentation generate event messages for the agent. Materials data is advantageously grouped into "entries" comprising those objects, logic sections, and notations related to the display of a single screen or a few screens related to a single educational item. The materials data also preferably include a special header or initialization entry with important notations that communicate to the agent the educational paradigm adopted by these materials and can inform the agent of the control variables to which it is responsive. Such header or initialization messages are also preferably sent to the agent if the materials change their education paradigm. In a preferred embodiment, there is one common materials engine 604 which presents a plurality of materials data 605. In alternative embodiment, there can be specialized materials engines for various classes or types of materials data.

Materials engine 604 downloads the entries of materials data 605, interprets the sequencing logic, displays objects as requested, and references embedded notations generating the requested event messages to the agent. Standard facilities of the OS and ES are used for object presentation and for routing any input to the materials. Input is processed according to specifications in the sequencing logic. In a preferred embodiment, the agent controls the materials by setting shared global variables which the sequencing logic checks. Such shared global variables can be made available by OS interprocess communication ("ipc") facilities, such as shared memory. The materials engine can be any program implementing these requirements, in particular an extension of available commercial authoring tools and engines, such as Macromedia's Authorware.

In an alternative embodiment, the materials are not separated into an engine and a data component but consist of one unitary component for each material. In this embodiment, a process similar to compiling creates a single executable materials component. This invention is equally adaptable to other implementations of the materials that generate agent messages and are responsive to agent control according to the requirements outlined herein.

Agent processing is divided into two components, agent action processing 609, which determines agent display actions in response to events, and agent behavior processing 612, which transforms display actions into displays of personae to the student. In a preferred embodiment, agent action processing is rule based and event driven. Rules in rules tables 610 are evaluated using parameters both communicated in event messages from the materials or the student and retrieved form the student data object. These rules propose candidate actions and then weigh and select a final set of agent actions from the candidates, which are communicated to subsequent agent behavior processing 612. Agent processing also sets global variables for materials sequencing and control. A side effect of this processing is the updating the student data object with information from the materials event message.

Agent behavior processing 612 constructs an on-screen agent display based on the actions determined in agent action processing. In a preferred embodiment, this processing is based on behavior tables 613. Utterances, text or voice, and affects are selected from tables based on the determined final actions and refined with parameters included with the actions. The utterances and actions are sent to the selected agent persona object, which creates the agent display of the selected personae using the utterances and effect selected. Data is referenced and updated in the student data object by this processing, in particular fields reflecting the student's agent personalization choices, such as the desired personae, and fields reflecting recent agent behaviors.

Also illustrated is communication materials 615. These materials manage and provide resources for various group activities, such as student tutoring, group work with particular materials, and group contests.

5.4.2. The Executive Software

The executive software ("ES") collects together a number of components which customize the operating system to the requirements of this invention and, if needed, also extend it. ES software implements common and special facilities. Exemplary common facilities include task control, communications, and I/O facilities; exemplary special facilities include a preferred animation facility and a client logon and startup facility. In a preferred implementation, ES software is built as frontends, wrappers, or extensions to available OS software components. For example, certain facilities can be implemented in C or C++ and directly call OS interfaces, such as the Windows™ graphics device interface or its extensions. Other facilities can be built as classes using available implementation language libraries, such as the packages in Java™ 1.0. Yet other facilities can be provided directly as part of software packages, such as the display I/O functions present in commercially available authoring packages.

The task control facility manages the startup of system components. First, it verifies that the student is permitted to activate a requested component by checking schedules and priorities with the schedule/calendar tool. Indirectly, the student's agent can be queried to determine if this activation is reasonable. Next, if permitted, this facility manages the loading of required software and data objects from server systems. Finally, task control then starts up the component by making any necessary OS calls. Task control also notifies other system components at task terminations.

The communications facility manages network communications and provides whatever client-server or file server protocols are not present in the OS. Such protocols might include HTTP V2.0 with URL name resolution. It maintains all necessary network sessions, including sessions with the three major classes of servers, student data object servers, instructional material servers, and executable software servers. Data snip libraries can reside on any of these server classes. In alternative implementations these servers can be on one or several physical server systems. Finally, this facility handles all remote access requests for information including requests for downloading and uploading.

The I/O facilities includes input and output display handlers for object level display I/O. The display handlers receive object level requests for text, graphics, video and audio and translate them into whatever interface is supported by the OS. The input handler receives low-level inputs from the OS input handlers and processes them according to the current screen format. In certain cases, it can directly call the output handler to perform immediate feedback actions, such as highlighting or dragging an object. In other cases, it can pass I/O event messages in an appropriate format to the system component owning that screen object, for example, the on-screen agent. The output handler receives object presentation specifications, such as system owner, position, characteristics, size, any animation information, and whether the object is an input focus, then updates any necessary screen mapping, and generates OS requests to display the object. An example of such an object specification includes a selectable text field object with specified contents, perhaps scrollable, displayed by a particular instructional material.

Exemplary specialized ES facilities are animation and client startup. It is preferable that the client system support animation, which is a connected and timed sequence of displays potentially calling on all display modalities available, and other timed presentations. Although this invention is adaptable to any suitable animation facility, a preferred facility presents a script based interface.

The inputs to an animation facility are scripts which comprise object display commands, the timing of the object displays, an input specification of how any permitted user inputs are to be handled, and the types of events to be returned to the initiating system component. Examples of display events include user input causing script branching and termination or interruption. The animation facility receives a script from another system component, requests downloading of necessary display objects, for example from data snip libraries, interprets the timing specification, and sends request to the input and output handlers.

The ES startup facility is described herein with respect to a student client to run on a network attached computer. Startup is similar for other client systems, including teacher and instructional designer clients. Each component of the ABI system must be downloaded from a server when needed, if as is typical, no component of the system is resident on a client prior to startup. The initial step involves the student accessing any client attached to an ABI network. Accessing can involve as little as powering-on the computer and requesting startup of the system on this client. Preferably, accessing by a student user begins by accessing the server with the system manager, for example, using a standard intranet browser which can be resident on the client or downloaded by a power-on bootstrap process. The student logs on to the system manager, which then performs authentication, for example, by means such as password or identification card. Upon successful authentication, the system manager downloads and starts the ES. The ES then initiates necessary communication sessions, including those with the system servers, and then downloads the session manager software, subtypes of the student data object, the agent software, and the scheduler/calendar tool software. The session manager presents the student display in a form depending on student preferences in the student data object and receives input from the system area of the display. The schedule/calendar in cooperation with the agent then determines what materials the student is to be presented with or can select from. Finally, the materials data and engine are then downloaded and the substance of the student session commences.

Presentations of personae or merely appropriate coherent responses can be created from audio and video display objects downloaded from a server and referenced upon demand. These display objects, or data snips, can be linked into groups corresponding to the particular presentations. Further, these linked groups can include small pieces of code that allow for a branching and interactive short meta-response. Thus, one meta-response can include opportunities for student input with the next display object being chosen in response to that input. Each of these groups is catalogued and referenced as that persona behaving in a particular manner.

5.4.3. System Event Processing

The ABI System on the student client, and on other clients, is advantageously organized to wait for student and timer input events and then to respond appropriately to these events. This is common current practice for constructing interactive systems. However, this invention is adaptable to practices that might be developed in the future for constructing interactive systems as long as the principal system components and their mutual interactions as previously described can be represented in such a future practice.

Figure 7:
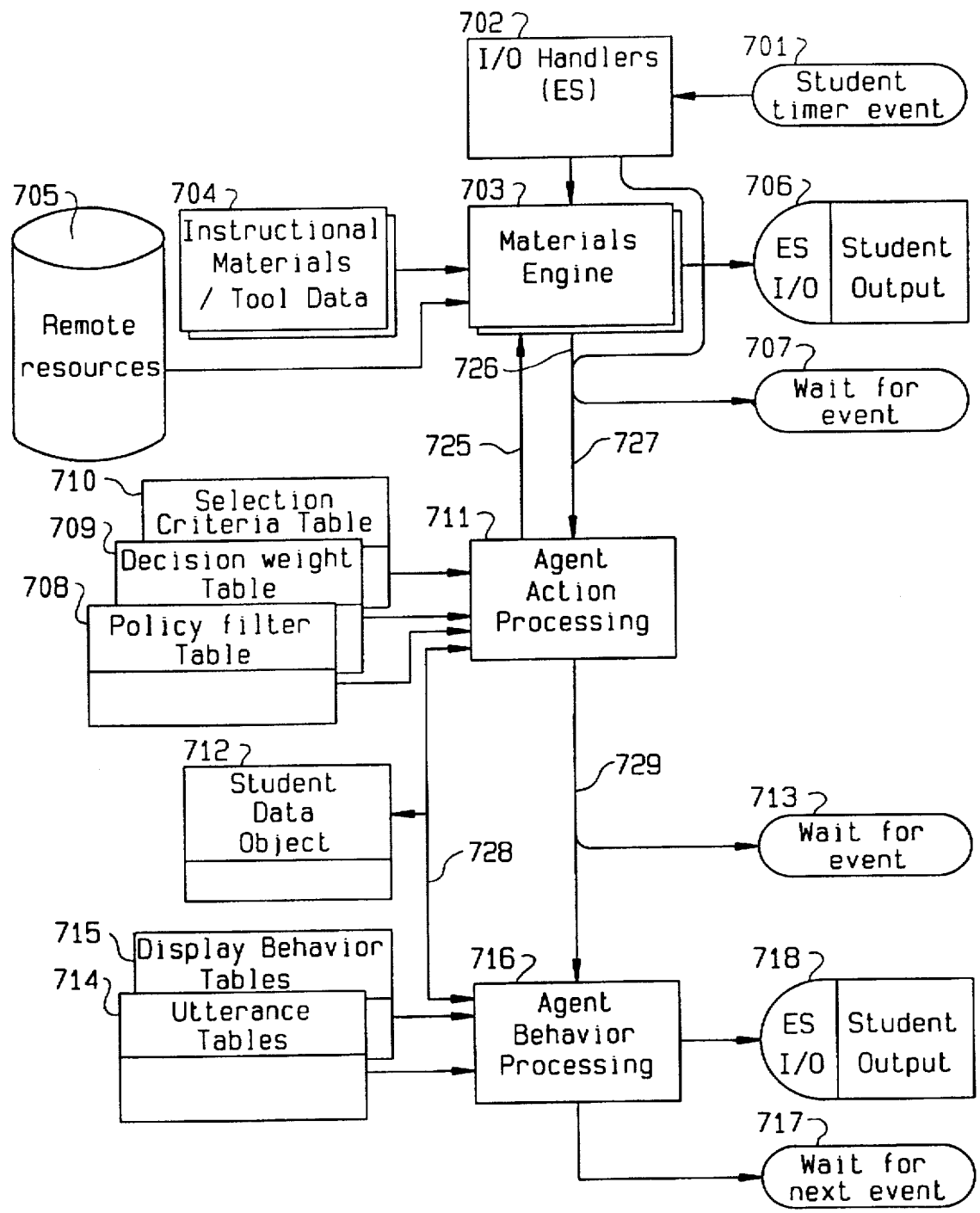
FIG. 7 illustrates exemplary message flow through the implementation of FIG. 2.

With reference to FIG. 7, this section sequentially describes the system processing of an input event and its consequences from initial input until the system waits for the next event. This description provides detail of how the system components communicate with each other and of how information and control flows through the system. More detailed description of the individual components appears in following sections.

FIG. 7 conceptually illustrates control flow and event processing in a student client. Generally, at the left of this figure is relevant data; in the center is processing steps; and at the right are I/O events. As is apparent from the context, the arrows in this diagram represent either data references or control flow. The control flow is at times implemented by information bearing messages and at other times effected by standard ES and OS system calls. Further, this figure is directed to the processing of those components that interact with the student's agent. Those components, such as the session manager, which do not interact with the agent can be constructed according to standard interactive techniques (see, e.g., Petzold, 1996, *Programming Windows® 95*, Microsoft Press, Redmond WA).

Thus, at wait point 701 the system waits for the next student input or timer event. This wait commences at wait points 707, 713 and 717 after the system completes processing of the previous event, or possibly after system startup. Upon receiving an input event, ES I/O handlers 702 decide whether the event represents an action without significance for other system components. For example, the event can be a student action causing only the highlighting of an object or a timer event directing an animation. Such events can be entirely processed by the I/O handlers, and system waiting resumes at 701. If the event represents a student request for the materials engine 703 or a meta-request for the agent 711, the I/O handlers format it appropriately and communicates it to the correct component owning that input object. If the event represents a time interval set by one of the materials engines or by the agent, it is formatted and passed to the requesting component. In the case of group work, the event can be generated on a remote computer system and transmitted over a network link in order to reach the local I/O handlers.

The I/O handlers format event messages into the format expected by the component they are directed to. They include in each message an indication of the type of student action or time interval along with any input information from the action. One input event can generate several events messages.

Herein, messages directed to materials engines 703 are considered first; messages directed to agent action processing 711 are considered second. Although FIG. 7 illustrates two materials engines, one engine or more than two engines are possible on a system from time to time. Regardless of the number of materials engines present, event messages are communicated to the correct engine. The materials engines 703 process a plurality of read-only materials data 704 representing instructional materials, tools, and communication materials. As indicated by arrow 725, these engines also access control information determined by agent action processing 711. This control information can be accessed in any convenient manner, such as by an exchange of messages or by referencing parameters stored in a shared memory region. This information controls the materials engines at educationally significant points during their materials presentation. Optionally, materials engines 703 can also access remote databases 705 and other remote resources available through the system network. The engines use these two sources, and optionally three sources, of input to cause presentation 706 to the student of, for example, an instructional lesson, a homework exercise, an instructional tool, or a joint educational contest. This presentation uses the I/O handler of the ES and OS to generate actual student display.

As indicated by arrow 727, the materials engines also generate messages directed to agent action processing 711. At educationally significant points during materials presentation, notations in the materials cause the engines to format a message to the agent. These messages also include an indication of event type and relevant data, perhaps including timing data. One student input can generate several agent messages. At points which are not educationally significant, the materials can not generate agent messages. Thus, the system can wait again for the next student action at wait point 707 if the previous student action had either no input significance for the materials or agent or no educational significance for the agent.

However, if messages have been sent to the agent, agent action processing 711 is activated. In the preferred but not limiting embodiment, this processing is table based. Rules from policy filter table 708 are evaluated in view of the data included in an incoming event message and in view of data on the student's past performance and the student's pedagogic model in student data object 712. For example, comparisons with student history are needed to determine relative performance. These rules propose candidate agent actions. Next, rules in decision weight table 709 and in selection criteria table 710 filter the proposed actions into a final list of agent actions. These final actions can cause the update of the information in student data object 712 with data on the student's current performance and behavior, as indicated by double headed arrow 728. They can also make available control information for the materials, as indicated by arrow 725. Finally, and importantly, the actions can include display actions for causing visible agent behavior. The list of final display actions is sent to agent behavior processing 716. It is possible that no visible agent behavior is appropriate and that the list of display actions is empty. In this case the system waits for further student input actions at wait point 713.

Agent behavior processing 716 processes the final list of display actions communicated from agent action processing 711 in view of utterance tables 714, display behavior tables 715, preferences and the record of recent agent behavior in student data object 712 in order to generate a coherent display of the on-screen agent personae reacting to the previous actions. The final actions select utterance templates which are completed with parameters contained in the actions. The personae from the display behavior table selected according to the student preferences use these complete utterances to generate display objects, and perhaps animation scripts or applets, which are sent to the I/O facilities of the ES for final display 718. Agent behavior processing also updates the student data object with information concerning this current behavior.

Having completed all possible processing of the student input action, the system now waits at wait point 717 for the next student action or time interval.

5.5. The Instructional Materials And The Tools

This section describes a preferred embodiment for the instructional materials, the student tools, and communications materials. In this embodiment, the materials have a uniform structure, being defined by materials data which is used by the materials engine to appropriately generate displays and perform functions. This uniform structure permits a uniform handling of the interface between all the materials and the agent. In alternative embodiments, certain tools and the group communication materials, for example, can be advantageously separately implemented as separate programs that themselves maintain the necessary agent interface. Such certain tools include a calculator, a dictionary, an encyclopedia, and group communications. In further alternative embodiments, each instructional material could be a separate program that also maintained the necessary agent interface.

This section first describes the general structure of the instructional materials and then describes the tools typically available on an ABI system.

5.5.1. The Instructional Materials

In a preferred embodiment a common materials engine interprets specific materials data to perform instructional and tools functions. These are described with reference to instructional materials with adaptations needed for the other materials noted. Turning first to the materials data, in the preferred embodiment it includes three principal sections for presentation items, sequencing logic, and notations. The presentation items include whatever is displayed, preferably represented as display objects, which can be parametrized. These display objects can be packaged with the materials data or can be downloaded from a server on demand. The notations contain additional data related to the materials display. These include, for example, prerequisites, links to related material, expected student performance, and help and hints. The notations are preferably generated from templates referencing parameters from the materials data and student performance inputs. The materials engine uses notations to generate messages to the agent, which comprise one part of the agent interface. The sequencing logic is executable or interpreted code that animates the particular materials. It references all data in the particular materials to cause the ordered display of the presentation items and to send messages to the agent according to the notations.

The materials data is advantageously grouped into entries, each entry representing a minimum item of presentation, which can, however, involve several screens. These entries are preferably specialized at least into a header or initialization entry and the other entries. Table 2A illustrates a typical materials header entry which is the first entry processed when the materials are initialized.

TABLE 2A

| HEADER ENTRY | | |
|---|---|---|
| Instructional Header Entry Presentation items | Sequencing Logic | Notations |
| | Global variables; Global functions; Local variables; Local functions; | Prerequisites for materials; Reference to other materials or standard texts. |

TABLE 2A-continued

HEADER ENTRY

| Instructional Header Entry Presentation items | Sequencing Logic | Notations |
|---|---|---|
| | | Agent initializing information including: meaning of global variables; education paradigm adopted available helps, tools |

This header has several particular features. The sequencing logic for the header frame consists largely of definitions of variables and functions. The global variables are shared between system components and include the control variables that the agent sets and that the sequencing logic references and tests in order to be guided by agent control. These variables, which comprise another part of the agent interface, for example, can control the time pacing of instruction, the new concept seeding rate, the density of new examples, the time pacing, or the difficulty of discriminations. Local variables are available to the sequencing logic during materials processing. Global functions are those global system functions that can be called by the sequencing logic. Also, dictionary lookup, spell checking, or encyclopedia lookup can be globally implemented and shared. In a Windows™ environment, the global functions can be DLLs. Finally, local functions are available locally to the sequencing logic. For example, in a scientific calculator tool, computations can be local functions. For a further example, in instructional materials the local functions are available for checking user inputs for correctness, scoring quizzes, and so forth.

The notations in the header entry generate materials initialization messages to the agent. These messages inform the agent about these materials, about what global variables they respond to, about what helps, hints, and tools are useful, and importantly about the educational paradigm the materials use. Preferably, information about this paradigm is structured according to the instructional materials interface standard. See infra. The notations can also contain additional information, such as prerequisites for the whole materials and references to other materials and texts. Finally, the presentation item can be, for example, an introductory screen.

Table 2B illustrates a typical entry which is processed during regular materials presentation.

TABLE 2B

MATERIALS ENTRY

| Instructional Entry N Presentation items | Sequencing Logic | Notations |
|---|---|---|
| Display objects, possibly including those for text, graphics, | Interpreted or executed control statements referencing variables, notations, and any student | Prerequisites for frame; Expected timing, and difficulty; Relation to other frames; Links to other materials and sources. Changes to agent |

TABLE 2B-continued

MATERIALS ENTRY

| Instructional Entry N Presentation items | Sequencing Logic | Notations |
|---|---|---|
| sound, animation, or video | input, and causing display of display objects and execution of notations | initializing information; Student performance data; Student error data |

For this entry, the presentation items are those for the materials display. The sequencing logic causes this display in view of the variables and other information in the materials data and any student input. Finally, the notations result in agent messages reporting changes in any parameters set at initialization, student performance data, student errors, and other educationally significant information. The notations can also contain information specific to this frame, such as expected difficulty and timing.

Turning now to the materials engine, its first processing step is to request the executive software to download the requested materials data from the instructional materials server. It next processes the header entry, links to global variables and functions, and sends initialization event messages to the agent. When presentation begins, it interprets or calls for execution the sequencing logic on the first frame. From this frame it proceeds to activate other frames as directed by the sequencing logic. Lastly, when the materials processing ends, any termination messages as directed by the notations are sent to the agent and the materials are deleted from the client.

In a preferred embodiment, the materials are all implemented similarly. Most differences between the instructional materials, tools, and communication materials are in the presentation items and the sequencing logic, including different global and local entities. All materials are expected to have notations for generating agent messages that record materials initiation and termination and student performance and errors. Preferably this information is reported in a standardized manner according to an instructional materials interface standard. See infra.

5.5.2. The Tools

The ABI system is adaptable to a wide range of necessary and optional student and teacher tools tailored to the students and the courses of instructions. In the case of elementary education, the following preferable tools include certain general tools and the communication, or joint work, materials. In the case of commercial education, other tools can be preferable. The schedule/calendar tool participates in permitting access to materials according to student schedule and is preferably found in all embodiments.

The discussion in the section is directed to an implementation for elementary education. It is not limiting in the tools that can be used in an implementation.

5.5.2.1. The General Tools

The general tools are preferably present in a range of forms selected according to data in the student data object, including grade level, and teacher permissions. One general tool is a calculator, which can have forms varying from a simple four function calculator to a complex graphing calculator. Other general tools include language tools, such as a spelling checker, a thesaurus, a word pronouncer, an encyclopedia, and a dictionary. Different levels of each language tool can be provided suitable for different grade levels. In an alternative embodiment, the language tools can be integrated with a "starfish" tool, which allows the user to place the center of a "starfish" over a particular word, and then, by selecting the appropriate arm of the starfish to obtain the definition, a pronunciation of the word, a rhyming word, a synonym, or an antonym. Another general tool is a word processor, perhaps with a drawing mode which can be provided as a multi-level set of writing and drawing tools. The writing and drawing capabilities available to a student are selectable by the student or teacher. A last general tool is a link-maker, which offers exercises in various types of memorization, such as paired associates, serial learning, ordered serial learning, and mnemonics. Finally, additional tools can be added to an implementation to meet specific educational needs. For example for geography lessons a map tool can be added. For student projects, an encyclopedia tool and a network search tool can be added. The Study Buddies™ can provide instruction in operation of the tools such as the use of keywords and operators. Specialized tools can be added for commercial or industrial training.

5.5.2.2. File System Tool

A general tool preferable in many embodiments is a file system with student access. In many instances, including elementary education, full view of and access to the system provided file system can be a disadvantage. Consequently this invention contemplates, providing a file system front end, or file system tool, that limits the student's view of and access to the system file system. This particular tool is advantageously implemented as part of the session manager and not as a material. With that implementation, customized iconic file representations are managed as part of the system area of the display.

One embodiment of such a file system tool presents a four level file system organized into shelves of books, each of which has sections, the sections having pages. A book representing a directory of files is opened when a student user selects its icon. The student navigates around the directory book by selecting tabs or by moving page by page, by selecting nextpage, lastpage, or other buttons. The student interacts with selected pages, or files, of the book, possibly creating new pages and sections. The student can also close the book. For most needs of elementary purposes, a single shelf with a few prespecified books is adequate. More advanced students can be given permission to create and use multiple shelves with new books and to cut and paste pages and sections from book to book. A page of a book, a file, is preferably presented with the materials that process it. For example, user-created text or graphics pages appear with the word processor active. Homework and instruction pages appear with the appropriate materials.

5.5.2.3. The Scheduler/Calendar Tool

The schedule/calendar is an important tool and is preferably always present. It is accessed when the ABI system initiates materials to verify the student is permitted and scheduled for this material, and also invoked when the system terminates materials to schedule new materials. It is accessed as a global function by the agent in response to a meta-request from the student seeking scheduling assistance. Further, it can be directly accessed by the student using the calendar tool icon appearing on the student desktop. When accessed, this tool displays a calendar book to the student, viewable in several ways.

This section describes, first, the schedule/calendar data, and second, the schedule/calendar processing. The schedule/calendar data is a subtype of and contained in the student data object. Generally, this data includes the following fields for each scheduled student activity:

Name of scheduled activity and optionally an identifying message;

Activity priority;

Deadline date and time, or a definition of a perpetual activity, which has periodic requirements but no completion date;

Link to material for the activity which in turn can specify activity completion criteria; for activity of a single student this is typically a particular instructional material; for group work activity a list of the students for the group and other communication information can also be in the calendar entry;

Activity characteristics, for example whether this was entered by the student or teacher and whether this is to be marked complete by the student or system;

Activity status, completion status and submission status of any required reports.

This exemplary data, sufficient to define a scheduled activity, can alternatively be entered by the teacher or by the student. If entered by the teacher, it can be protected from modification by the student. Data entry is preferably assisted by a teacher tool with a suitable screen format. Optional activities can be entered by the student if the teacher permits.

The schedule/calendar tool can be directed by the teacher to permit the student a range of scheduling initiatives. These initiatives can range from permitting the student freedom to schedule materials as desired to requiring the schedule/calendar tool to enforce a fixed order of student activities. In a preferred embodiment this is accomplished by the teacher's specifying initiative parameters including a deadline date/time, D, and a criterion priority, P, in the student data object. The schedule/calendar then schedules automatically all tasks with deadline less than or equal to D and with priority level greater than or equal to P. By varying D and P with respect to scheduled tasks the teacher can achieve the specified range of initiatives.

Schedule/calendar processing can be invoked by the executive software, by the student, or by the agent. As previously described, at the beginning of a student session or after termination of the use of a particular material, the executive software invokes schedule/calendar tool, first, to mark the terminated task complete, and then, to reference the calendar data in view of the initiative parameters to find activities requiring scheduling. If this tool finds only one activity in the calendar requiring scheduling, this required activity is initiated. If multiple required activities are found, the tool can, alternately, initiate the required activity of highest priority or allow the student a choice of which required task to initiate. If there are no required activities, the schedule/calendar tool allows student selection of the next task via the session manager.

The schedule/calendar tool can be invoked by the student by selecting the schedule/calendar icon in the system area of the display. When so invoked, the tool displays the student calendar and scheduled activities in various formats from a monthly overview to details of individual activities. If permitted, the student can enter optional items or mark items complete.

The schedule/calendar tool can also be invoked by the agent when it receives a student meta-request of the type "What do I do next?" The agent retrieves the required and scheduled activities from this tool and also determines an expected time to complete each task based on student performance from the student data object and the average time required for each task from the materials header. In view of this combined information, the agent can present to the student an ordered list of activities scheduled according to their expected time to complete.

5.5.2.4. Communications Tools and Group Work Materials

In a preferred embodiment, the ABI system includes communication, or group work, materials integrated with the remainder of the system. As for other tools and materials, access to communications materials is granted by the scheduler/calendar tool. Communication work groups are assigned and scheduled in students' calendars with calendar entries preferably including the group members names and other communication parameters. When these materials are activated by the scheduler, the communication group is begun. Alternatively, students can spontaneously request the formation of a communication group by the selection of a communication material. The scheduler/calendar tool can permit group activation if the students have no other required activities. Alternatively, each particular communication material can also have specific access controls preferably set by the teacher that control the types of communication permitted and with whom the communications is permitted.

In manner similar to other tools and materials, the communication materials have an agent interface. Upon activation, they send initialization event messages to the agent specifying the global control variables they will be sensitive to, the educational paradigm adopted, and available hints, helps, and other communication parameters. In alternative embodiments, the instructional materials interface standards include special categories for communication based work that enable the agent to control these materials with specificity. During communication work, these materials generate event messages at educationally significant points.

Thereby, communication materials are fully integrated into an ABI embodiment. Further, in a preferred embodiment, communication materials are implemented in a manner similar to other materials. First, each communication material has a particular communication task specific for that communication material or form of group work. The communication task manages the network interface for that particular type of communication or group activity by using the network protocols provided by the OS and ES, and provides its communication functions as global functions for access through an ABI system. Second, these functions are made available to the student in a manner similar to other materials through particular materials data that includes presentation items, sequencing logic referencing these global communication functions, and notations generating event messages for the agent. In an alternative embodiment, the communication materials can be programs, independent of the materials engine and perhaps part of the associated communication task, which internally generate the necessary agent event messages. In either embodiment, communication materials tasks can be written either in the ABI implementation languages, or in a special purpose communication scripting language.

The particular communication materials in a preferred embodiment provide forms of group work or communication including e-mail or message exchange, linking student groups for joint work on materials, and structured joint work such as contests with rules. Each of these forms of group work or communication is described in the remainder of this section.

A first form of group work implemented by communication materials is E-mail and newsgroups. These are useful for teachers to send information to their classes, such as schedule and materials changes and to communicate with absent students. Teachers can also exchange information with each other or obtain help for system and other issues. Students can use this form to obtain help and advice, especially from remote sources, communicate with their teachers, and share work or interests with other students. E-mail and newsgroups are easily incorporated as previously discussed. Then materials data is authored that grants access to these functions and generates appropriate agent event messages.

Student linking is another form of group work implemented by communication materials. Students in session at separate clients can link together for various exemplary activities including simply talking with each other by voice or text or for joint work on a particular material in which the students have either similar roles, as in developing a document using a word processor, or different roles, as in a simulation or game. Another activity of linked students includes group activities, in which position of participants within a virtual environment determines activity and role within activity. A final exemplary activity for linking student groups is moderated activity, in which participation is controlled by a special coordinating task that perhaps executes on a server system. An example of this latter activity is a spelling bee which is described in more detail subsequently.

In the preferred embodiment, student linking includes the following steps. The first step is identification of other students with whom a given student can link. The group can be defined by the teacher in the schedule/calendar entry for this activity, or alternatively, in a communication access control particular to this linked work activity. Second, links must be established between the students to be linked. These links can be to a single server communication materials task that receives and distributes messages. Third, local and global actions must be determined. Local actions are those that result in output visible only to the user taking the action. Global actions are those that result in output visible to all the students in the linked group. These global actions can include communicating each student's input to all linked students, sharing information among all linked students, jointly creating information by students in the linked group, and storing jointly created information. The fourth step in linking is orderly disconnection from the linked group.

Linking can be implemented in alternative fashions. In all implementations the communications tools and materials for linked activities are integrated with the other components of an ABI system in one of the ways previously described. A simple implementation is to provide on each student's screen an icon and a message area for each linked student. Alternatively, one or more shared materials areas can be provided. Communication can be distributed through a single server task to which all linked students connect. A more advanced implementation of linking employs software packages similar to multi-user dungeons ("MUDs"), which contain a collection of virtual shared traversable spaces (called "rooms") in which users can interact either with each other or with elements within the room. MUDs are especially preferable for student group work in which different students have different roles with access to different system capabilities. For example, one student can be a recorder, having write-access to the group's notebook, while another can be the database expert, having access to a body of relevant data. MUDs are also be useful for teachers, communicating with each other within rooms' each set aside for a specific topic and forming a dynamic newsgroup.

Another form of group work implemented by communication materials is structured linking. Important examples of structured linking in which the students have different or structured roles are educational contests. Exemplary of such contests is a spelling bee, an exemplary embodiment of which is described herein. In this embodiment, the spelling bee is managed by a server communication materials task, called the server spelling bee task, which preferably is executed on a server system, which communicates with local spelling bee tasks on the involved students' client system. Generally, the server spelling bee task initiates a spelling bee by accumulating connections with students local spelling bee tasks, then mediates the spelling bee by controlling student actions, and provides for orderly termination of the spelling bee. The local spelling bee tasks provide the communication functions accessed or required by the spelling bee materials data, which are scheduled or selected to invoke spelling bee participation, on the client systems. These materials also send event messages to the agent and are controlled by the student's agent. Alternately, the local spelling bee tasks can be programmed to communicate with the agent and perform the spelling bee without materials data.

In more detail, the spelling bee tasks carry out the following steps. The spelling bee server task is started at a teacher's request or automatically by the system. A list of eligible students can be selected by the teacher or automatically determined by the server task based on data in the student data objects, including class membership and a stated interest in spelling bees. The spelling bee activity can be scheduled for each individual student by the teacher or selected by the student. If a student desires to enter the spelling bee, the local spelling bee task is started by the ES and a message is returned to the server. No response within a specified amount of time is taken as indicating a desire not to join. If a student's data object shows that this is the first time in a spelling bee, an instructional and warm-up sequence can be authorized for the student by the agent in the server task. If enough eligible students join the spelling bee, the server task continues, otherwise it sends a termination message to those who have joined and terminates. Each local spelling bee task obtains space on the student display indicating the other players and their inputs. Next the spelling bee begins, and the server task broadcasts the word to be spelled selected from a graded word list and the name of user to shell the word. Each local task echoes the word sent, preferably by requesting the on-screen agent voice the words as utterances with an appropriate affect. The spelling bee materials inform the student's local agent of the student's progress and performance in the spelling bee materials. The server task accepts input from designated user's local task and broadcasts it. The server task judges and reports on correctness of completed responses and, if incorrect, eliminates the student from further spelling requests. As student leave the spelling bee, the server task is notified and sends messages to the local tasks of continuing players in order to update their workspaces. In each case the student preferences for further spelling bees are checked and preference data in the student data object is updated. When only one student remains, the server spelling bee task terminates the game and reports results.

5.6. The Agent And The Agent Interface

The agent is an important component of this invention and is further described in this section with reference to the student data object, the agent interface, agent processing, and agent adaptivity. The agent comprises the student data object which contains data on the student's performance on the various materials and data on the student's pedagogic model. The student data object is referenced and updated by other components of the system, for example, for report generation and for student scheduling. Other system components preferably have an interface to the agent in order that the agent can control the materials and guide the student in a uniform manner. Agent processing is divided into two phases, agent action processing and agent behavior processing. Finally, agent adaptivity in the preferred and in alternative embodiments is described.

5.6.1. Student Data Object

One student data object is created for each student in the ABI system and is the only permanent repository of data concerning that student. The student data comprises fixed data defining the student as well as evolving data describing the student's interaction with the system, the latter including current and past performance and data defining the agent's view of the student. The student data object is stored on the server system and is the source on the server system for all teacher and administrative reports concerning that student. Elements of the student data object are fetched to a client system as required once its associated student logs on to that client and on that client serves to control the agent and provide for agent adaptivity.

Figure 10A:
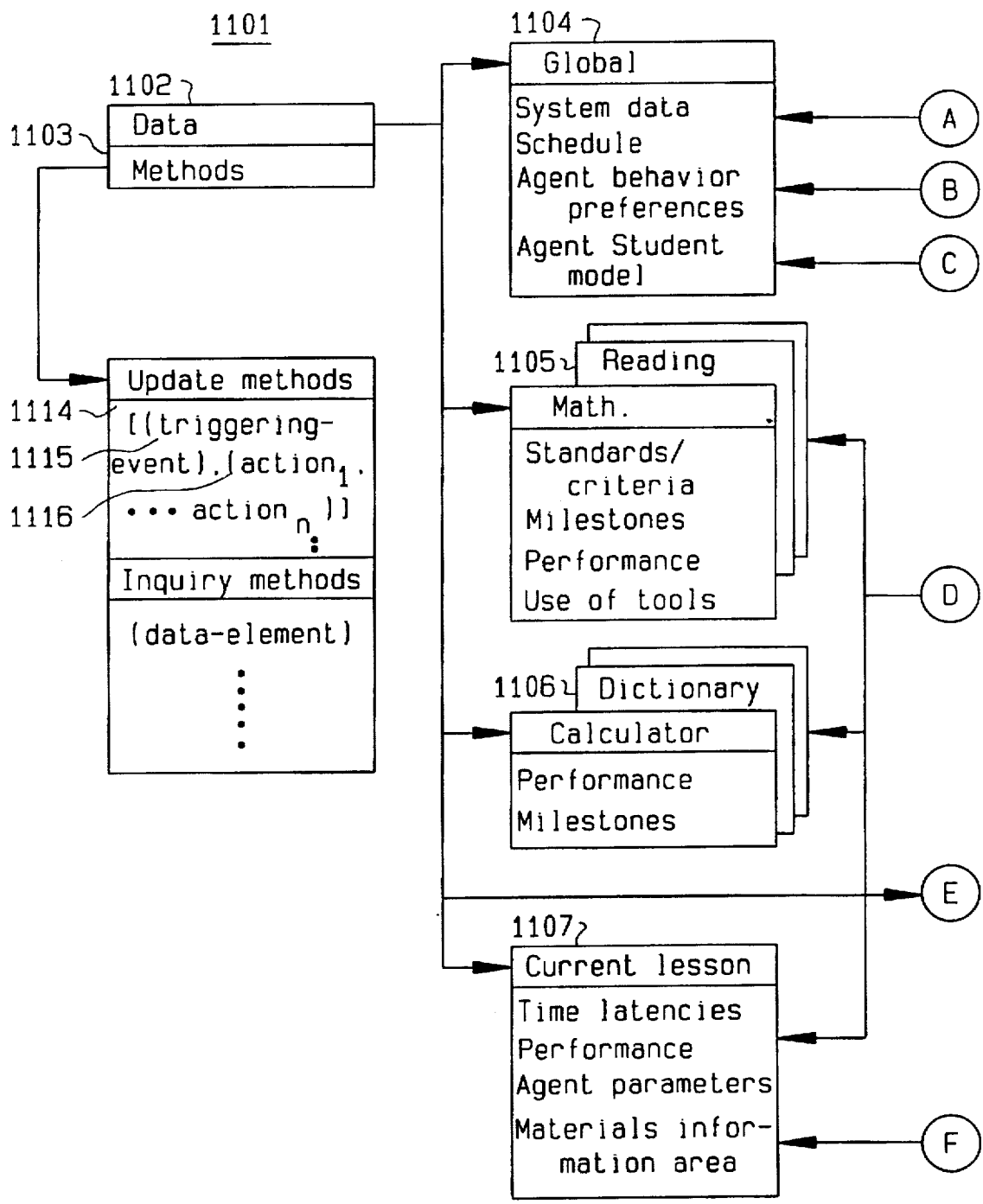
FIGS. 10A and 10B illustrate the structure of student data object of FIG. 7 in more detail.
Figure 10B:
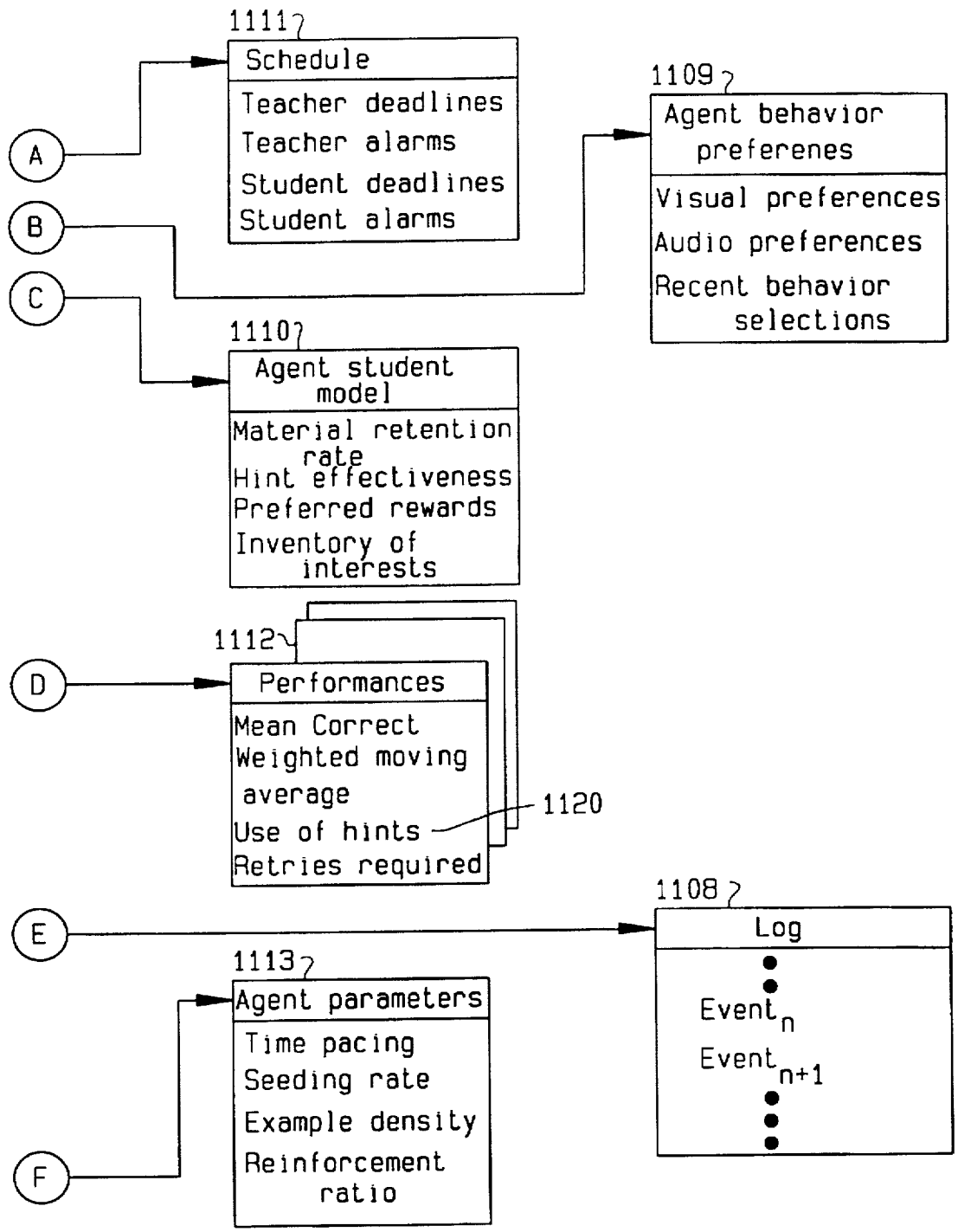
Figure 11:
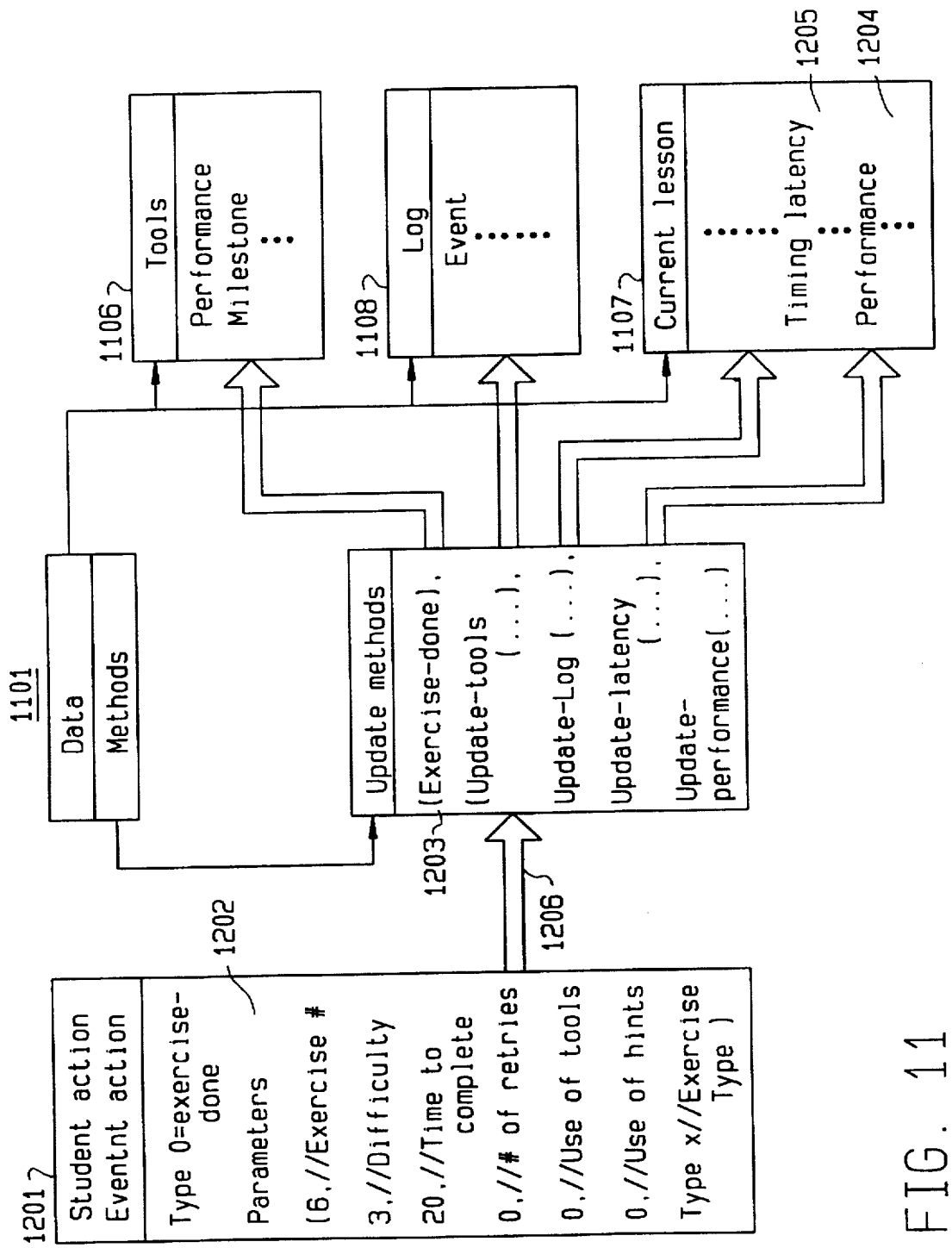
FIG. 11 illustrates exemplary processing of the student data object of FIG. 7.

FIGS. 10A, 10B and 11 illustrate the structure and operation of the student data object. FIGS. 10A and 10B conceptually illustrates an exemplary structure for student data object 1101. It is an object comprising structured student data 1102 and methods 1103 for accessing and updating the student data. Student data is divided into global data 1104, materials related data 1105, including tool related data 1106, current lesson data 1107, and log data 1108. Global data, that is all items meaningful across all ABI materials, includes such subtypes as system data, agent behavior preference data 1109, agent student model data 1110, and schedule data 1111. System data includes student identifiers, student passwords, access privileges, grade levels, class registrations, etc. Agent behavior preference data 1109 relates to the multi-modal behaviors generated by the agent and includes student defined preferences for these behaviors as well as a summary of past agent behaviors. Student preferences can include options relating to agent visual appearance—species, gender, dress, or perhaps, no visual appearance—and similar options relating to audio behavior and text production. The summary of past agent behaviors is used to aid in the selection of reasonably varied future multi-modal behaviors. Agent student model data 1110 includes items modeling the student's persistent behavior which the agent uses to individualize its interactions with the student. Such data items can include material retention rate, hint effectiveness, and preferred rewards. Updates to this data object made as the ABI client interacts with the student provide for agent adaptivity to the student. Finally, schedule data 1111 relates to assignments scheduled by the teacher and unchangeable by the student and optional items scheduled by the student. Data for each schedule item can include due dates, reminder alarms, and priorities.

Each course in which the student is currently enrolled has a separate materials related data area 1105 for the materials providing instruction in this course. In an exemplary embodiment, this data subtype includes standard and criteria data, usually set by the school system, which include objectives and standards the student must meet in the particular course, milestone data establishing objectives already met by the student, data relating to the student's progress in the materials, data relating to the student's use of tools in the materials, and performance data. Progress data includes data necessary for the student to leave the materials and resume the materials at the prior point. Performance data 1112 relates to student's performance over several lessons in the materials and can include mean performance, weighted moving averages of performance, patterns of performance, use of hints, use of retries, and needed remediation. Using such performance data, for example, means and weighted moving averages, permits the agent to determine whether student performance is improving or declining. Tool data 1106 contains essentially similar but more abbreviated data about use of system tools such as the calculator, dictionary, and word processor. This data can only include milestones and performance information.

The status of each lesson presented by instructional materials is accumulated in current lesson data 1107. This subtype is created upon lesson initiation and deleted upon lesson completion. In an exemplary embodiment, it includes short term measures of performance—such as error rates, weighted moving averages of error rates, and the use of hints and retries—short term measures of time latency—such as time to complete lesson segments and weighted moving averages of such times—work areas in which the agent can store information particular to the instructional materials—such as parameters to use in forming multimedia presentations and lesson coaching parameters 1113. The lesson coaching parameters are used by the agent to provide feedback to the instructional materials so that their presentation can be individualized according to student performance. These parameters are governed by the instructional modalities employed by the particular instructional materials and can include values such as the seeding rate of new concepts, time pacing of the presentation, the density of examples, and the ratio of reinforcement.

Finally, the student data object has links to student log 1108. The log stores all messages input to agent processing and all actions from agent behavior processing. It can be used to create detailed audits of student behavior and system responses, which can be of interest to instructional designers, in order to improve instructional materials, and to educational researchers, in order to develop new modalities of instruction. With its carefully partitioned and functionally defined interfaces, the ABI system is easily adaptable to new modalities of instruction as well as to merely installing new materials.

The student data object also includes one or more data updating methods and one or more data accessing methods. Exemplary updating method 1114 includes two components, triggering event type 1115 and action list 1116. When a component of agent processing updates the student data object, it sends a message to the object including an update event type and a list of relevant parameters. The updating methods are searched to find one with a triggering event type which matches the event type of the update event. The one or more methods having matching event types are then executed by performing all the actions in the included action list using the parameters in the update event message. Each action uses the supplied parameters to update data elements in the student data object. A plurality of actions is generally associated with each method because it is typical for one event to cause changes in several student model data elements. For example, an update event related to the use of a tool causes changes in the relevant tool data subtype as well as the associated instructional material subtype. Further, when a lesson is completed, the methods executed appropriately summarize student data from the current lesson subtype into all the permanent data subtypes. At this point, parameters such as 'hint effectiveness' in the agent student model data 1110 are also updated. The 'hint effectiveness' parameter is accessed for uses including agent decision weighting and teacher report generation. One of the methods associated with the event type 'end of lesson' updates the parameter 'hint effectiveness' in the following exemplary manner. The performance parameter 1120 'use of hints' is accessed to determine if update is required. If hints were provided to the student, the 'current lesson log' 1108 is used in calculating the two components of the parameter 'hint effectiveness'—'hint effectiveness-before-first-try' and 'hint effectiveness-after-first-try'. These two components each hold an array of values which are used to compute a weighted moving average. In an alternative embodiment, a more complex formulation of this parameter can be used to provide a more detailed analysis of hint effectiveness—each of its two components can be separated into subcomponents corresponding to subject area, hint types and other instructionally useful measures. It is further preferable, for data elements comparing a particular student to class peers according to various measures be entered into the student data object. This can be done by executing appropriate update methods on the server system where such comparison data is available from reports generated from the student database including all the student data objects.

FIG. 11 is an exemplary illustration of how a typical student action update event updates the student data object. Other update events include agent action update events. Update message 1201 is sent 1206 to the student data object from a component of agent processing to cause student model update. The update event type is "exercise done" and exemplary associated parameters are as indicated at 1202. In this case method 1203 with triggering event type "exercise done" is executed by performing the four associated actions. The first action updates relevant data elements in tool data subtype 1106. The second action updates the log 1108, as is done for all events. The third action updates timing latency data elements 1205 in current lesson subtype 1107. Finally, the fourth action updates student performance data elements 1204 in current lesson subtype 1107.

Any component of the ABI system needing to determine the value of particular data element in the student data object does so by sending an inquiry message to the student data object requesting the desired data element. The inquiry method for that data element retrieves and then returns the desired value. Such inquiries are typically made by the agent on the student client system and by inquiry and report generating programs on the server systems.

5.6.2. The Agent/Materials Interface

The structure of the interface between the agent and the materials is important in the ABI system. It permits a single agent to control a wide range of materials through which it guides a single student. The agent achieves this by advantageously maintaining a model of the student's pedagogic characteristics, which it references in diverse situations to determine its actions. This section, first, describes the general procedural structure of this interface, and second, describes the preferred model for the content of the interface. This preferred model is structured according to the instructional material interface standard (herein called "IMIS")

Communications between the agent and the materials is bidirectional. Events containing parameters are sent to the agent by the materials at educationally significant occurrences. In response, the agent sets global parameters controlling the materials and returns messages confirming actions proposed by the materials. In circumstances in which the materials needs to coordinate displays with the agent, it communicates synchronously with the agent. For example, when the student requests help or a hint, the materials can need to synchronously obtain the agent's permission to offer the help or hint. In other circumstances, the materials can asynchronously send informational messages to the agent. Such asynchronous agent input and possible output can give the system the appearance of spontaneity.

The agent/materials interface can be implemented in any convenient manner in a given OS. For example, it can be built on explicit messaging, shared memory areas, procedure calls to a socket interface, or other technology.

The global parameters set by the agent and which control the materials are preferably state variables that the materials sequencing logic references in order to make educationally significant sequencing decisions. The meanings of state variables to which a particular material is sensitive can be established at materials initialization according to specifications in a header materials data entry. Examples of such variables range from simple flags, such as those controlling the availability of helps and hints, to more sophisticated parameters, such as those controlling the rate of new concept introduction, the density of examples, or the speed of discrimination exercises.

Communications from the materials to the agent are controlled by notations in the materials data. A notation includes an event type, parameters associated with the event, and the condition under which the event is constructed and sent. Notations are activated when they are encountered in sequencing logic in the materials data. There are two classes of notations, "point-wise" notations and "toggled" notations. Point-wise notations are evaluated exactly once when they are activated. Toggled notations are evaluated at each input event following their activation until they are inactivated by a later notation.

Notations vary according to the materials. Some materials, such as simple e-mail, can contain no notations. Tool materials can contain notations indicating only correct or incorrect use of the tool. Most instructional materials data contain several types of notations. Generally, the events generated by these notations send information similar to the following: number of retries, measures of rate in fluency drills, measures of performance such as percent correct and the number of tries, partition of exercise items into similarity sets, and measures of the relative difficulty of items.

Table 2C illustrates exemplary types of notations generated by typical instructional materials.

TABLE 2C

TYPES OF NOTATIONS

| NOTATION TYPE | WHEN GENERATED | TYPICAL PARAMETERS |
|---|---|---|
| POINT-WISE NOTATIONS: | | |
| Lesson initialization | At start of lesson | Educational paradigm used; meanings of state variables |
| Partial response | At partial answer for a requested input item | Correctness of user input, time required |

TABLE 2C-continued

TYPES OF NOTATIONS

| NOTATION TYPE | WHEN GENERATED | TYPICAL PARAMETERS |
|---|---|---|
| Full response | At complete answer for a requesting input item | Name of exercise, difficulty, related exercises; correctness of user input, time required, |
| Help/hint request | User request for help or hint | None |
| End of lesson | End of lesson | Objectives satisfied by lesson; performance; time required |
| Point | At an error | Screen location that agent can highlight or move to |
| Say | At an error | Message that agent can produce |
| TOGGLED NOTATIONS: | | |
| Latency | No input event | Elapsed time, expected type of input |
| Inappropriate input | Inappropriate inputs from student | Number and type of inappropriate inputs |

5.6.2.1. The Agent/Materials Interface Standard

In order that the student's agent can act generally to provide student guidance and control material presentation in a manner individualized to the student's pedagogic characteristics, it is preferable that an embodiment of this invention use an instructional materials interface standard (herein called "IMIS"). According to IMIS, it is preferable that the detailed content generated by the notations and passed in messages to the agent be structured in a standard fashion according to the particular educational paradigm adopted by the materials and independent of the particular content of the materials. Further, it is preferable that the materials adopt one of a limited and defined set of educational paradigms contemplated in the standard. Finally, it is further preferable that the rules referenced by the agent in its associated processing tables and performance data in the student data object be similarly structured. Thereby, IMIS provides the agent with a materials independent view of the student.

IMIS is not limited to a particular set of educational paradigms. Any standard set or sets of paradigms appropriate to the intended students can be adopted for the interface standard. It is preferable that the standards adopted be based on principles of educational psychology and sound educational practice. In the following, this invention is described according to an IMIS appropriate for elementary education. The paradigms described below are not limiting.

Exemplary educational paradigms

Exemplary educational paradigms, also known as modes of instruction, are listed in Table 3.

TABLE 3

EXEMPLARY EDUCATIONAL PARADIGMS

Interactive tutorial
Fluency exercise
Paired association exercise
Discrimination formation exercise
Simulation exercise Each of these educational paradigms is preferably handled differently by the agent in response to differing descriptive information and student performance data. For example, a sequence of correct responses in a fluency exercise is expected. On the other hand, a sequence of correct responses in a paired associates exercise can be worth while for the agent to comment on.

Exemplary paradigm classification

The exemplary embodiment of IMIS standardizes these educational paradigms according to three pieces of information: the instructional context, the instructional format, and most specifically, the subject area. Materials notations should preferably specify all pieces for maximum agent flexibility, although the ABI system is adaptable to the materials specifying any number or none. If none are specified, agent actions are independent of the educational paradigm.

The instructional context is the specific mode of instruction being presented to the student by the materials. Examples of instructional contexts are:

TABLE 4

EXEMPLARY INSTRUCTIONAL CONTEXTS

Prerequisite
  Test
  Review
Pretest
New material
  Introduction
  Discrimination
  Review
Practice
  Fluency exercise
  Review
Unit mastery test Within each instructional context, materials can adopt instructional formats, the second component of the IMIS specification. Examples of instructional formats are:

TABLE 5

EXEMPLARY INSTRUCTIONAL FORMATS

Multiple Choice
Fill-in-the-blank
  Unprompted
  Selected from list
Paired Associates
  By letter
  By dragging
  By matching
Computations
Simulations
  Identify parts of figures or text
  Simulation games Finally, student performance should preferably be stored relative to the subject area being worked on, as necessary for course level reporting. Thus, the third component of the exemplary IMIS is the subject area, such as mathematics or reading.

Exemplary standardization of agent data

IMIS standardizes system tables and data relevant to agent action processing according to this triple of information—instructional context, instructional format, subject area—which characterize the education paradigm adopted by the materials. The following description discusses standardization of notations in the materials, standardization of data in the student data object, and standardization of the agent action processing tables.

Notations in the materials are standardized according to IMIS as follows. For a lesson, exercise, or item, each material adopts one of the standard set of educational paradigms, or modes of instruction. The parameters to be passed to the agent in an event message are determined by the instructional context and each instructional format of this paradigm.

The following table contains an exemplary sequence of notations for a "prerequisites review" education paradigm, and the parameters relevant to agent action processing that each notation sends to the agent.

TABLE 6

EXEMPLARY NOTATIONS FOR PREREQUISITES REVIEW

| Site of Notation | Data Sent to Agent |
| --- | --- |
| Instructional Sequence Entry Header | Context Type: Prerequisites Review<br>Unit Name: Selecting Gender Pronouns<br>Subject Area: Grammar<br>Average Time: 5 minutes<br>Number of Exercises: 8 |
| Exercise 1 Entry Header | Format Type: Multiple Choice<br>Number of Options: 2<br>Difficulty: 0.3<br>Hint: Available |
| ... | ... |
| Exercise k entry Header | Format Type: Fill in Blank<br>Subformat: Select from Words in Previous Sentence<br>Difficulty: 0.5 |

An aspect of these notations is to provide information about the quality of the student response, which, in this example, is given by the a priori probability of a correct answer. For example, selecting the correct response from two choices has an a prior probability of 0.5 if the choice is made at random. Filling in a blank correctly is less likely by chance, if no cuing is provided in the exercise.

Advantageously, notations containing the parameters associated with a given instructional context and a given instructional format can be stored as templates in libraries. Notations are available in these libraries to generate necessary messages at materials initialization and during materials processing. An instructional designer then need only consult these libraries to obtain the notations appropriate to the educational paradigm of the materials being authored.

The standardization of the student data object according to this exemplary embodiment of IMIS for elementary education is simply achieved by storing student performance data according to instructional context, instructional format, and subject area. Thereby, these characteristics can be taken into account when comparing student pedagogic performance in general across subject matter areas.

The final component of IMIS standardization is that of the agent action processing tables, the policy filter table, the decision weight table, and the selection rules. Event messages from the materials inform the agent of current values for the instructional context and instructional format. Since these values are parameters available to evaluate the conditions and functions contained in these tables, these tables can be, in effect, segmented into parts each corresponding to a particular instructional context and instructional format. Since there is considerable overlap between the parts of these tables, the number of rules does not proliferate. The current subject area is also available to segment the tables in the cases of those subjects that can require special treatment by agent action processing. Further, the IMIS standardization permits a more systematic and effective use of the mechanism which the agent uses to set global variables in the materials. These variables facilitate adaptive adjustments of instructional parameters, such as seeding rate and amount of prompting. These variables can be more effectively set in view of the current educational paradigm as indicated by the current values of the instructional context and format. IMIS is also useful in providing information to the student in response to "Where am I?" inquiries. The system can use the information contained in the entities in the information triple to respond, "You are halfway through the drill and practice on fractions," for example.

Alternative agent embodiment enabled by IMIS

In alternative embodiments of agent action processing, the segmenting of the policy filter table and decision weight table, which provides a simplified 'intelligent instructional agent' for each kind of instructional context, instructional format, can be augmented by other techniques from artificial intelligence. Thus, the customized rules and functions contained in the action table can be augmented software modules, which extend the agent and are constructed based on such techniques as production rules systems with rule propagation or neural nets. Such additional modules could, for example, find complex patterns of student error unanticipated by the instructional designer. As additional artificial intelligence methods are incorporated into the agent software, new materials notations can be added to the notation repertoire.

5.6.3. Agent Action Processing

Agent processing is divided into agent action processing, which determines on-screen agent display actions in response to input events, and agent behavior processing, which transforms display actions into displays to the student. In a preferred embodiment, agent action processing is rule based and event driven, and agent behavior processing is table based. This and the succeeding section describe the preferred .embodiments of these divisions of agent processing.

Figure 8:
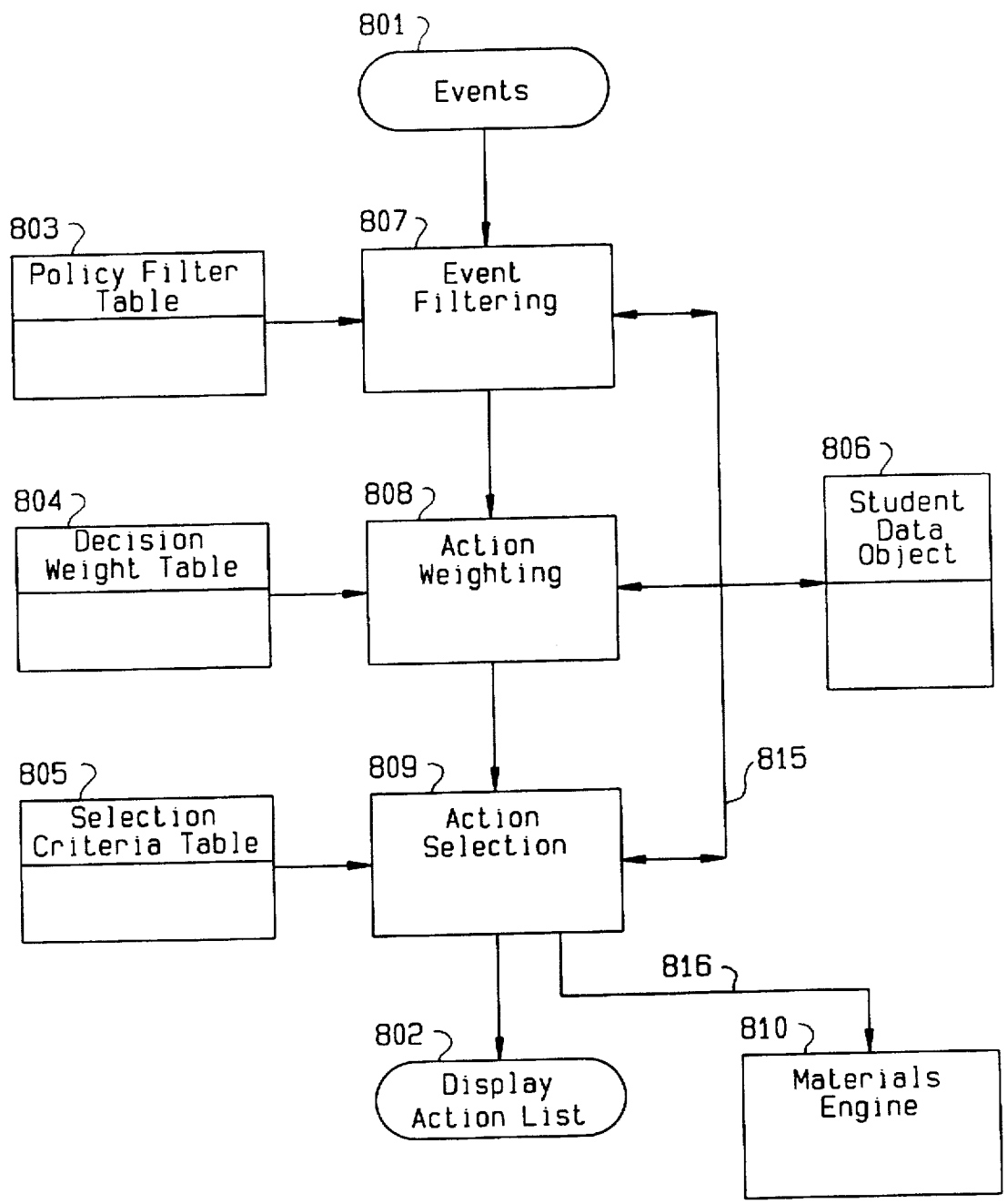
FIG. 8 illustrates agent action processing of FIG. 7 in more detail.

FIG. 8 illustrates in more detail agent action processing. This processing is activated when event messages 801, representing either input events sent from the I/O handlers or educationally meaningful messages from the materials, are sent to the agent software. It transforms the input event messages into lists of display actions that activate the agent display and also has the important side effects of updating student data object 806, as indicated by arrow 815, and of setting materials control parameters, as indicated by arrow 816. It is possible a particular input event can generate all or none of these outputs and side effects.

Agent action processing proceeds through three steps: event filtering, candidate action weighting, and display action selection. In common, each of these steps references rules in an associated table of rules. These rules include relations, functions, and procedures, all of which reference input parameters. Input parameters can be any appropriate data carried in the input event message and any appropriate data stored in student data object 806. In particular, as indicated by arrow 815, fields from the following subtypes in the student data model are referenced: the current lesson subtype, the materials specific subtypes, and the agent pedagogic student model subtype. In alternative embodiments where the agent interface and data is structured according to an IMIS standard, event input parameters include parameters characterizing the current educational paradigm adopted by the materials. These parameters can be used to select rules applicable only to this paradigm for reference and activation.

Turning now to the steps of agent action processing, the first step is event filtering 807, referencing policy filter table 803. This step is described with reference to Table 7, an exemplary policy filter table.

TABLE 7

POLICY FILTER TABLE

| Active | Rule |
|---|---|
| Y | $B(p_1, p_2, \ldots, p_m)$, type, subtype, $x_1, x_2, \ldots, x_n$) |
| Y | (item_diff>LIM), (congratulation,diff,2, ...) |
| Y | (rate>f*average), (congratulation,rate,k, ...) |
| Y | (exercise_done), (congratulation,done,r,t, ...) |
| N | (latency > m), (hint, constructed, ...) |
| N | ((error_rate<k) & (WMA>MAX)), (remediation, review) |

The first row illustrates a generic policy filter rule, while subsequent rows illustrate exemplary filter rules. The generic rule has a condition and a consequent. The condition is boolean expression, $B()$, of one or more conditions, $P_n$, each of which is a function of the available parameters. Default parameters in a rule can be overwritten by parameters from the input event. The consequent is a list of an agent action type, "type," an agent action subtype, "subtype," and zero or more parameters, $x_n$. The type is a major mode of agent behavior, for example, "congratulate the student," and the subtype modifies that behavior, for example, "because of the student's rate." The parameters provide additional information to be used in constructing an utterance, for example the time that the student took to complete an item or the name of the item. Each rule can be marked active or inactive, possibly as a result of selection during materials initialization or as a result of selection according to IMIS educational paradigm parameters. Processing a filter rule consists, first, in evaluating each active boolean, and second, for each such active and true expression, placing the consequent and its parameters into the list of candidate actions. The list of candidate actions is then passed on to action weighing 808, the next processing step. Also in the student data model, the current lesson subtype and materials specific data subtype are updated, if necessary, with data from the input event message. For example, upon item completion, performance results need to be updated.

Action weighting 808 references decision weight table 804 and assigns a numeric weight to each action in the input candidate action list. This step is described with reference to Table 8 an exemplary decision weight table.

TABLE 8

DECISION WEIGHT TABLE

| Active | Rule |
|---|---|
| Y | (type, subtype), weight_function($x_1, x_2, \ldots, x_n$) |
| Y | (congratulation, diff), weight_function_j($Y_1,Y,Y_3$) |
| Y | (congratulation done), weight_function_k($Z_1,Z_2$) |

The first row illustrates a generic policy filter rule, while subsequent rows illustrate exemplary filter rules. The generic rule has an index and a weight function. The index is a type and subtype pair, and the consequent is a weight function of zero or more parameters, $x_n$, with a value between 0 and 1. Each rule can also be marked active or inactive, possibly as a result of selection during materials initialization or as a result of selection according to IMIS educational paradigm parameters. Processing the list of candidate actions consists of, for each candidate action, selecting the weighting rules that have a type and a subtype matching that of the action and then assigning a relative priority between zero and one to the action as determined by applying the weight function to the available parameters. In this manner all the candidate actions on the candidate action list are assigned a numerical weight. The list of weighted candidate actions is then passed on to action selection 809, the last processing step.

Action selection 809 references selection criteria table 805 to select a final set of actions from the input candidate action list. This step is described with reference to Table 9, an exemplary selection criteria table.

TABLE 9

| SELECTION CRITERIA TABLE | |
|---|---|
| Active | Rule |
| N | (criterion) |
| N | (use all actions with weight > MIN) |
| Y | (use the most highly weighted action) |

The selection criteria table consists of a list of available methods for the candidate action selection process. A selection criterion uses the computed weight and perhaps other parameters to select one or more final actions from the candidate weighted actions. Exemplary selection criteria are illustrated in the last two rows. It is anticipated that one criteria is marked active as a result of selection during materials initialization or as a result of selection according to IMIS educational paradigm parameters. The active criteria is applied to select zero or more final actions. Some final actions are executed locally to provide control to the materials by setting control parameters, as indicated by arrow 816. Other final actions can cause update of fields on the student data object, in particular in the agent pedagogic model subtype, as indicated by arrow 815. The remaining final actions are display actions which are passed to agent behavior processing in display action list 802. The student data object is updated to record the selected display actions.

Action processing is illustrated with reference to the exemplary rules in Tables 7, 8, and 9 by considering the results of processing two input events, one of type "item done" with a "difficulty greater that LIM" and one of type "exercise done." Applying the exemplary filter rules from Table 7 results in two candidate actions, one being (congratulation, diff) and the other being (congratulations, done). No other exemplary boolean expression evaluates to true. Next the exemplary weighting rules from Table 8 are simply applied by selecting and evaluating the correct weighting function. The resulting exemplary candidate action weights are taken to be 0.8 for (congratulation, diff) and 0.5 for (congratulations, done). Finally, the one active exemplary selection rule from Table 9 is applied which selects the one final action (congratulation, diff).

The preferred embodiment here illustrated involved no rule propagation. In alternative embodiments more sophisticated artificial intelligence programming techniques could be employed as is apparent to those of skill in the art. For example, rule propagation and general production rule systems could be used to transform events to actions. Other applicable techniques could involve neural nets, predicate logic, and so forth.

5.6.4. Agent Behavior Processing

Agent behavior processing transforms display actions into output displays to the student. In a preferred embodiment, agent behavior processing selects from tables of possible display behaviors based on the input display action list and its parameters and on fields in the student data object describing student preferences and recent agent display behaviors. Further, in a preferred embodiment, agent behavior processing generates either display scripts which are sent to the I/O handler, or scripts with associated data snips of sound and animation that are embedded in applets. In alternative embodiments, intermediate scripts are not used and behavior processing generates I/O handler commands in real time. This section describes agent behavior processing, first, with respect to the table data structures used, and second, with respect to the processing steps.

Generally, agent behavior processing includes two steps. First, the message and its emotional affect, which is to be displayed or spoken by the on-screen agent, called herein the "utterance," is selected according to the input display actions. Second, the utterance and affect are sent to the preferred persona object where it is integrated into a complete display, including animation, graphics and audio. The display is preferably represented as a script which is then sent to the I/O handlers. In behavior processing, the selected affect in an important parameter. The affect further characterizes the intent of the utterance. For example, an utterance of a "congratulations" type is associated with a positive affect that can range from "happy," in cases of superior performance, to "encourage," in cases of improving but still less than average performance. The display behavior of the on-screen agent, preferably represented as one or more personae interacting with each other and the student, is strongly responsive to the affect parameter. As is known in the arts of film animation, infusing an animation with an affect or emotion gives resulting images a human and life-like quality. Such a quality is important so that the virtual tutor aspect of the ABI system engage the student in order to improve instructional results. Also, by storing recent affects selected in the student data objects, as well as student preferences for such parameters as affect intensity and presentation, agent behavior processing can present a coherent and life-like image agreeable to the student over one instructional session or over several instructional sessions.

Affects are associated with and further characterize the intent of utterances. They are selected as part of utterance generation processing for use in visual display generation processing. Utterance generation processing depends on the type, subtype, and parameters of the current event as well as on the student data object, which contains the agent student model, student pedagogic parameters, and recently generated behaviors. Therefore, preferably, the selected affect and generated visual displays are responsive to the student pedagogic characteristics or, alternatively, the student cognitive style.

Turning details of utterance generation, utterances and associated affect are generated by selecting options from a hierarchy of tables. This hierarchy, having typically many choices for each level, provides variety in agent behavior. At the highest level of this hierarchy are the tables of utterance templates 908, which are indexed by action type and action subtype. Typically, there are many utterance templates and associated affect for any given action type and subtype, and indexing is according to additional parameters that occur in action lists and additional parameters of student characteristics from the student data object. For example, utterances and affects are further selected according to the educational paradigm employed, student grade level, and student preferences.

At the next level of the utterance generation hierarchy are tables of named slots, which are parametrized phrases, or in other words, functions which use input parameters to return phrases. Utterance templates contain named slots as well as invariable words and sounds. When an utterance template is evaluated, slots with the specified name are selected from the slot table. Typically, there are many slots of a given name, which are further indexed according to additional action list parameters and user characteristics from the student data object. When a slot is selected for use in the utterance template, slot parameters are passed from the utterance template. Alternative embodiments of this invention are adaptable to hierarchies with additional levels of utterance generation tables or additional types of tables at a given level in the hierarchy.

Exemplary Table 10 is a small segment of the utterance template table for an action type of "congratulations" and an action subtype of "performance" and appropriate for a test type paradigm. Table 10 illustrates that the student grade level, obtained from the student data object, is an additional indexing parameter for these utterance templates. Further, each illustrated template includes a slot named "performance-streak-slot," with parameters of grade level, number of problems answered correctly, and total number of problems.

TABLE 10

EXEMPLARY UTTERANCE TEMPLATES (congratulations, performance, grade=4, "You got <performance-streak-slot(4, numright, total)>right.")
(congratulations, performance, grade=4, "You are really getting the hang of it.")
(congratulations, performance, grade=8, "Quite a winning streak - <performance-streak-slot(8, numright, total)>.")
(congratulations, performance, grade=12, "A stellar performance getting <performance-streak-slot(12, numright, total)> right.")

It is preferable that the utterance template table have a large number of utterance templates appropriate to a large number of educations situations. Since the preferable number of type and subtype combinations is at least approximately 500, and since it is preferable to have 10 to 100 responsive utterances per pair, a preferable utterance template table has at least 25,000 entries. A less preferable table has at least 5,000 entries and a more preferable table has at least 50,000 entries. In an embodiment of the invention, less used utterances have fewer candidate responsive utterances without impairing the image of system spontaneity. Thus this invention is adaptable to utterance tables of 1,000 entries.

Exemplary Table 11 is a small segment of the slot table for slots named "performance-streak-slot," any of which could be employed in the previous templates. The illustrated slots evaluate their input parameters to results in phrases. For example the last slot results in the phrase "90 percent" if numright is 9 and total is 10. Further, slots can contain a condition which controls their applicability. In this example it is the fifth component of each entry and only the first slot has an non-null condition.

TABLE 11

EXEMPLARY SLOT ENTRIES (performance-streak-slot, 4–12, numright, total, <numright> > 0.8*<total>, "Nearly all")
(performance-streak-slot, 8–12, numright, total, nil, "<numright> out of <total>")
(performance-streak-slot, 8–12, numright, total, nil, "100*<numright>/<total> percent")

Slots are used to create final, generated utterances with considerable variety. Therefore, it is preferable that the slot tables have at least the same number of entries as the utterance template table. A preferable slot has at least 25,000 entries. A less preferable table has at least 5,000 entries, and a more preferable table has at least 50,000 entries.

The final display of the preferred on-screen agent object is generated from Display Behavior Tables 904 with a similar hierarchical table data structure to that used in utterance generation. At the highest level are on-screen agent actions which contain a cast of one or more personae. At the next level are persona types which the student selects once, or at most once per session. At the next level, associated with each persona type is a library of display behaviors indexed by affect. Exemplary affect types include the following: sad, objective, pleased, happy, disappointed, announce, remind, encourage, reinforce, model, prompt, hint, joke, and tutor. Typically, each affect has many possible behaviors and these are further indexed, as for utterance generation, by parameters appearing in the action list and the student data object. The display behaviors are structured as scripts containing named display objects. These named display objects can optionally involve voice, audio, graphics, or video displays, and they are contained in scripts which can optionally specify a timed animated display or a branching display, where the branches are dependent on student reactions to the display. At the lowest level in the preferred embodiment are the individual named display objects. As for slots, typically there are several parametrized instantiations of each named object. These instantiations are indexed according to the same parameters indexing the display behaviors and in turn use these parameters to generate displays. Alternative embodiments of this invention are adaptable to hierarchies with additional levels of tables for display generation tables or additional types of tables at a given level in the hierarchy.

Exemplary Table 12 is a small segment with personae types adapted to elementary education.

TABLE 12

EXEMPLARY ON-SCREEN AGENT ACTIONS

A frog persona writing the congratulatory message on a tiny blackboard, then jumping up and down croaking "Hurray'.
A robot persona creakily waving its arms and saying the congratulatory message.
An animal persona wearing a cheerleader's outfit jumping up and down, chanting the congratulatory message as a cheer.
The cat says the general part of the encouragement message while pointing to his bird sidekick. The bird then flies across the screen while saying the specific part of the message.

It is preferable that the on-screen agent have a richly varied and engaging behavior. The persona types preferably include recognizable popular figures as well as a rich variety of specially created figures. Persona type tables have a preferable selection of at least 100, and less preferably at least 50 persona types. The libraries of display behaviors preferably have many behaviors for each affect. Since the preferable number of affects is at least 50, and since it is preferable to have 50 to 100 responsive behaviors per affect, a preferable behavior libraries have at least 2,500 entries, and more preferably 5,000 entries, per persona type. A fully implemented ABI system can have preferable behavior libraries with approximately 125,000 entries. This number can be less in situations were more popular persona have fully configured behavior libraries while less popular persona have more limited libraries. Further, the number of persona types can be advantageously limited to only the most popular or more appropriate for the type of student. Thus this invention is adaptable to libraries with approximately 1,000 entries of responsive behaviors.

In implementations of this invention, it is important that the actual content of the utterance tables and the display tables and libraries be sufficiently creative and current to engage the student. Therefore, this content is preferably created by artists, animators, writers, and other creative talent. These elements of sound, voice, animation, graphics and video are collected into libraries of data snips and stored in archives. Further, it is preferable that these tables have an extensive and varied content in order that agent displays repeat only infrequently.

Figure 9:
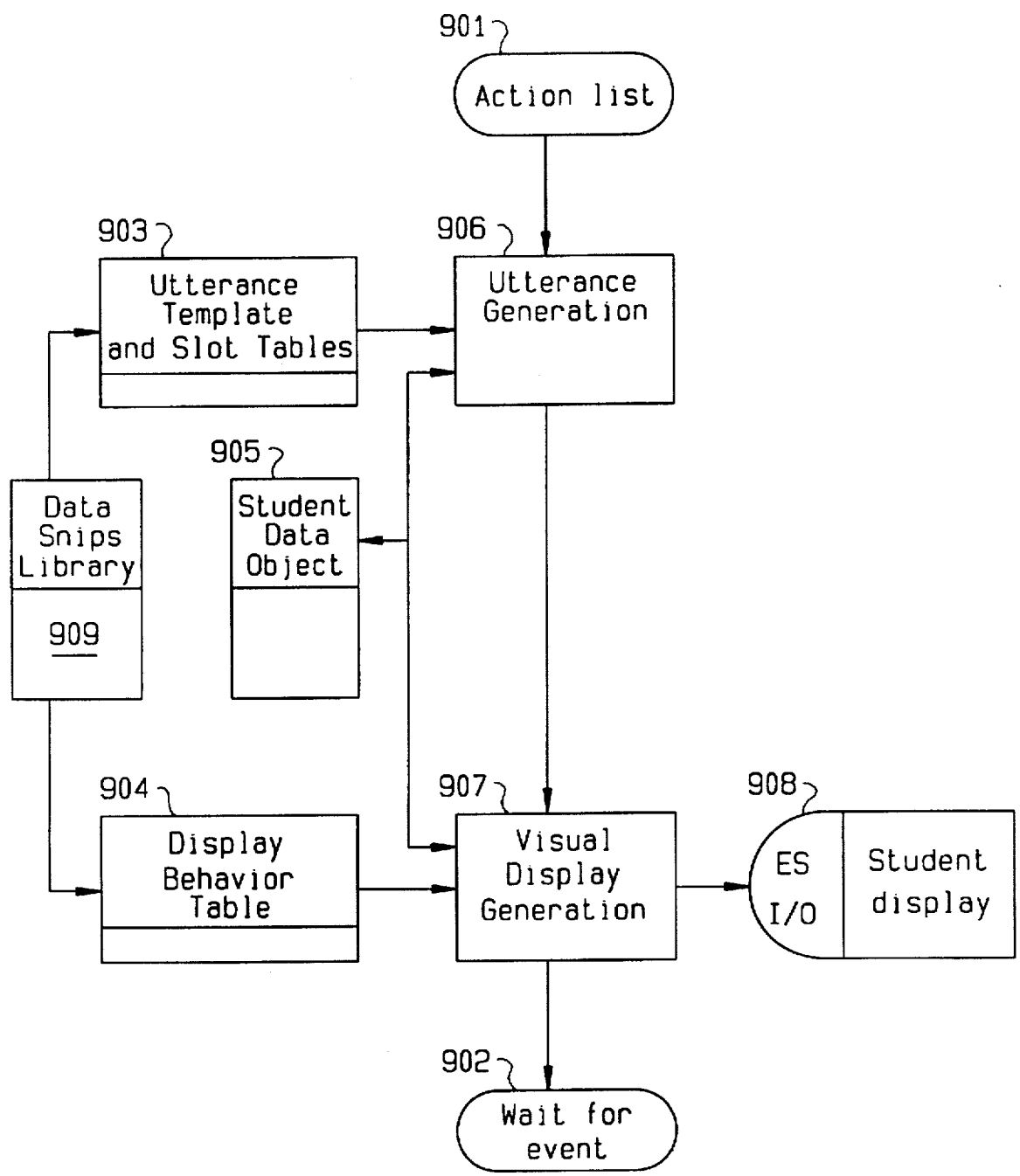
FIG. 9 illustrates agent behavior processing of FIG. 7 in more detail.

Turning now to the process of generating a complete agent display behavior, the steps of this process are described with reference to FIG. 9. The first step is utterance generation 906 which receives as input action list 901. Utterance generation indexes the utterance template table in accord with action list parameters, in particular action type and subtype, and student preferences from the student data object, to obtain candidate utterance templates responsive to the current situation. If no candidates are found, the student preferences are relaxed in a preset order until at least one candidate is found. Typically, more than one candidate is found, and then one template is selected at random from among those templates which have not yet been used previously in this session. A record of agent display behavior during the session is stored in the student data object. The named slots of the selected template are resolved in a similar fashion, by finding candidate named slots and selecting one at random that has not been recently used. An utterance is then generated from the template, the named slot, and the input action list parameters. This utterance and its associated affect is passed to visual display generation.

The second step of agent behavior processing, visual display generation 907, uses the input utterance and associated affect to select candidate responsive displays of that affect from the libraries associated with the student's current persona(e) preference contained in the student data object 905. As with utterance generation, if no candidate is found, student preferences are relaxed until one is found. Typically, more than one is found, and one is selected randomly avoiding recent selections in this session. Display objects referenced in the selected display are similarly found. Finally, the utterance message is sent to the selected display and display objects. These objects contain performance methods that are called to generate and output display script. In a preferred embodiment, the script with references to data snips 909 of voice, sound, graphics, video and animation is incorporated into an applet. An exemplary applet can be a program fragment representing a character scratching his head while saying the utterance and moving across the screen. This output applet is sent to the I/O handlers in the ES for student display 908. Since this completes agent processing for this student or timer event, the system then waits for the next action at wait point 902.

A display action can also reference a preformatted animated sequence stored in the data snip library 909 in which voice, sound, graphics, animation and video have been already integrated. In this case, portions of utterance processing 906 and visual display processing 907 can be bypassed.

In alternative embodiments, selection of utterance or persona candidates from the available contents can be done other than randomly. For example, agent behavior data saved during a session in the student data object can be used to construct performances extending across instances of student actions. In particular, utterance templates and display objects can be selected in a connected manner in order to give agent display the appearance of continuity and realism. This invention is adaptable to other methods of generating performances parametrized by affect and utterance that are known in the art. These methods can include advanced text to speech techniques, 2-D and 3-D graphical generation, and VR effects.

The visualization of agent actions can involve a single character or several characters interacting with each other. If multiple characters are used, they are preferably interrelated. A typical cast is a cat with a bird sidekick. An exemplary interaction of these associated characters involving both dialogue and movement is presented in Table 12.

Continuing story line scripts can be available from the ABI system on a daily basis in a manner similar to a continuing plot in a daily comic strip. These story lines can be applicable to a group of students and individualized where appropriate. In some cases the student's selected persona can introduce a story line and in other cases several personae are directly involved in an interaction. For example, the story line can be used as the basis for a reward such as "We're off to the beach to play volleyball. Join us when you finish your homework, then later help us solve the mystery of the vanishing lake."

In summary, the use of the student data object in agent behavior processing is illustrated in Table 13.

TABLE 13

STUDENT DATA USE IN AGENT BEHAVIOR

| STUDENT DATA | EFFECTS |
| --- | --- |
| Student persona choice | Display persona, including type of character, voice inflection, activity rate, and so forth |
| Student's characteristics, including grade level, language ability, preferences, and so forth | Narrow candidate utterance template and candidate display |
| Previous student interactions with materials or agent | In alternative embodiments, utterance and display can relate to previous interactions. |
| Previous utterances in this session | Selection of different utterance template and slots |
| Previous displays in this session | Selection of different display and display objects |

Particular data in the student data object has an important role in determining agent display and insuring its appropriateness, variety, and individualization.

5.6.5. Agent Adaptivity

The adaptation of the agent to the student, and the ABI system's appearance as a virtual tutor, emerges from the agent's updating of data in the student data object. In the preferred embodiment, the agent's knowledge of the student is represented by data in the student data object, in particular in the student pedagogic model, which stores general materials independent data describing how the student learns, and in the materials specific student performance, which stores performance data specific to particular assigned materials and courses. As the student interacts with the system for instruction or homework, the agent receives event messages, which describe the student's learning and performance. The agent updates the student data object with data from these messages. As this data is updated, the agent adapts to the student, and thereby the virtual tutor individualizes to the student. This adaptation is maintained across sessions with this student.

In the preferred embodiment, the data referenced and updated by the agent are averages or weighted moving averages, giving more weight to recent than past behavior. Thus, the pedagogic model includes, for example, data weighted moving averages of the rates that the student learns discrimination of a certain complexity. Materials specific performance includes, for example, weighted moving averages of data on the student's response time and response latency.

In alternative implementations, agent adaptivity to its student can occur differently. In one alternative embodiment, student model data includes not only averages or weighted moving averages, but also data on the statistical distribution of the parameters involved, such as standard deviations. With this data the agent can recognize the current situation as "normal" or "abnormal" for this student and thereby offer appropriate guidance. Further, this statistical data can optionally include correlations between the agent data, such as between various pedagogic parameters and various materials parameters. In this manner, educational situations can be classified more finely than "normal" or "abnormal" into, for example, "abnormally slow on this fluency drill in view of normal progress on other exercises." In a further embodiment, classification of this statistical data can be done by special executable modules in the agent based on, for example, statistical classification schemes or neural networks.

In a further alternative embodiment, agent action processing can be implemented with more complicated techniques. In the preferred embodiment, agent action processing is done by rules without rule propagation. In alternative embodiments, rule propagation and full rule based systems can be used to transform events into actions. This invention is applicable to other techniques from artificial intelligence that can make this transformation such as Bayesian belief networks.

In another alternative embodiment, the student data object has data modeling student interests and preferences. Such a model enables the agent, for example, to monitor school events and suggest those appropriate to the user. This model also enables the agent to provide rewards tailored to individual students, which enhances the system reinforcement and adds to perceived agent persona personality and to virtual tutor individualization. In a preferred embodiment, this model of student interests can be implemented simply as a set of approximately 200 categories, covering interest in several subdivisions of each school subject area, as well as categories related to sports, leisure time and other areas of student interest. Interest in these categories can be entered in several manners. Student use of the encyclopedia tool can be used to determine areas of current interest. Interest can be directly entered by the student, parent, or teacher. Alternately, student interest in materials can inquired for when the materials terminate. After an assignment, the student could provide semiotic feedback by selecting from a row of faces with different expressions. Alternately, the student can be quizzed on interests in a posed branching manner.

6. SPECIFIC EMBODIMENTS, CITATION OF REFERENCES

The present invention is not to be limited in scope by the specific embodiments described herein. Indeed, various modifications of the invention in addition to those described herein will become apparent to those skilled in the art from the foregoing description and accompanying figures. Such modifications are intended to fall within the scope of the appended claims.

Various publications are cited herein, the disclosures of which are incorporated by reference in their entireties.

What is claimed is:

1. A method of operating an agent based instruction system for interactive instruction of a student over a plurality of instructional sessions, said method comprising:
   (a) presenting interactive instruction to said student by executing one or more materials on a computer accessed by said student for a current instructional session;
   (b) monitoring said interactive instruction of said student during said current instructional session;
   (c) storing information responsive to said monitoring of said student during said current instructional session for use during subsequent instructional sessions;
   (d) outputting information on said computer to guide said student in said interactive instruction, said output information responsive to said monitoring of said student during said current instructional session and to said stored information responsive to said monitoring of said student during previous instructional sessions;
   (e) controlling said one or more materials, said controlling responsive to said monitoring of said student during said current instructional session and to said stored information responsive to said monitoring of said student during previous instructional sessions, and wherein said one or more instructional materials are responsive to said controlling;

whereby said system acts as a virtual tutor adapted to said student, said virtual tutor guiding said interactive instruction of said student, and said interactive instruction presented by said system is individualized to said student.

2. The method according to claim 1 wherein said step of monitoring further comprises monitoring pedagogic characteristics of said interactive instruction of said student by said one or more materials, and said step of controlling further comprises controlling said one or more materials in order to present interactive instruction with said pedagogic characteristics.

3. The method according to claim 2 wherein said pedagogic characteristics are selected from the group comprising time pacing of interactive instruction, new concept seeding rate, density of examples, and discrimination difficulty.

4. The method according to claim 1 wherein said step of monitoring further comprises monitoring according to an instructional context and an instructional format adopted by each of said one or more materials.

5. The method according to claim 1 further comprising before said step of controlling and said step of outputting a further step of generating at least one action responsive to said monitoring of said student during said current instructional session and to said stored information responsive to said monitoring of said student during previous instructional sessions, and wherein said step of controlling is responsive to said generated action(s) and wherein said step of outputting is responsive to said generated action(s).

6. The method according to claim 5 wherein said of generating step generates action(s) according to one or more tables of rules.

7. The method according to claim 5 wherein said of generating step generates action(s) according to one or more methods selected from the group of expert systems, neural networks, Bayesian belief networks, and statistical pattern recognition.

8. The method according to claim 1 further comprising prior to said step of outputting a step of inputting at least one request of said student for guidance in said interactive instruction, and wherein said output information is further responsive to said input requests.

9. The method according to claim 1 wherein said computer accessed by said student is one computer of a plurality of computers interconnected by a network, and wherein said student can access any of said plurality of computers for an instructional session.

10. The method according to claim 1 wherein said one or more materials is a plurality of materials.

11. The method according to claim 1 wherein said one or more students is a plurality of students.

12. The method according to claim 1 wherein said step of monitoring further comprises monitoring pedagogic information describing the pedagogic characteristics of said student in a manner independent of the subject matters of said one or more materials.

13. The method according to claim 1 wherein said step of monitoring further comprises monitoring progress and performance information describing the progress and performance of said student in said interactive instruction presented by each of said one or more materials.

14. The method according to claim 1 wherein said step of storing further comprises storing said information responsive to said monitoring in one of one or more student data objects, each student data object of said one or more student data objects being uniquely associated with exactly one student of said one or more students.

15. A computer readable medium comprising instructions for performing a method of operating an agent based instruction system for interactive instruction of a student over a plurality of instructional sessions, said method comprising:
   (a) presenting interactive instruction to said student by executing one or more materials on a computer accessed by said student for a current instructional session;
   (b) monitoring said interactive instruction of said student during said current instructional session;
   (c) storing information responsive to said monitoring of said student during said current instructional session for use during subsequent instructional sessions; and
   (d) outputting information on said computer to guide said student in said interactive instruction, said output information responsive to said monitoring of said student during said current instructional session and to said stored information responsive to said monitoring of said student during previous instructional sessions;
   whereby said system acts as a virtual tutor adapted to said student, said virtual tutor guiding said interactive instruction of said student.

16. The method according to claim 15 wherein said step of monitoring further comprises monitoring pedagogic information describing the pedagogic characteristics of said student, wherein said selected display behavior comprises one or more personae, and wherein said selected visual display is further responsive to said pedagogic information;
   whereby said one or more personae present a lifelike appearance individualized to said student's cognitive style.

17. A method of operating an agent based instruction system for interactive instruction of a student over a plurality of instructional sessions, said method comprising:
   (a) presenting interactive instruction to said student by executing one or more materials on a computer accessed by said student for a current instructional session;
   (b) monitoring said interactive instruction of said student during said current instructional session;
   (c) storing information responsive to said monitoring of said student during said current instructional session for use during subsequent instructional sessions; and
   (d) outputting information on said computer to guide said student in said interactive instruction, said output information responsive to said monitoring of said student during said current instructional session and to said stored information responsive to said monitoring of said student during previous instructional sessions;
   wherein said output information further comprises an utterance, and wherein the step of outputting further comprises a step of selecting said utterance from one or more candidate utterances, and a further step of outputting said utterance as text or speech;
   whereby said system acts as a virtual tutor adapted to said student, said virtual tutor guiding said interactive instruction of said student.

18. The method according to claim 17 wherein said step of selecting further comprises selecting said one or more candidate utterance from one or more tables of utterances.

19. The method according to claim 18 wherein said one or more table of utterances comprise at least 1,000 utterances.

20. The method according to claim 17 wherein said one or more candidate utterances comprises at least 10 utterances.

21. A method of operating an agent based instruction system for interactive instruction of a student over a plurality of instructional sessions, said method comprising:
   (a) presenting interactive instruction to said student by executing one or more materials on a computer accessed by said student for a current instructional session;
   (b) monitoring said interactive instruction of said student during said current instructional session;
   (c) storing information responsive to said monitoring of said student during said current instructional session for use during subsequent instructional sessions; and
   (d) outputting information on said computer to guide said student in said interactive instruction, said output information responsive to said monitoring of said student during said current instructional session and to said stored information responsive to said monitoring of said student during previous instructional sessions;
   wherein said responsive output information further comprises a display behavior, and wherein the step of outputting further comprises a step of selecting said display behavior from one or more candidate display behaviors, and a further step of outputting said display behavior;
   whereby said system acts as a virtual tutor adapted to said student, said virtual tutor guiding said interactive instruction of said student.

22. The method according to claim 21 wherein said step of selecting further comprises selecting one or more candidate display behaviors from one or more tables of display behaviors.

23. The method according to claim 22 wherein said one or more tables of display behaviors comprise at least 1,000 display behaviors.

24. The method according to claim 21 wherein said one or more candidate display behaviors comprises at least 10 display behaviors.

25. The method according to claim 21 wherein said step of outputting said selected display behavior comprises outputting one or more modalities selected from the group consisting of text, voice, audio, animation, video, and preformatted animated sequences.

26. The method according to claim 21 wherein said selected display behavior comprises one or more persona.

27. A method of operating an agent based instruction system for interactive instruction of a student over a plurality of instructional sessions, said method comprising:
    (a) presenting interactive instruction to said student by executing one or more materials on a computer accessed by said student for a current instructional session;
    (b) monitoring said interactive instruction of said student during said current instructional session;
    (c) storing information responsive to said monitoring of said student during said current instructional session for use during subsequent instructional sessions; and
    (d) outputting information on said computer to guide said student in said interactive instruction, said output information responsive to said monitoring of said student during said current instructional session and to said stored information responsive to said monitoring of said student during previous instructional sessions;
    wherein said one or more materials further comprise a material engine and one or more materials data, and wherein said step of presenting interactive instruction by executing one or more materials further comprises executing said materials engine which references said one or more materials data;
    whereby said system acts as a virtual tutor adapted to said student, said virtual tutor guiding said interactive instruction of said student.

28. The method according to claim 27 wherein said materials data further comprise notations, and wherein said step of monitoring further comprises said materials engine referencing said notations in order to generate monitoring information.

29. A method of operating an agent based instruction system for interactive instruction of one or more students over a plurality of instructional sessions, said method comprising:
    (a) presenting interactive instruction to one of said students by executing one or more materials on a computer accessed by said student for a current instructional session;
    (b) monitoring said interactive instruction of said student during said current instructional session;
    (c) storing information responsive to said monitoring of said student during said current instructional session for use during subsequent instructional sessions;
    (d) determining an affect responsive to said monitoring of said student during said current instructional session and to said stored information responsive to said monitoring of said student during previous instructional sessions; and
    (e) outputting information on said computer to guide said student in said interactive instruction, said output information responsive to said affect, to said monitoring of said student during said current instructional session, and to said stored information responsive to said monitoring of said student during previous instructional sessions, said output information comprising a visual display;
    whereby said visual display is responsive to said affect and to said interactive instruction in a life-like manner.

30. The method according to claim 29 wherein said step of monitoring further comprises monitoring pedagogic characteristics of said student, and wherein the step of determining an affect determines an affect further responsive to said pedagogic characteristics;
    whereby said visual display is responsive in a life-like manner individualized to said student's cognitive style.

31. The method according to claim 29 wherein said output information further comprises an utterance, and wherein the step of outputting further comprises a step of selecting said utterance from one or more tables of utterances in a manner responsive to said monitoring and to said stored information, and a further step of outputting said utterance as text or speech;
    whereby said utterance and said visual display are responsive in a life-like manner.

32. The method according to claim 29 wherein said step of outputting further comprises selecting said visual display from one or more tables of visual displays in a manner responsive to said affect, to said monitoring, and to said stored information.

33. The method according to claim 29 wherein said selected display behavior comprises one or more persona.

34. An agent based instruction system for interactive instruction of one or more students, said system comprising:
    (a) one or more computers having interactive input/output devices and interconnected by a network;
    (b) one or more materials executable on said one or more computers, each said material for presenting interactive instruction to said one or more students and for generating monitoring information that monitors said interactive instruction; and
    (c) one or more agents executable on said one or more computers, each said agent associated with exactly one of said students and each said student associated with exactly one of said agents, each said agent comprising
        (i) action processing for controlling said one or more materials to instruct said associated student, said controlling being responsive to said monitoring information that monitors said interactive instruction of said associated student, and
        (ii) behavior processing for outputting information to guide said associated student, said outputting being responsive to said monitoring information that monitors said interactive instruction of said associated student;
    whereby said system acts as a virtual tutor to each of said students and said interactive instruction of each of said students is individualized to each student.

35. The system according to claim 34 further comprising executive software for interfacing said one or more materials and said one or more agents to said one or more computers and to said network.

36. The system according to claim 34 wherein said network is configured to permit any one of said students to access any one of said one or more materials from any one of said computers.

37. The system according to claim 34 wherein said network is configured to permit one or more of said computers to be located in one or more locations.

38. The system according to claim 37 wherein one or more of said locations are residences of one or more of said students.

39. The system according to claim 37 wherein one or more of said materials presents homework to one or more of said students.

40. The system according to claim 34 wherein said network is further configured to be a packet switched network.

41. The system according to claim 34 wherein said agent action processing is further responsive to a request for guidance from said associated student, and wherein said agent behavior processing is further responsive to said request for guidance.

42. The system according to claim 41 wherein said agent behavior processing further comprises (i) utterance generation processing for selecting an utterance and an affect responsive to said monitoring information or to said request for guidance, and (ii) visual display generation for selecting a visual display responsive to said utterance and said affect.

43. The system according to claim 42 wherein said agent behavior processing selects said utterance and said visual display to represent a persona, said selection being from a table of available personas and according to the preferences of said associated student.

44. The system according to claim 34 wherein said materials further comprise instructional materials executable on said computers for interactive instruction of said students, and tools executable on said computers for assistance of said students in said interactive instruction.

45. The system according to claim 44 wherein said instructional materials further comprise instructional materials appropriate to primary or secondary education.

46. The system according to claim 44 wherein said tools further comprise one or more tools selected from the group comprising a calculator, a dictionary, a thesaurus, an atlas, an encyclopedia, and a network search tool.

47. The system according to claim 44 wherein said tools further comprise a starfish tool for displaying and selecting relationships.

48. The system according to claim 34 further comprising one or more schedule/calendar tools executable on said computers, each said schedule/calendar tool associated with exactly one of said plurality of students and each said student associated with exactly one of said schedule/calendar tools, each said schedule/calendar tools for outputting to said associated student information relating to scheduled activities of said associated student, and for providing to said agent of said associated student information relating to scheduled activities of said associated student.

49. The system according to claim 48 further comprising data areas for each of said students characterizing scheduled activities according to deadline date and priority, and wherein said schedule/calendar tool further limits said associated student to interactive instruction according to said data areas characterizing said scheduled activities.

50. The system according to claim 34 further comprising one or more communication tools executable on said computers for providing forms of interactive group instruction to a group of said students, and for generating monitoring information that monitors said group instruction of each student in said group.

51. The system according to claim 50 where said forms of group instruction are selected from the group consisting of exchange of messages, group work on a shared material, and group participation in educational contests.

52. The system according to claim 34 wherein one or more of said materials further comprises materials engine software and materials data, and wherein said materials engine process said materials data to present said interactive instruction.

53. The system according to claim 52 wherein each of said materials data further comprises:

(a) a plurality of display objects for presentation;
(b) sequencing logic for controlling the order of said presentation of said plurality of display objects; and
(c) notations for causing generation of said monitoring information.

54. The system according to claim 34 wherein one or more of said materials comprises a program having data and instructions.

55. The system according to claim 34 wherein one or more of said materials comprises a program having data and instructions.

56. The system according to claim 55 wherein said data in said pedagogic information data areas does not depend on the subject matter of said one or more materials.

57. The system according to claim 55 wherein said agent action processing updates said pedagogic information data areas associated with said agent's associated student, said updating being responsive to said monitoring information, whereby said associated agent adapts to said student.

58. The system according to claim 55 further comprising progress and performance data areas for each student, said progress and performance data areas comprising data describing progress and performance of each said student in said interactive instruction, and wherein said agent action processing and said agent behavior processing are further responsive to said progress and performance information data areas.

59. The system according to claim 58 wherein said agent action processing updates said progress and performance data areas associated with said associated student of said agent, said updating responsive to said monitoring information;

whereby said associated agent adapts to said student.

60. The system according to claim 34 wherein one or more of said materials presents said interactive instruction according to an education paradigm, and wherein said monitoring information further comprises pedagogic information classified according to said education paradigm of said materials.

61. The system according to claim 60 further comprising control parameters for each material that have an educational paradigm, wherein each material presents said interactive instruction according to values of said control parameters, and wherein said agent action processing assigns said values of said control parameters;

whereby said agent action processing controls said materials.

62. The system according to claim 59 wherein said educational paradigm is selected from the group consisting of interactive tutorial, fluency exercise, paired association exercise, discrimination formation exercise, and simulation exercise.

63. The system according to claim 59 wherein said educational paradigm is standardized according to an instructional context and an instructional format.

64. The system according to claim 62 wherein said instructional context is selected from the group consisting of prerequisite test, prerequisite review, pretest, new material introduction, new material discrimination, new material review, fluency exercise practice, review practice, and unit mastery test.

65. The system according to claim 63 wherein said instructional format is selected from the group consisting of multiple choice, unprompted fill-in-the-blank, fill-in-the-blank selected from a list, paired associates by letter, paired associates by dragging, paired associates by matching, computation, simulation to identify parts of figures or text, and simulation game.

66. The system according to claim 34 wherein said agent action processing generates at least one action responsive to said monitoring information.

67. The system according to claim 66 wherein said agent action processing further comprises software using one or more techniques selected from the group of expert systems, neural networks, Bayesian belief networks, and statistical pattern recognition.

68. The system according to claim 66 further comprising a plurality of tables of rules, and wherein said agent action processing software further comprises software referencing said plurality of tables of rules in order to control said one or more materials and to generate said action(s).

69. The system according to claim 68 wherein said plurality of tables of rules comprises a policy filter table, a decision weight table, and a selection criteria table, and wherein said agent action processing references said policy filter table for determining one or more candidate actions, references said decision weight table for ranking said one or more candidate actions, and references said selection criteria table for selecting said action(s) from said ranked candidate actions.

70. The system according to claim 66 wherein said agent behavior processing is responsive to said action(s) in order to output information responsive to said monitoring information.

71. The system according to claim 70 further comprising a plurality of tables of possible outputs, and wherein said agent behavior processing software references said tables of possible outputs.

72. The system according to claim 71 wherein said one or more tables of possible outputs further comprise an utterance template table and a display behavior table, and wherein said agent behavior processing references said utterance template table for selecting an utterance and an affect according to said action(s), and references said display behavior table for selecting a visual display according to said action(s), said utterance, and said affect.

73. The system according to claim 70 wherein said agent behavior processing outputs information in a plurality of output modalities.

74. The system according to claim 70 wherein said output modalities are one or more output modalities selected from the group consisting of text, graphics, speech, audio, animation, video, and preformatted animated sequences.

75. The system according to claim 34 further comprising one or more student data objects, each of said student data objects associated with exactly one student, and wherein each agent stores information reflecting said monitoring information of said one student associated with said agent in said one student data object associated with said associated student.

76. The system according to claim 75 wherein said student data object associated with one student further comprises:

(a) pedagogic information describing a pedagogic model of said one student; and (b) progress and performance information for describing the progress and performance of said student in said materials.

77. The system according to claim 76 wherein said agent associated with each student further comprises agent software and said student data object associated with said student, and wherein said agent software references and updates said associated student data object.

78. The system according to claim 34 wherein one or more of said computers are configured as server systems, wherein said server systems store said one or more materials and one or more agents, and wherein said one or more computers downloads said materials and said one or more agents from said one or more server systems across said computer network.

79. The system according to claim 78 further comprising databases of pedagogic information and materials progress and performance information for said one or more students, and wherein said databases are stored on said server systems.

80. The system according to claim 79 further comprising reporting software for generating reports from said databases of pedagogic information and materials progress and performance information for said one or more students.

81. The system according to claim 34 further comprising one or more system managers executable on said one or more computers, wherein said interactive input/output devices include a computer display at each of said one or more computers, and wherein said system manager executing on one computer partitions said display of said one computer into one or more display areas.

82. The system according to claim 81 wherein said one or more display areas are selected from the group comprising an agent area for agent interactivity, a materials area for materials interactivity, and a system area in which said system manager displays selection icons for available system tools and facilities.

83. The system according to claim 82 wherein said one or more materials and said one or more agents provide facilities always available to said one or more students and said materials area and said agent area comprise sub-areas whose selection activates one of said always available facilities.

84. The system according to claim 82 wherein said one or more display areas change in size from time to time.

85. The system according to claim 34 wherein one or more teachers directs instruction of one or more of said students, said system further comprising:

(a) one or more teacher materials executable on said one or more computers, each said teacher material for presenting interactive instruction to teachers in the use of said system and in the use of materials directed to said students and for generating monitoring information that monitors said interactive instruction; and (b) one or more teacher agents executable on said one or more computers, each said teacher agent associated with exactly one of said teachers and each said teacher associated with exactly one of said agents, each said agent comprising (i) action processing for controlling said one or more materials to instruct said associated teacher, said controlling being responsive to said monitoring information that monitors said interactive instruction of said associated teacher, and (ii) behavior processing for outputting information to guide said associated teacher, said outputting being responsive to said monitoring information that monitors said interactive instruction of said associated teacher.

86. An agent based instruction system for interactive instruction of one or more students, said system comprising:

(a) one or more computers having interactive input/output devices and interconnected by a network;

(b) one or more materials executable on said one or more computers, each said material for presenting interactive instruction to said one or more students and for generating monitoring information that monitors said interactive instruction; and (c) one or more agents executable on said one or more computers, each said agent associated with exactly one of said students and each said student associated with exactly one or said agents, each said agent comprising (i) utterance generation processing for selecting an affect and an utterance to guide said one associated student, said selecting of said affect and said utterance being responsive to said monitoring information that monitors said interactive instruction of said one associated student, and (ii) visual display generation for selecting a visual display to guide said one associated student, said selecting of said visual display being responsive to said affect, to said utterance, and to said monitoring information that monitors said interactive instruction of said associated student, and (iii) output processing for outputting to said associated student said selected utterance and said selected visual display;

whereby said selected visual display and said selected utterance are responsive to said affect and to said interactive instruction in a life-like manner.

87. The system according to claim 86 wherein said monitoring information further comprises pedagogic information describing the pedagogic characteristics of said associated student, and wherein utterance generation processing selects an affect further responsive to said pedagogic information;

whereby said selected visual display and said selected utterance are further responsive in a manner individualized to a cognitive style of said associated student.

88. The system according to claim 86 wherein said utterance generation processing selects said affect and said utterance from one or more tables of utterances.

89. The system according to claim 86 wherein said visual display processing selects said visual display from one or more tables of visual displays.

90. The system according to claim 86 wherein said selected visual display comprises one or more persona.

91. The system according to claim 86 further comprising action processing for generating at least one action and for controlling said one or more materials to instruct said associated student, said generating and said controlling being responsive to said monitoring information that monitors said interactive instruction of said associated student, and wherein said utterance generation processing and said visual display selection processing are further responsive to said action(s).

92. A method of operating an agent based instruction system for instruction of a plurality of students, said method comprising:

(a) executing one or more materials on a computer for presenting interactive instruction to one student of said plurality of students, said computer being one computer of a plurality of computers interconnected by a network, each computer of said plurality having interactive input/output devices;

(b) generating monitoring information that monitors said interactive instruction presented to said student; and (c) outputting information on said computer to guide said student in said interactive instruction, said outputting information responsive to said monitoring information of said interaction instruction of said student;

(d) controlling said one or more materials to instruct said student, said controlling being responsive to said information monitoring the interactive instruction of said student;

(e) selecting an utterance and an affect from one or more utterance tables in a manner responsive to said controlling step; and (f) selecting a visual display from one or more tables of display behaviors in a manner responsive to said utterance, said affect, and said controlling step;

whereby said interactive instruction is individualized to each student of said plurality of students and said system acts as a virtual tutor adapted to said student, said virtual tutor guiding said interactive instruction of said student.

93. A method of operating an agent based instruction system for instruction of a plurality of students, said method comprising:

(a) executing one or more materials on a computer for presenting interactive instruction to one student of said plurality of students, said computer being one computer of a plurality of computers interconnected by a network, each computer of said plurality having interactive input/output devices;

(b) generating monitoring information that monitors said interactive instruction presented to said student; and (c) controlling said one or more materials to instruct said student, said controlling being responsive to said information monitoring the interactive instruction of said student and in accordance with one or more tables of rules;

wherein said one or more tables of rules further comprise a policy filter table, a decision weight table, and a selection criteria table, and wherein said controlling step controls said one or more materials according to one or more determined controlling actions, and wherein said controlling step references said policy filter table for determining one or more candidate controlling actions, references said decision weight table for ranking said one or more candidate controlling actions, and references said selection criteria table for selecting one or more controlling actions from said ranked candidate controlling actions;

whereby said interactive instruction is individualized to each student of said plurality of students.

94. A method of operating an agent based instruction system for instruction of a plurality of students, said method comprising:

(a) a step for executing one or more materials on a computer for presenting interactive instruction to each student, said computer being one computer of a plurality of computers interconnected by a network, each computer of said plurality having interactive input/ output devices;

(b) a step for generating monitoring information that monitors said interactive instruction presented to each student of said plurality of students;

(c) a step for controlling said one or more materials to instruct each student, said controlling being responsive to said information monitoring the interactive instruction of each student; and (d) a step of outputting information to each student in order to guide each student in said interactive instruction, said outputting step responsive to said information monitoring the interactive instruction of each student and responsive to said controlling step;

whereby said interactive instruction is individualized to each student of said plurality of students and acts as a virtual tutor individualized to each student.

95. The method according to claim 94 further comprising after said loading step a further step of maintaining a model of said one student, said maintaining responsive to said monitoring information of said student, and wherein the step for outputting and the step of controlling are further responsive to said model of said student, whereby said outputting step and said controlling step adapt to said student thereby individualizing said interactive instruction of said student.

96. The method according to claim 94 wherein said step for controlling further comprises controlling according to one or more methods selected from the group consisting of expert systems, neural networks, Bayesian belief networks, and statistical pattern recognition.

97. The method according to claim 94 wherein the step for executing further comprises executing one or more of said one or more materials according to an educational paradigm, and wherein said monitoring information further comprises pedagogic information classified according to said educational paradigm adopted by said one or more materials.

98. The method according to claim 94 wherein said educational paradigm is standardized according to an instructional context and an instructional format.

99. The method according to claim 94 further comprising after said generating step a further step of updating one student model of a plurality of student models, each student of said plurality of students being associated with exactly one student model, said updating being responsive to the information monitoring the interactive instruction of said student, and wherein the step for controlling said one or more materials to instruct each student is further responsive to said student model of said student;

whereby said one or more materials are individualized to said student.

100. The method according to claim 99 wherein said step of updating further comprises updating pedagogic information in said student model, said pedagogic information describes pedagogic characteristics of said student of said plurality of students in a manner independent of the subject matters of said one or more materials.

101. The method according to claim 99 wherein said step of updating further comprises updating progress and performance information in said student model, wherein said progress and performance information describes the progress and performance of said student in said interactive instruction presented by each of said one or more materials.

102. The method according to claim 94 further comprising prior to said controlling step (i) a step of executing one scheduler/calendar tool of a plurality of scheduler/calendar tools, each student of said plurality of students being associated with exactly one scheduler/calendar tool, said one scheduler/calendar tool providing said student with information relating to scheduled activities of said student, and (ii) a step of generating monitoring information that monitors said scheduled activities of said student.

103. The method according to claim 102 wherein the step of executing executes one or more materials that relate to said scheduled activities of said student.

104. An agent based instruction system for instruction of a plurality of students, said system comprising:

(a) means for presenting interactive instruction to each student by one or more materials;

(b) means for generating monitoring information that monitors said interactive instruction presented to each student;

(c) means for controlling said one or more materials to instruct each student, said controlling being responsive to said information monitoring the interactive instruction of each student; and (d) means for outputting information to each student in order to guide each student in said interactive instruction, said means for outputting being responsive to said information monitoring the interactive instruction of each student and responsive to said means for controlling;

whereby said interactive instruction is individualized to each student and said acts as a virtual tutor individualized to each student.

105. The system according to claim 104 further comprising one or more schedule/calendar tools executable on said computers, each said schedule/calendar tool associated with exactly one of said plurality of students and each said student associated with exactly one of said tools, each said schedule/calendar tool for outputting to said associated student information relating to scheduled activities of said associated student.

106. The system according to claim 105 further comprising data areas for each of said students characterizing scheduled activities according to deadline date and priority, and wherein said schedule/calendar tool further limits said associated student to interactive instruction according to said data areas characterizing said scheduled activities.

107. The system according to claim 104 further comprising pedagogic information data areas for each student, said pedagogic information data areas comprising data for a pedagogic model of said student.

108. The system according to claim 104 further comprising progress and performance data areas for each student, said progress and performance data areas comprising data describing progress and performance of each said student in said interactive instruction.

109. The system according to claim 104 wherein one or more of said materials presents said interactive instruction according to an education paradigm, and wherein said monitoring information further comprises pedagogic information classified according to said education paradigm of said materials.

110. The system according to claim 109 further comprising control parameters for each material that have an educational paradigm, wherein each material presents said interactive instruction according to values of said control parameters.

111. The system according to claim 104 further comprising a plurality of tables of rules which are referenced in order to control said one or more materials.

112. The method according to claim 104 wherein said means for controlling controls said one or more materials according to one or more methods selected from the group consisting of expert systems, neural networks, Bayesian belief networks and statistical pattern recognition.

113. The system according to claim 104 further comprising one or more student data objects, each of said student data objects associated with exactly one student, each student data object storing monitoring information of said one student associated with said object.

114. The system according to claim 113 wherein said student data object associated with one student further comprises:

(a) pedagogic information describing a pedagogic model of said one student; and (b) progress and performance information for describing the progress and performance of said student in said materials.

115. An agent based instruction system for instruction of a student, said system comprising:

(a) one or more materials executable on a computer for presenting interactive instruction to said student, said computer having interactive input/output devices; and (b) an agent executable on said computer, said agent (i) receiving monitoring information from each of said one or more materials that monitors said interactive instruction of said student, (ii) controlling said one or more materials to instruct said student, said controlling being responsive to said monitoring information, and (iii) outputting information to guide said student, said outputting being responsive to said monitoring information.

116. The system according to claim 115 further comprising one or more schedule/calendar tools executable on said computers, each said schedule/calendar tool associated with exactly one of said plurality of students and each said student associated with exactly one of said schedule/calendar tools, each said schedule/calendar tool for outputting to said associated student information relating to scheduled activities of said associated student, and for providing to said agent information relating to scheduled activities of said associated student.

117. The system according to claim 116 further comprising data areas for each of said students characterizing scheduled activities according to deadline date and priority, and wherein said schedule/calendar tool further limits said associated student to interactive instruction according to said data areas characterizing said scheduled activities.

118. The system according to claim 115 further comprising pedagogic information data areas for each student, said pedagogic information data areas comprising data for a pedagogic model of said student, and wherein said agent is further responsive to said pedagogic information data areas.

119. The system according to claim 115 further comprising progress and performance data areas for each student, said progress and performance data areas comprising data describing progress and performance of each said student in said interactive instruction, and wherein said agent is further responsive to said progress and performance information data areas.

120. The system according to claim 119 wherein said agent updates said progress and performance data areas associated with said associated student of said agent, said updating responsive to said monitoring information;
whereby said associated agent adapts to said student.

121. The system according to claim 115 wherein one or more of said materials presents said interactive instruction according to an education paradigm, and wherein said monitoring information further comprises pedagogic information classified according to said education paradigm of said materials.

122. The system according to claim 121 further comprising control parameters for each material that have an educational paradigm, wherein each material presents said interactive instruction according to values of said control parameters, and wherein said agent assigns said values of said control parameters;
whereby said agent controls said materials.

123. The system according to claim 115 further comprising a plurality of tables of rules, and wherein said agent further comprises software referencing said plurality of tables of rules in order to control said one or more materials and to generate one or more actions by said agent.

124. The system according to claim 123 wherein said plurality of tables of rules comprises a policy filter table, a decision weight table, and a selection criteria table, and wherein said agent references said policy filter table for determining one or more candidate actions, references said decision weight table for ranking said one or more candidate actions, and references said selection criteria table for selecting said action(s) from said ranked candidate actions.

125. The system according to claim 123 further comprising an utterance template table and a display behavior table, and wherein said agent references said utterance template table for selecting an utterance and an affect according to said action(s), and references said display behavior table for selecting a visual display according to said action(s), said utterance, and said affect.

126. The system according to claim 115 further comprising one or more student data objects, each of said student data objects associated with exactly one student, and wherein each agent stores information reflecting said monitoring information of said one student associated with said agent in said one student data object associated with said associated student.

127. The system according to claim 126 wherein said student data object associated with one student further comprises:
(a) pedagogic information describing a pedagogic model of said one student; and
(b) progress and performance information for describing the progress and performance of said student in said materials.

128. The system according to claim 126 wherein said agent associated with each student further comprises agent software and said student data object associated with said student, and wherein said agent software references and updates said associated student data object.

129. The system according to claim 115 wherein one or more teachers directs instruction of one or more of said students, said system further comprising:
(a) one or more teacher materials executable on a computer, each said teacher material for presenting interactive instruction to teachers in the use of said system and in the use of materials directed to said students and for generating monitoring information that monitors said interactive instruction; and
(b) one or more teacher agents executable on a computer, each said teacher agent associated with exactly one of said teachers and each said teacher associated with exactly one of said agents, each said agent comprising
(i) action processing for controlling said one or more materials to instruct said associated teacher, said controlling being responsive to said monitoring information that monitors said interactive instruction of said associated teacher, and
(ii) behavior processing for outputting information to guide said associated teacher, said outputting being responsive to said monitoring information that monitors said interactive instruction of said associated teacher.

130. The system according to claim 115 wherein said one or more materials are controlled according to one or more methods selected from the group consisting of expert systems, neural networks, Bayesian belief networks and statistical pattern recognition.

131. A system for agent-based, interactive instruction of one or more students over a plurality of instructional sessions, said system comprising:
(a) means for presenting interactive instruction to one of said students by executing one or more materials on a computer accessed by said student for a current instructional session;
(b) means for monitoring said interactive instruction of said student during said current instructional session;
(c) means for storing information responsive to said monitoring of said student during said current instructional session for use during subsequent instructional sessions; and (d) means for outputting information on said computer to guide said student in said interactive instruction, said output information responsive to said monitoring of said student during said current instructional session and to said stored information responsive to said monitoring of said student during previous instructional sessions;

whereby said system acts as a virtual tutor adapted to said student, said virtual tutor guiding said interactive instruction of said student.

132. The system according to claim 131 further comprising one or more schedule/calendar tools executable on said computers, each said schedule/calendar tool associated with exactly one of said plurality of students and each said student associated with exactly one of said schedule/calendar tools, each said schedule/calendar tool for outputting to said associated student information relating to scheduled activities of said associated student.

133. The system according to claim 132 further comprising data areas for each of said students characterizing scheduled activities according to deadline date and priority, and wherein said schedule/calendar tool further limits said associated student to interactive instruction according to said data areas characterizing said scheduled activities.

134. The system according to claim 131 further comprising pedagogic information data areas for each student, said pedagogic information data areas comprising data for a pedagogic model of said student.

135. The system according to claim 131 further comprising progress and performance data areas for each student, said progress and performance data areas comprising data describing progress and performance of each said student in said interactive instruction.

136. The system according to claim 131 wherein one or more of said materials presents said interactive instruction according to an education paradigm, and wherein said monitoring information further comprises pedagogic information classified according to said education paradigm of said materials.

137. The system according to claim 136 further comprising control parameters for each material that have an educational paradigm, wherein each material presents said interactive instruction according to values of said control parameters.

138. The system according to claim 131 further comprising a plurality of tables of rules which are referenced in order to control said one or more materials.

139. The system according to claim 131 further comprising one or more student data objects, each of said student data objects associated with exactly one student, each student data object storing monitoring information of said one student associated with said object.

140. The system according to claim 139 wherein said student data object associated with one student further comprises:
(a) pedagogic information describing a pedagogic model of said one student; and
(b) progress and performance information for describing the progress and performance of said student in said materials.

141. A system for agent-based, interactive instruction of one or more students over a plurality of instructional sessions, said system comprising:
(a) means for presenting interactive instruction to one of said students by executing one or more materials on a computer accessed by said student for a current instructional session;

(b) means for monitoring said interactive instruction of said student during said current instructional session;
(c) means for storing information responsive to said monitoring of said student during said current instructional session for use during subsequent instructional sessions;
(d) means for determining an affect responsive to said monitoring of said student during said current instructional session and to said stored information responsive to said monitoring of said student during previous instructional sessions; and
(e) means for outputting information on said computer to guide said student in said interactive instruction, said output information responsive to said affect, to said monitoring of said student during said current instructional session, and to said stored information responsive to said monitoring of said student during previous instructional sessions, said output information comprising a visual display;

whereby said visual display is responsive to said affect and to said interactive instruction in a life-like manner.

142. The system according to claim 141 further comprising one or more schedule/calendar tools executable on said computers, each said schedule/calendar tool associated with exactly one of said plurality of students and each said student associated with exactly one of said schedule/calendar tools, each said schedule/calendar tool for outputting to said associated student information relating to scheduled activities of said associated student.

143. The system according to claim 142 further comprising data areas for each of said students characterizing scheduled activities according to deadline date and priority, and wherein said schedule/calendar tool further limits said associated student to interactive instruction according to said data areas characterizing said scheduled activities.

144. The system according to claim 141 further comprising pedagogic information data areas for each student, said pedagogic information data areas comprising data for a pedagogic model of said student.

145. The system according to claim 141 further comprising progress and performance data areas for each student, said progress and performance data areas comprising data describing progress and performance of each said student in said interactive instruction.

146. The system according to claim 141 wherein one or more of said materials presents said interactive instruction according to an education paradigm, and wherein said monitoring information further comprises pedagogic information classified according to said education paradigm of said materials.

147. The system according to claim 146 further comprising control parameters for each material that have an educational paradigm, wherein each material presents said interactive instruction according to values of said control parameters.

148. The system according to claim 141 further comprising a plurality of tables of rules which are referenced in order to control said one or more materials.

149. The system according to claim 141 further comprising one or more student data objects, each of said student data objects associated with exactly one student, each student data object storing monitoring information of said one student associated with said object.

150. The system according to claim 149 wherein said student data object associated with one student further comprises:
(a) pedagogic information describing a pedagogic model of said one student; and (b) progress and performance information for describing the progress and performance of said student in said materials.

151. A computer readable medium comprising instructions for performing a method of operating an agent based instruction system for interactive instruction of a student over a plurality of instructional sessions, said method comprising:

(a) presenting interactive instruction to said student by executing one or more materials on a computer accessed by said student for a current instructional session;

(b) monitoring said interactive instruction of said student during said current instructional session;

(c) storing information responsive to said monitoring of said student during said current instructional session for use during subsequent instructional sessions; and (d) outputting information on said computer to guide said student in said interactive instruction, said output information responsive to said monitoring of said student during said current instructional session and to said stored information responsive to said monitoring of said student during previous instructional sessions;

whereby said system acts as a virtual tutor adapted to said student, said virtual tutor guiding said interactive instruction of said student.

\* \* \* \* \*